tus008133950B2
US008133950B2

(12) United States Patent  (10) Patent No.: US 8,133,950 B2
Shibatani et al.  (45) Date of Patent: Mar. 13, 2012

(54) COLOR FILTER INK, COLOR FILTER INK MANUFACTURING METHOD, COLOR FILTER INK SET, COLOR FILTER, IMAGE DISPLAY DEVICE, AND ELECTRONIC DEVICE

(75) Inventors: Masaya Shibatani, Nagano (JP); Hiroshi Takiguchi, Nagano (JP); Hidekazu Moriyama, Fujimi-machi (JP); Mitsuhiro Isobe, Yamanashi (JP); Homare Kuribayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 192 days.

(21) Appl. No.: 12/611,321

(22) Filed: Nov. 3, 2009

(65) Prior Publication Data

US 2010/0134729 A1 Jun. 3, 2010

(30) Foreign Application Priority Data

Nov. 28, 2008 (JP) ................................. 2008-305263
Jan. 14, 2009 (JP) ................................. 2009-005419

(51) Int. Cl.
 *C08L 37/00* (2006.01)
(52) U.S. Cl. ......... 524/517; 523/160; 252/586; 349/106
(58) Field of Classification Search .................. 252/586; 349/106; 524/517
See application file for complete search history.

(56) References Cited

U.S. PATENT DOCUMENTS

2010/0261103 A1* 10/2010 Sasaki et al. ...................... 430/7

FOREIGN PATENT DOCUMENTS

JP 2004-2815 A 1/2004

OTHER PUBLICATIONS

STN Structure Search Results (Jun. 23, 2011).*

* cited by examiner

*Primary Examiner* — David W Wu
*Assistant Examiner* — Vu A Nguyen
(74) *Attorney, Agent, or Firm* — Global IP Counselors, LLP

(57) ABSTRACT

A color filter ink is adapted to be used to manufacture a color filter by an inkjet method. The color filter ink includes a colorant, a resin material, and a liquid medium that dissolves and/or disperses the colorant. The resin material includes a polymer containing a first monomer component represented by a prescribed chemical formula, a second monomer component having a carboxyl group or acid anhydride group, and a third monomer component represented by a prescribed chemical formula.

12 Claims, 10 Drawing Sheets

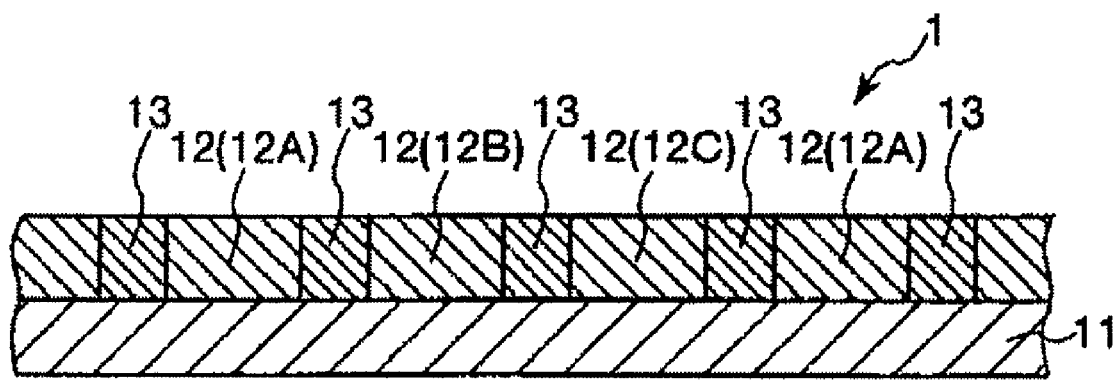
F I G. 1

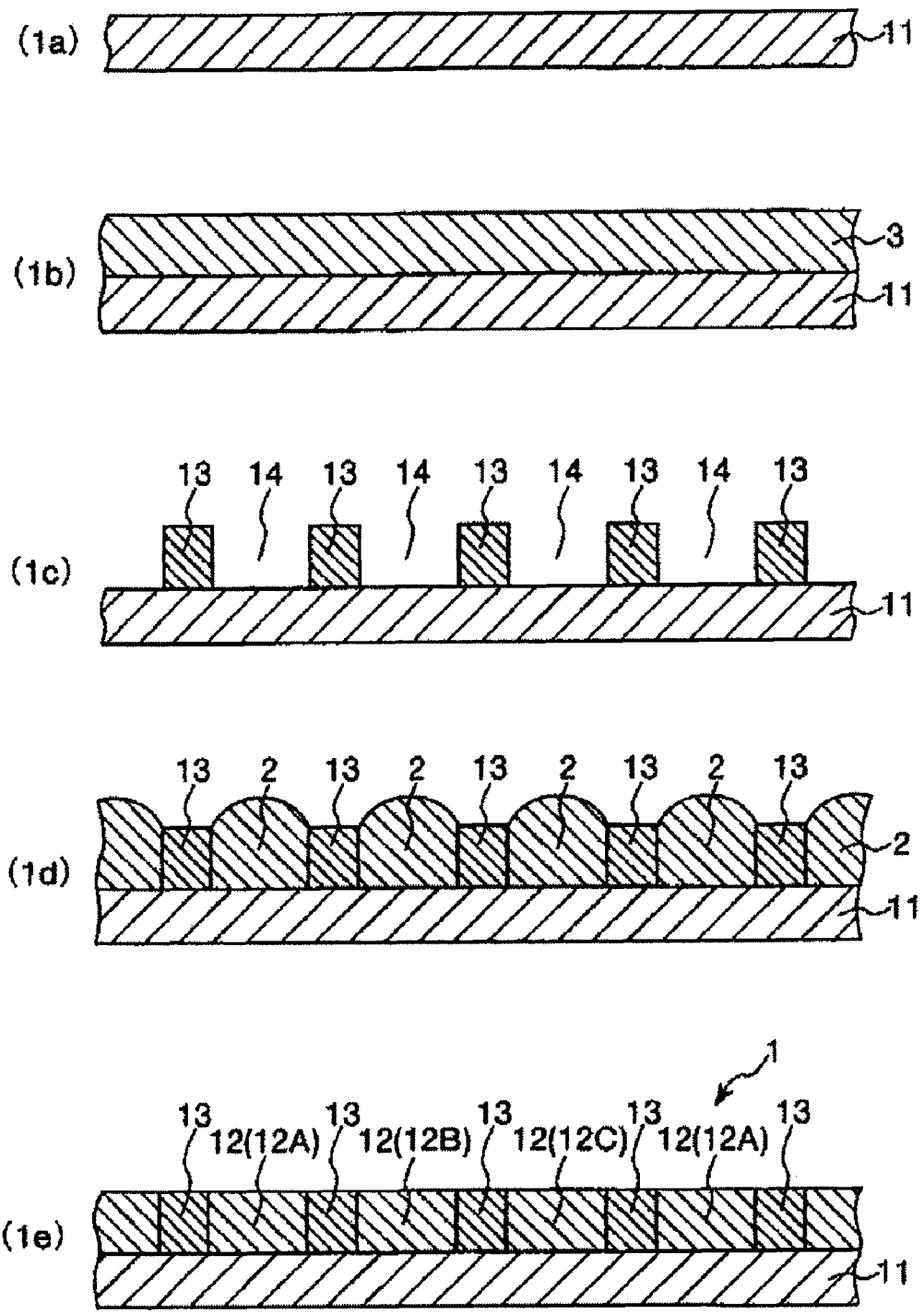
F I G. 2

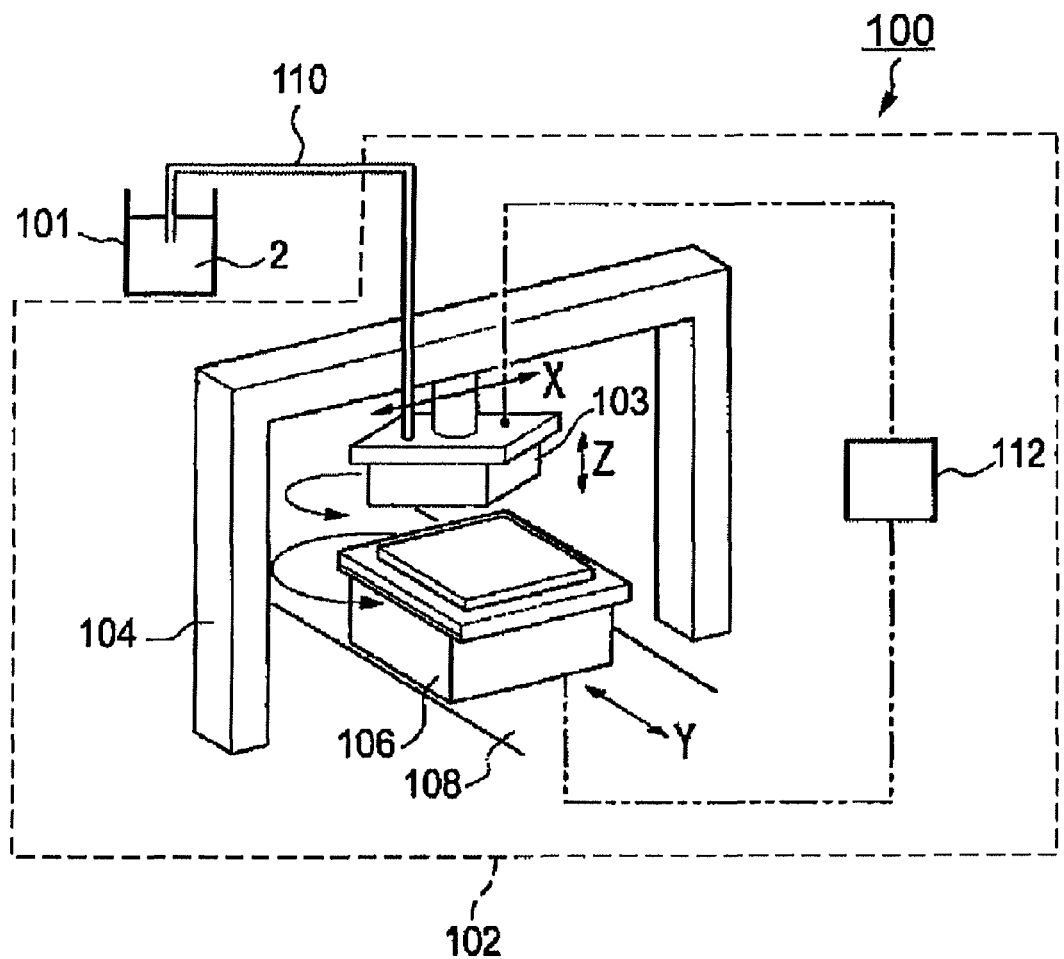
F I G. 3

(a)

(b)

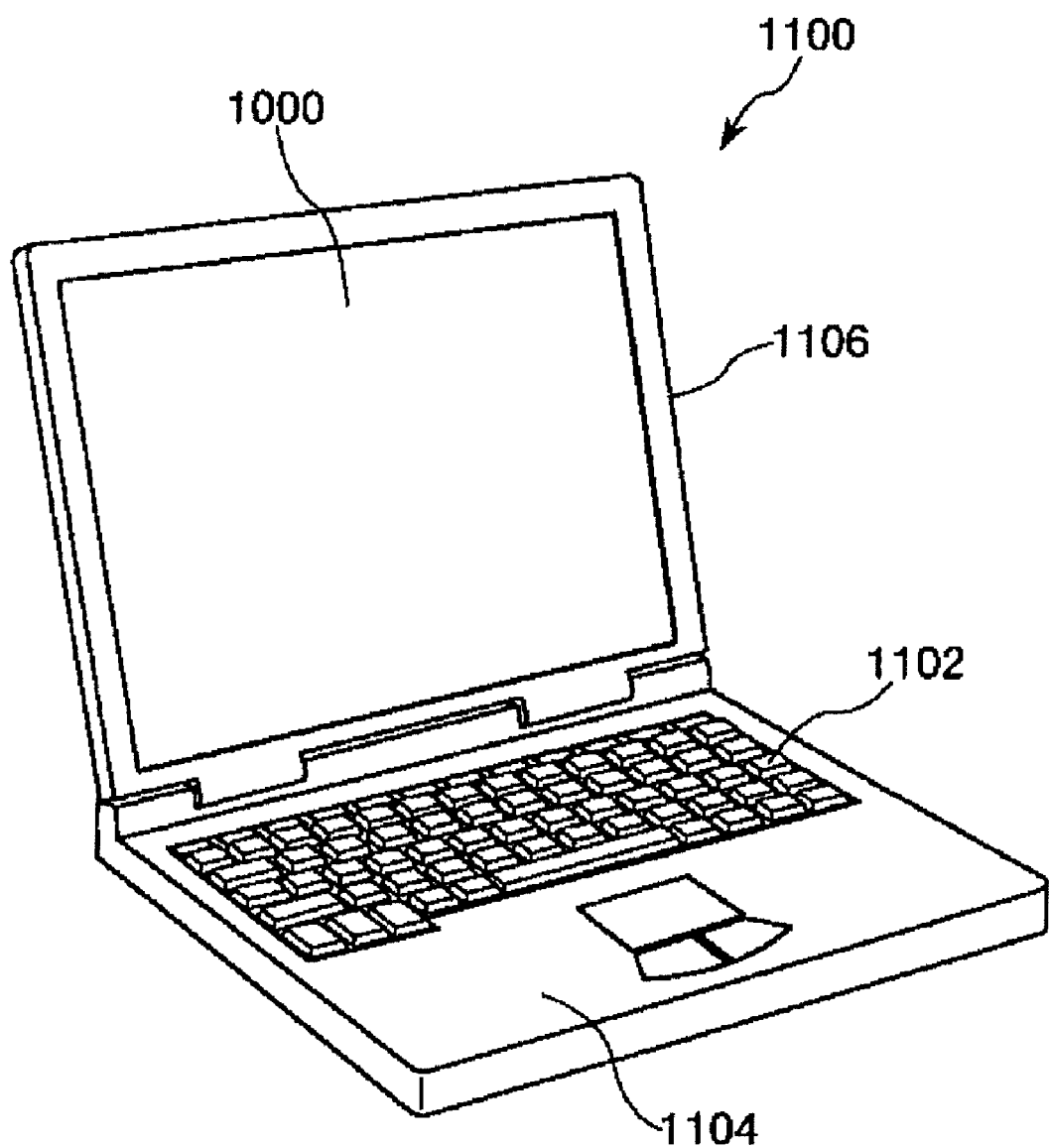
F I G. 8

COLOR FILTER INK, COLOR FILTER INK MANUFACTURING METHOD, COLOR FILTER INK SET, COLOR FILTER, IMAGE DISPLAY DEVICE, AND ELECTRONIC DEVICE

CROSS-REFERENCE TO RELATED APPLICATIONS

This application claims priority to Japanese Patent Application No. 2008-305263 filed on Nov. 28, 2008 and Japanese Patent Application No. 2009-005419 filed on Jan. 14, 2009. The entire disclosures of Japanese Patent Application Nos. 2008-305263 and 2009-005419 are hereby incorporated herein by reference.

BACKGROUND

1. Technical Field

The present invention relates to a color filter ink, a color filter ink manufacturing method, a color filter ink set, a color filter, an image display device, and an electronic device.

2. Related Art

Color filters are generally used in liquid crystal display devices (LCD) and the like that display color.

Color filters have conventionally been manufactured using a so-called photolithography method in which a coating film composed of a material (color layer formation composition) that includes a colorant, a photosensitive resin, a functional monomer, a polymerization initiator, and other components is formed on a substrate, and then photosensitive processing for radiating light via a photomask, development processing, and the like are performed. In such a method, the color filters are usually manufactured by repeating a process in which a coating film corresponding to each color is formed on substantially the entire surface of the substrate, only a portion of the coating film is cured, and most of the film other than the cured portion is removed, so that there is no color overlap. Therefore, only a portion of the coating film formed in color filter manufacturing remains as a color layer in the finished color filter, and most of the coating film is removed in the manufacturing process. Therefore, not only does the manufacturing cost of the color filter increase, but the process is also undesirable from the perspective of resource saving.

Methods have recently been proposed for forming the color layer of a color filter through the use of an inkjet head (droplet discharge head) (see Japanese Laid-Open Patent Application No. 2004-2815, for example). In such a method, because the discharge position and the like of droplets of the material (color layer formation composition) used to form the color layer are easily controlled, and waste of the color layer formation composition can be reduced, the environmental impact can be reduced, and manufacturing cost can also be minimized.

However, in a color filter manufacturing method that uses an inkjet head (inkjet method), the formed color layer does not readily assume a flat shape, and as a result, the color filter has inadequate contrast ratio and brightness. A color filter manufactured using an inkjet method is also generally subjected to heat treatment and cleaning by a solvent or the like in the manufacturing process. Thermal resistance, solvent resistance, and other durability characteristics are therefore required in the color filter manufactured using an inkjet method, but satisfactory durability is difficult to obtain in the conventional color filter.

SUMMARY

An object of the present invention is to provide an inkjet-type color filter ink that can be suitably used to manufacture a color filter having excellent durability, contrast ratio, and brightness; to provide a color filter ink set provided with the color filter ink; to provide a color filter having excellent durability that enables display of an image having excellent contrast ratio and brightness; and to provide an image display device and electronic device provided with the color filter.

Such objects are achieved by the present invention described hereinafter.

A color filter ink according to a first aspect of the present invention is adapted to be used to manufacture a color filter by an inkjet method. The color filter ink includes a colorant, a resin material, and a liquid medium that dissolves and/or disperses the colorant. The resin material including a polymer M containing a monomer component m1 represented by a chemical formula (1) below, a monomer component m2 having a carboxyl group or acid anhydride group, and a monomer component m3 represented by a chemical formula (3) below.

Chemical Formula (1)

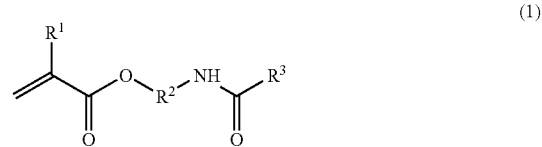

In the chemical formula (1), $R^1$ is a hydrogen atom or a methyl group; $R^2$ is a $C_{1-8}$ bivalent aliphatic saturated hydrocarbon group; and $R^3$ is a residue of a blocking agent $R^3H$ of an isocyanate group.

Chemical Formula (3)

In the chemical formula (3), $R^4$ is a hydrogen atom or a methyl group; and $R^5$ is a $C_{16-25}$ hydrocarbon group which may have a hydrocarbon-substituted oxy group.

It is thereby possible to provide an inkjet-type color filter ink that can be suitably used to manufacture a color filter having excellent durability, contrast ratio, and brightness.

In the color filter ink as described above, the polymer M preferably further includes at least one type of monomer component selected from the group consisting of a monomer component m4 represented by a chemical formula (4) below, a monomer component m5 that is an aromatic vinyl compound, a monomer component m6 that is a hydroxyl-containing compound, and a monomer component m7 that is a vinyl compound having a 3- to 5-member cyclic ether group.

Chemical Formula (4)

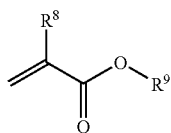

In the chemical formula (4), $R^8$ is a hydrogen atom or a methyl group; and $R^9$ is a $C_{1-15}$ hydrocarbon group which may have a hydrocarbon-substituted oxy group.

In the color filter ink as described above, the colorant preferably includes a halogenated phthalocyanine zinc complex.

The inventors have discovered that a green-colored portion having excellent brightness and contrast relative to that obtained through the use of C. I. pigment green 36, which is commonly used in green color filter ink, can be formed through the use of a halogenated phthalocyanine zinc complex in the color filter ink. However, a halogenated phthalocyanine zinc complex has inferior dispersion stability in the ink, and when a colored portion is formed using a color filter ink that includes a halogenated phthalocyanine zinc complex, unevenness of color, saturation, and other characteristics are difficult to prevent stably over a long period of time. Adequately good discharge stability of droplets is also difficult to obtain when a color filter ink that includes a halogenated phthalocyanine zinc complex is used. Therefore, as a result of concentrated investigation, the inventors discovered that excellent effects such as those described above are obtained, while problems such as those described above are adequately prevented from occurring, by using a polymer M together with the halogenated phthalocyanine zinc complex. Specifically, using the halogenated phthalocyanine zinc complex together with the polymer M makes it possible to provide the formed colored portion with particularly good brightness and contrast while reliably preventing adverse effects due to reduced dispersion stability of the pigment.

In the color filter ink as described above, the resin material preferably further includes a polymer X containing a monomer component x1 represented by a chemical formula (11) below, a monomer component x3 represented by a chemical formula (13) below, and a monomer component x4 represented by a chemical formula (14) below.

Chemical Formula (11)

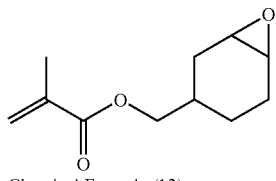

Chemical Formula (13)

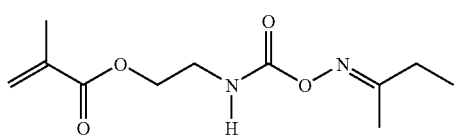

Chemical Formula (14)

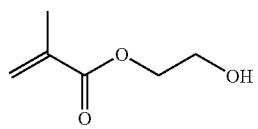

It is thereby possible to more reliably prevent such problems as reduced contrast, as well as unevenness of color and saturation among regions of the color filter manufactured using the color filter ink, and to provide the color filter with particularly good durability and reliability.

In the color filter ink as described above, the resin material preferably includes the polymer M and a polymer Y containing a monomer component y1 represented by a chemical formula (15) below.

Chemical Formula (15)

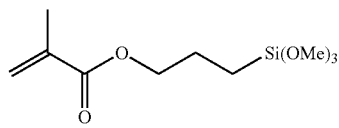

It is thereby possible to provide the manufactured color filter with particularly good durability and reliability while providing the color filter ink with excellent discharge stability and other characteristics.

In the color filter ink as described above, the liquid medium preferably includes one or more types selected from the group consisting of 1,3-butylene glycol diacetate, bis(2-butoxyethyl)ether, 2-(2-methoxy-1-methylethoxy)-1-methylethyl acetate, and diethylene glycol monobutylether acetate.

The polymer M can thereby be more uniformly dissolved in the color filter ink, the color filter ink can be provided with particularly good discharge stability, and an image having particularly good contrast ratio and brightness can be displayed using the manufactured color filter. When the color filter ink includes a pigment as the colorant, the pigment particles can be dispersed in the color filter ink with particularly good stability.

A method for manufacturing a color filter ink according to a second aspect of the present invention includes preparing a polymer M solution by dissolving a polymer M in a solvent with the polymer M containing a monomer component m1 represented by a chemical formula (1) below, a monomer component m2 having a carboxyl group or acid anhydride group, and a monomer component m3 represented by a chemical formula (3) below, and performing a fine-dispersion process using a bead mill to the polymer M solution to which a pigment is added, and obtaining a pigment dispersion in which the pigment is fine-dispersed.

Chemical Formula (1)

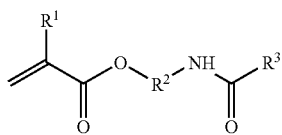
(1)

In the chemical formula (1), $R^1$ is a hydrogen atom or a methyl group; $R^2$ is a $C_{1-8}$ bivalent aliphatic saturated hydrocarbon group; and $R^3$ is a residue of a blocking agent $R^3H$ of an isocyanate group.

Chemical Formula (3)

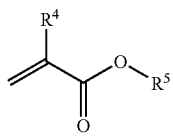
(3)

In the chemical formula (3), $R^4$ is a hydrogen atom or a methyl group; and $R^5$ is a $C_{16-25}$ hydrocarbon group which may have a hydrocarbon-substituted oxy group.

It is thereby possible to provide a manufacturing method capable of suitably manufacturing an inkjet-type color filter ink, the color filter ink being suitable for use in manufacturing a color filter having excellent contrast ratio and brightness, as well as excellent durability.

The method for manufacturing a color filter ink as described above preferably further includes mixing the pigment dispersion and a resin component other than the polymer M after the performing of the fine-dispersion process.

It is thereby possible, for example, to obtain particularly good dispersion stability of the pigment in the color filter ink (long-term stability of the color filter ink), and to provide the colored portion formed using the color filter ink with particularly good adhesion to the substrate.

In the method for manufacturing a color filter ink as described above, the mixing of the pigment dispersion and the resin component preferably includes using, as the resin component, a polymer X containing a monomer component x1 represented by a chemical formula (11) below, a monomer component x3 represented by a chemical formula (13) below, and a monomer component x4 represented by a chemical formula (14) below.

Chemical Formula (11)

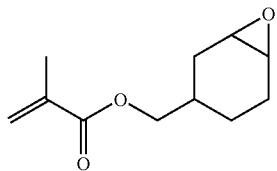
(11)

Chemical Formula (13)

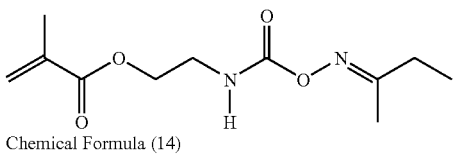
(13)

Chemical Formula (14)

(14)

It is thereby possible to more reliably prevent such problems as reduced contrast, as well as unevenness of color and saturation among regions of the color filter manufactured using the color filter ink, and to provide the color filter with particularly good durability and reliability.

In the method for manufacturing a color filter ink as described above, the mixing of the pigment dispersion and the resin component preferably includes using, as the resin component, a polymer Y containing a monomer component y1 indicated by a chemical formula (15) below.

Chemical Formula (15)

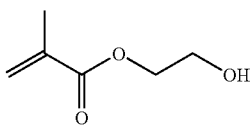
(15)

It is thereby possible to provide the manufactured color filter with particularly good durability and reliability while providing the color filter ink with excellent discharge stability and other characteristics.

A color filter ink set according to a third aspect of the present invention includes a plurality of types of ink used to manufacture a color filter, at least one type of the plurality of types of ink being the color filter ink of the first aspect.

It is thereby possible to provide a color filter ink set having an inkjet-type color filter ink, the color filter ink being suitable for use in manufacturing a color filter having excellent contrast ratio and brightness, as well as excellent durability.

A color filter according to a fourth aspect of the present invention is manufactured using the color filter ink of the first aspect.

It is thereby possible to provide a highly durable color filter that enables an image having excellent contrast ratio and brightness to be displayed.

A color filter according to a fifth aspect of the present invention is manufactured using the color filter ink set of the third aspect.

It is thereby possible to provide a highly durable color filter that enables an image having excellent contrast ratio and brightness to be displayed.

An image display device according to a sixth aspect of the present invention includes the color filter of the fourth of fifth aspect.

It is thereby possible to provide a highly durable image display device that enables an image having excellent contrast ratio and brightness to be displayed.

The image display device as described above is preferably a liquid crystal panel.

It is thereby possible to provide a highly durable image display device that enables an image having excellent contrast ratio and brightness to be displayed.

An electronic device according to a seventh aspect of the present invention includes the image display device of the sixth aspect.

It is thereby possible to provide a highly durable electronic device that enables an image having excellent contrast ratio and brightness to be displayed.

BRIEF DESCRIPTION OF THE DRAWINGS

Referring now to the attached drawings which form a part of this original disclosure:

FIG. 1 is a sectional view showing a preferred embodiment of the color filter of the present invention;

FIG. 2 is a sectional view showing a method for manufacturing a color filter;

FIG. 3 is a perspective view showing the droplet discharge device used in the manufacture of the color filter;

FIG. 6 is a view showing the droplet discharge head in the droplet discharge device shown in FIG. 3, wherein FIG. 6(a) is a sectional perspective view and FIG. 6(b) is a sectional view;

FIG. 8 is a perspective view showing the configuration of a mobile (or notebook) personal computer to which the electronic device of the present invention has been applied;

DETAILED DESCRIPTION OF EXEMPLARY EMBODIMENTS

Figure 4:
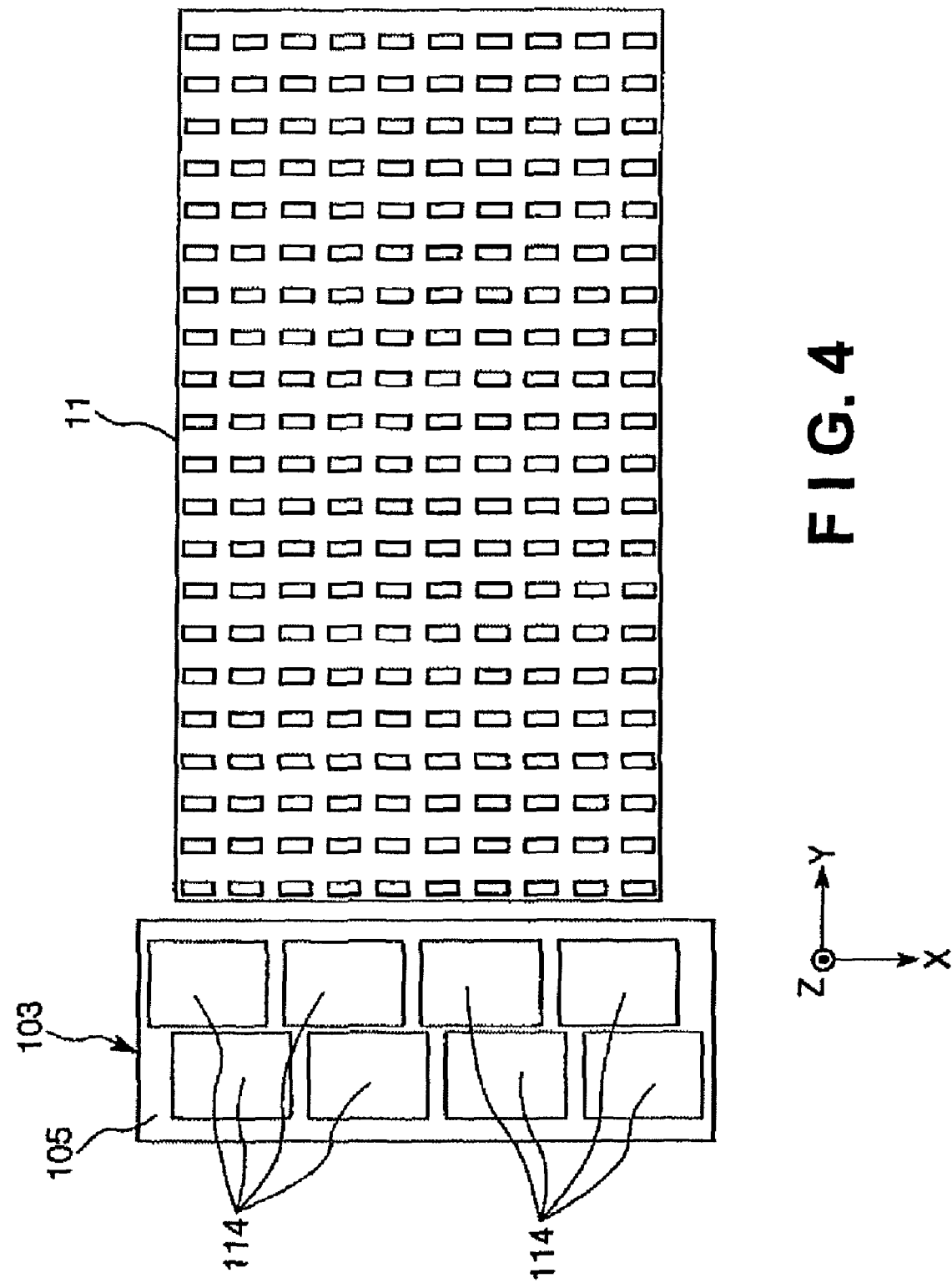
FIG. 4 is a view of droplet discharge means in the droplet discharge device shown in FIG. 3, as seen from the stage side.

Preferred embodiments of the present invention will be described in detail hereinafter.

Color Filter Ink

The color filter ink of the present invention is an ink used to manufacture (form the colored portion of a color filter) a color filter, and is used particularly in the manufacture of a color filter by an inkjet method.

The color filter ink includes a colorant, a resin material, a liquid medium for dissolving and/or dispersing the colorant, and other components.

Colorant

A color filter usually has colored portions comprising a plurality of different colors (generally, colored portions comprising three colors corresponding to RGB). The colorant is usually selected according to the hue of the colored portion to be formed. Examples of colorants that can be used to form the color filter ink include various types of pigments and various types of dyes.

Examples of pigments include C. I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:1, 48:2, 48:3, 48:4, 49:1, 49:2, 50:1, 52:1, 53:1, 57, 57:1, 57:2, 58:2, 58:4, 60:1, 63:1, 63:2, 64:1, 81, 81:1, 83, 88, 90:1, 97, 101, 102, 104, 105, 106, 108, 108:1, 112, 113, 114, 122, 123, 144, 146, 149, 150, 151, 166, 168, 170, 171, 172, 174, 175, 176, 177, 178, 179, 180, 185, 187, 188, 190, 193, 194, 202, 206, 207, 208, 209, 215, 216, 220, 224, 226, 242, 243, 245, 254, 255, 264, and 265; C. I. pigment green 7, 36, 15, 17, 18, 19, 26, and 50; C. I. pigment blue 1, 15, 15:1, 15:2, 15:3, 15:4, 15:6, 17:1, 18, 60, 27, 28, 29, 35, 36, 60, and 80; C. I. pigment yellow 1, 3, 12, 13, 14, 15, 16, 17, 20, 24, 31, 34, 35, 35:1, 37, 37:1, 42, 43, 53, 55, 60, 61, 65, 71, 73, 74, 81, 83, 93, 94, 95, 97, 98, 100, 101, 104, 106, 108, 109, 110, 113, 114, 116, 117, 119, 120, 126, 127, 128, 129, 138, 139, 150, 151, 152, 153, 154, 155, 156, 157, 166, 168, 175, 180, 184, and 185; C. I. pigment violet 1, 3, 14, 16, 19, 23, 29, 32, 36, 38, and 50; C. I. pigment orange 1, 5, 13, 14, 16, 17, 20, 20:1, 24, 34, 36, 38, 40, 43, 46, 49, 51, 61, 63, 64, 71, 73, and 104; C. I. pigment brown 7, 11, 23, 25, and 33; C. I. pigment black 1 and 7; halogenated phthalocyanine zinc complexes; and derivatives of these pigments and the like.

When the color filter ink includes a pigment as the colorant, advantages are gained in that the formed color filter (colored portion) has enhanced light fastness and thermal resistance. Although the problem of reduced droplet discharge stability occurs in the conventional technique, as described in detail hereinafter, when the color filter ink includes a pigment as the colorant, such a problem can be reliably prevented from occurring in the present invention even when a pigment is included as the colorant. Specifically, the effects of the present invention are more significantly demonstrated when a pigment is used as the colorant.

When a pigment is included as the colorant in the conventional color filter ink, an excellent state of dispersion of the colorant is difficult to maintain over a long period of time, and it is difficult to stably manufacture color filters having excellent contrast and other characteristics over a long period of time. In the present invention, however, since a resin material such as described in detail hereinafter is used, the resin material and the colorant (pigment) can be mixed together with excellent stability over a long period of time, and color filters having excellent contrast and other characteristics can be stably manufactured over a long period of time. Since the color filter ink, once prepared, can be suitably used for a long time, the frequency of exchanging the color filter ink and replacing the color filter ink in the droplet discharge device can be reduced. The color filter can therefore be manufactured with particularly good productivity, and the quality of the manufactured color filter can be made more consistent.

Among the colorants described above, the color filter ink preferably includes one or more types selected from the group that includes C. I. pigment red 254, C. I. pigment red 177, C. I. pigment blue 15:6, C. I. pigment violet 23, C. I. pigment yellow 150, a halogenated phthalocyanine zinc complex, and derivatives thereof. The effects of using the polymer M described in detail hereinafter are thereby more significantly demonstrated. The manufactured color filter can also be provided with particularly good color reproduction range and light fastness.

Particularly when the color filter ink includes C. I. pigment red 177 and a derivative thereof and/or C. I. pigment red 254 and a derivative thereof as the pigment (red pigment), particularly good coloration properties of the color filter ink (red color filter ink) can be obtained. The effects of jointly using the resin material are also more significantly demonstrated, and excellent dispersion stability of the pigment particles in the color filter ink can be obtained. As a result, thixotropy of the color filter ink can be prevented from increasing during formation of the colored portion, and the color filter ink can be provided with particularly good discharge stability when the ink is applied to cells.

Such effects as described above are even more significantly demonstrated when a compound (derivative) indicated by Formula (17) or Formula (18) below is included as the derivative of C. I. pigment red 177 and the derivative of C. I. pigment red 254.

Chemical Formula (17)

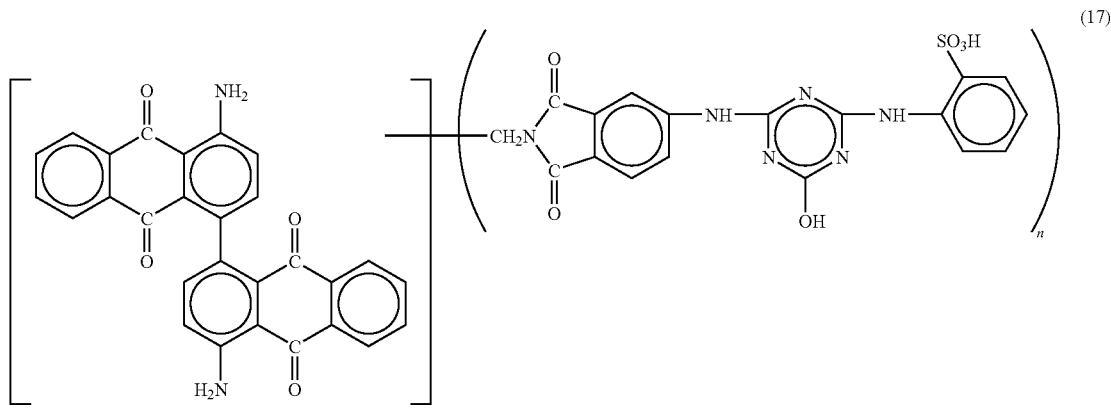

In Formula (17), n is an integer from 1 to 4.

Chemical Formula (18)

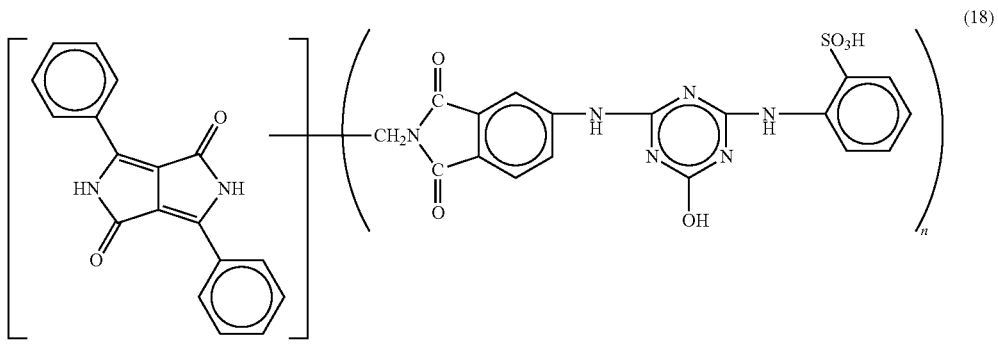

In Formula (18), n is an integer from 1 to 4.

The color filter ink (green color filter ink) can be provided with particularly good coloration properties, particularly when the color filter ink includes a halogenated phthalocyanine zinc complex as a pigment (green pigment). Although a halogenated phthalocyanine zinc complex has the characteristic of excellent brightness, a halogenated phthalocyanine zinc complex is a material that is extremely difficult to stably disperse in the conventional technique.

However, the inventors have discovered that excellent dispersion stability in the color filter ink can be obtained through the joint use of the resin material (polymer M) described in detail hereinafter, even when a halogenated phthalocyanine zinc complex is included. The color filter ink can thereby be provided with even better coloration properties, and thixotropy of the color filter ink due to increased pigment concentration can be prevented from increasing during formation of the colored portion. It is also possible to obtain particularly good discharge stability of the color filter ink and long-term dispersion stability of the pigment in the color filter ink (storability of the color filter ink).

The halogenated phthalocyanine zinc complex will next be described.

The halogenated phthalocyanine zinc complex is provided with zinc as the central metal, and a halogenated phthalocyanine as a ligand. In a halogenated phthalocyanine, at least a portion of the hydrogen atoms of the benzene ring constituting the phthalocyanine is replaced by halogen atoms. Any halogenated phthalocyanine may be used insofar as such a condition is satisfied, but a halogenated phthalocyanine having the chemical structure indicated by Formula (19) below is preferred. A halogenated phthalocyanine zinc complex having such a structure has excellent brightness and luminance, as well as excellent coloration properties.

Chemical Formula (19)

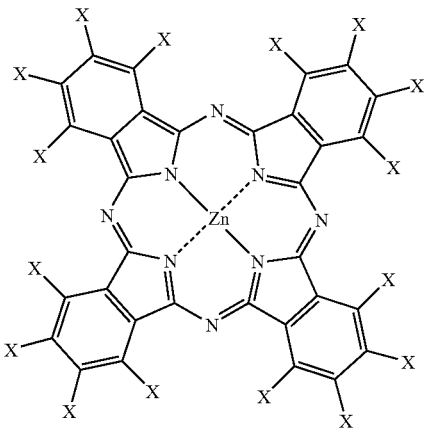

(19)

In Formula (19), X are each independently a hydrogen atom (H), a chlorine atom (Cl), or a bromine atom (Br), wherein the number of H atoms in each molecule is 0 to 4, the number of Cl atoms is 0 to 8, and the number of Br atoms is 4 to 16.

The inventors have also discovered that even better dispersion stability in the color filter ink can be obtained by including a sulfonated pigment derivative as a secondary pigment together with the halogenated phthalocyanine zinc complex in the color filter ink that includes the polymer M. The color filter ink can thereby be provided with even better coloration properties, and thixotropy of the color filter ink due to increased pigment concentration can be even more effectively prevented from increasing during formation of the colored portion. It is also possible to obtain even better discharge stability of the color filter ink and long-term dispersion stability of the pigment in the color filter ink (storability of the color filter ink).

When a halogenated phthalocyanine zinc complex and a sulfonated pigment derivative are included as pigments, a compound (derivative) indicated by Formula (20) below is preferably included as the sulfonated pigment derivative. Particularly good dispersion stability of the pigment particles in the color filter ink can thereby be obtained, and an image having more excellent contrast can be displayed in the manufactured color filter.

Chemical Formula (20)

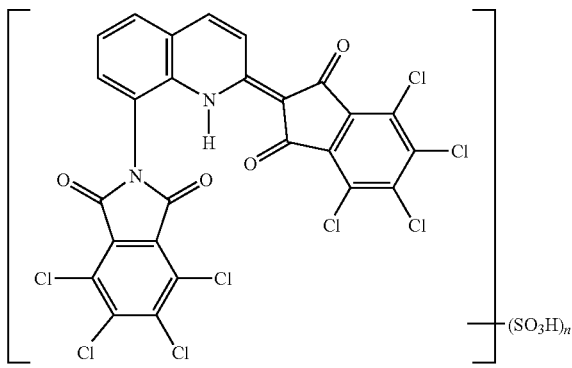

(20)

In Formula (20), n is an integer from 1 to 5.

When a halogenated phthalocyanine zinc complex and a pigment derivative (sulfonated pigment derivative) such as described above are included, the content ratio of the pigment derivative (sulfonated pigment derivative) in the color filter ink is not particularly limited, but is preferably 2 to 32 parts by weight, and more preferably 7 to 28 parts by weight with respect to 100 parts by weight of the halogenated phthalocyanine zinc complex (main pigment). Excellent dispersion stability of the pigment particles in the color filter ink can thereby be obtained. The manufactured color filter can also be provided with particularly good contrast ratio and brightness.

Particularly good coloration properties of the color filter ink (blue color filter ink) can be obtained particularly when the color filter ink includes C. I. pigment blue 15:6 and C. I. pigment violet 23 as pigments (blue pigments). Particularly good dispersion stability of pigment particles in the color filter ink can also be obtained.

When the color filter ink is an ink (pigment ink) that includes a pigment as the colorant, the average grain size of the pigment is preferably 10 to 200 nm, and more preferably 20 to 180 nm. The color filter manufactured using the color filter ink can thereby be provided with adequately excellent durability (light fastness and other characteristics), and particularly good coloration properties, contrast, and other characteristics can be obtained in the color filter while adequately good dispersion stability of the pigment in the color filter ink and discharge stability of the color filter ink are obtained.

Examples of dyes include azo dyes, anthraquinone dyes, condensed multi-ring aromatic carbonyl dyes, indigoid dyes, carbonium dyes, phthalocyanine dyes, methines, polymethine dyes, and the like. Specific examples of dyes include C. I direct red 2, 4, 9, 23, 26, 28, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247; C. I. acid red 35, 42, 51, 52, 57, 62, 80, 82, 111, 114, 118, 119, 127, 128, 131, 143, 145, 151, 154, 157, 158, 211, 249, 254, 257, 261, 263, 266, 289, 299, 301, 305, 319, 336, 337, 361, 396, and 397; C. I. reactive red 3, 13, 17, 19, 21, 22, 23, 24, 29, 35, 37, 40, 41, 43, 45, 49, and 55; C. I. basic red 12, 13, 14, 15, 18, 22, 23, 24, 25, 27, 29, 35, 36, 38, 39, 45, and 46; C. I direct violet 7, 9, 47, 48, 51, 66, 90, 93, 94, 95, 98, 100, and 101; C. I acid violet 5, 9, 11, 34, 43, 47, 48, 51, 75, 90, 103, and 126; C. I reactive violet 1, 3, 4, 5, 6, 7, 8, 9, 16, 17, 22, 23, 24, 26, 27, 33, and 34; C. I. basic violet 1, 2, 3, 7, 10, 15, 16, 20, 21, 25, 27, 28, 35, 37, 39, 40, and 48; C. I. direct yellow 8, 9, 11, 12, 27, 28, 29, 33, 35, 39, 41, 44, 50, 53, 58, 59, 68, 87, 93, 95, 96, 98, 100, 106, 108, 109, 110, 130, 142, 144, 161, and 163; C. I. acid yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227; C. I. reactive yellow 2, 3, 13, 14, 15, 17, 18, 23, 24, 25, 26, 27, 29, 35, 37, 41, and 42; C. I. basic yellow 1, 2, 4, 11, 13, 14, 15, 19, 21, 23, 24, 25, 28, 29, 32, 36, 39, and 40; C. I. acid green 16; C. I. acid blue 9, 45, 80, 83, 90 and 185; C. I. basic orange 21 and 23; and the like.

The content ratio of the colorant in the color filter ink is preferably 2 to 25 wt %, and more preferably 3 to 20 wt %. When the content ratio of the colorant is within the aforementioned range, higher color saturation can be ensured in the color filter manufactured using the color filter ink, and the color filter can be used for a clearer image display. When such a relatively high concentration of the colorant (particularly a pigment) is included in the conventional technique, the discharge stability is particularly low, and flight deflection, instability of the droplet discharge quantity, and other problems are particularly prone to occur during discharge of color filter ink droplets. Defects due to fluctuation in the droplet discharge quantity between regions of the same surface, and severely reduced productivity of color filters occur particularly when droplets are discharged onto a large substrate (e.g., G5 or larger) to form colored portions. In the present invention, however, even when the colorant is included at a relatively high concentration, such problems as described above can be reliably prevented, uneven color, saturation, and other characteristics between regions of a manufactured color filter, and fluctuation of characteristics between units can be reliably prevented, and color filters can be manufactured with excellent productivity, as described in detail hereinafter. Specifically, the effects of the present invention are more significantly demonstrated when the color filter ink includes a relatively high concentration of the colorant, as described above. The manufactured color filter can also be provided with particularly good durability.

Resin Material

The color filter ink generally includes a resin material (binder resin) for such purposes as enhancing adhesion of the formed colored portion to the substrate. A color filter manufactured using an inkjet method is usually heat treated and subjected to cleaning by a solvent or the like in the manufacturing process. Thermal resistance, solvent resistance, and other durability characteristics are therefore required in a color filter that is manufactured using an inkjet method, but satisfactory durability is difficult to obtain in a conventional color filter.

A color filter is generally manufactured by an inkjet method in which droplets are discharged into a cell provided on a substrate, after which the liquid medium is removed, and the color filter ink is solidified. However, thixotropy and viscosity of the color filter ink increase as the solids concentration is increased due to removal of the liquid medium, and unwanted irregularities occur on the surface of the formed colored portion. These irregularities prevent the image displayed using the color filter from having adequately high contrast ratio and brightness, and uneven color, saturation, and other characteristics also occur. This tendency is particularly apparent when a pigment is included as the colorant, and the content ratio of the pigment with respect to the resin material is high. The reason for this may be that an increase in the solids concentration is accompanied by aggregation of the pigment particles in the ink.

In the case of the conventional color filter ink, when droplets are discharged for long periods of time by the inkjet method, the droplet discharge quantity becomes unstable, the trajectory of the discharged droplets changes (so-called flight deflection occurs), it becomes impossible to land the droplets in the desired region, and other problems occur. When such problems occur, the color saturation fluctuates between the plurality of colored portions that are originally supposed to have the same color saturation, and on the substrate or the like onto which the droplets are to be discharged, the plurality of types of ink used to form different colored portions mixes together (colors mix), and as a result, uneven color, saturation, and other characteristics between regions of the same color filter occur, fluctuation occurs in the characteristics (particularly contrast ratio, color reproduction range, and other color characteristics) between numerous color filters, and the reliability of the color filters is reduced. Such problems are severe particularly when a dispersed state must be maintained in the ink, and when ink is used that includes a pigment for which a change in the dispersion state has significant adverse effects on discharge properties.

The inventors conducted a concentrated investigation aimed at overcoming such problems as those described above. As a result, the inventors discovered that such problems as those described above can be overcome by including a resin material such as the one described in detail hereinafter in the color filter ink.

The resin material (curable resin material) constituting the color filter ink of the present invention will be described in detail hereinafter.

The resin material in the color filter ink of the present invention comprises a polymer M containing a monomer component m1 indicated by Formula (1) below, a monomer component m2 having a carboxyl group or acid anhydride group, and a monomer component m3 indicated by Formula (3) below.

Chemical Formula (1)

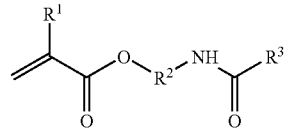

(1)

In Formula (1), $R^1$ is a hydrogen atom or a methyl group; $R^2$ is a $C_{1-8}$ bivalent aliphatic saturated hydrocarbon group; and $R^3$ is a residue of a blocking agent $R^3H$ of an isocyanate group.

Chemical Formula (3)

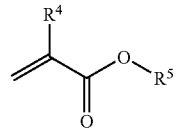

(3)

In Formula (3), $R^4$ is a hydrogen atom or a methyl group; and $R^5$ is a $C_{16-25}$ hydrocarbon group which may have a hydrocarbon-substituted oxy group.

Polymer M

The polymer M includes a monomer component m1 indicated by Formula (1) above, a monomer component m2 having a carboxyl group or acid anhydride group, and a monomer component m3 indicated by Formula (3) above.

By including such a polymer M, the colored portion formed using the color filter ink can be provided with excellent flatness, the manufactured color filter can be provided with excellent contrast ratio and brightness, and the color filter can also be provided with excellent durability. Including the polymer M also enables the resin material to be provided with excellent characteristics (also referred to hereinafter as "curing reaction switching characteristics") whereby curing of the resin material is essentially prevented from progressing at or below a predetermined temperature, and curing can be efficiently advanced at higher temperatures, the formed colored portion can be provided with excellent hardness and other characteristics, and particularly good dispersion stability of the pigment in the color filter ink can be obtained. By including the polymer M, aggregates of the pigment particles used as starting material can be easily formed (broken up) into fine particles during manufacturing of the color filter ink (in the fine-dispersion step described hereinafter) using a manufacturing method such as described hereinafter, and the color filter ink can be manufactured with enhanced productivity. Since the polymer M has extremely high stability with respect to mechanical forces, change in qualities and degradation are prevented from occurring in the fine-dispersion step described hereinafter. Consequently, using the polymer M enables a color filter ink having excellent pigment dispersion properties to be efficiently manufactured while degradation of the resin material and other effects are reliably prevented. Since the polymer M has excellent affinity and compatibility with the resin components (polymers X, Y, Z, and W) described hereinafter, even when a resin component other than the polymer M is included, unwanted precipitation of the resin material in the color filter ink can be prevented, droplets can be discharged with excellent stability, the characteristics of each resin component can be adequately demonstrated in the formed colored portion, and such problems as reduced transparency due to unwanted phase separation can be reliably prevented. The color filter ink also has extremely excellent long-term storability (service life of the color filter ink), quality reduction and other problems due to shelving of mass-produced color filter ink are effectively prevented, and the frequency of replacing the color filter ink during color filter manufacturing can be reduced. Excellent color filter productivity can therefore be obtained, and the manufactured color filters can be provided with excellent reliability.

The polymer M may be composed of essentially a single compound, or may be a mixture of a plurality of types of compounds. However, when the polymer M is a mixture of a plurality of types of compounds, the compounds contain the monomer components m1, m2, and m3.

Monomer Component m1

The polymer M contains a monomer component m1 indicated by Formula (1) above, i.e., a compound having an isocyanate group that is blocked (also referred to hereinafter as a "blocked isocyanate group"). A molecule of the polymer M constituting the color filter ink may also include a plurality of types of monomer components m1 indicated by General Formula (1) above.

Including such a monomer component m1 in the polymer M enables curing (polymerization) of the resin material to proceed optimally in the colored portion formation step (curing step) performed in a heated environment, while unwanted reaction (polymerization) of the resin material can be reliably prevented from occurring during storage of the color filter ink or in the ink application step and other steps described hereinafter. Specifically, including the monomer component m1 makes it possible to obtain particularly good curing reaction switching characteristics. These effects are considered to be obtained for such reasons as the following. Specifically, the blocked isocyanate group of the monomer m1 in the polymer M is unblocked by relatively high energies such as those applied in the colored portion formation step (curing step); an active isocyanate group is generated; the isocyanate group and a carboxyl group or acid anhydride group contribute to curing; and adhesion to the substrate, thermal resistance, chemical resistance, and other characteristics are enhanced, whereas such deblocking does not proceed when a relatively low energy is applied, and the curing reaction is suppressed and prevented from progressing.

In the monomer A indicated by Formula (1), $R^1$ is a hydrogen atom or a methyl group; $R^2$ is a $C_{1-8}$ bivalent aliphatic saturated hydrocarbon group; and $R^3$ is a residue of a blocking agent $R^3H$ of an isocyanate group.

Examples of the $C_{1-8}$ bivalent aliphatic saturated hydrocarbon group indicated by $R^2$ include methylene, ethylene, trimethylene, propylene, tetramethylene, pentamethylene, hexamethylene, heptamethylene, octamethylene, and other straight-chain or branched bivalent saturated aliphatic hydrocarbon groups (alkylene groups). Among these, ethylene, trimethylene, propylene, and other $C_{2-4}$ bivalent saturated aliphatic hydrocarbon groups are preferred.

Examples of isocyanate group blocking agents $R^3H$ include formaldoxime, acetaldoxime, acetoxime, methyl ethyl ketoxime, methyl isobutyl ketoxime, diethyl ketoxime, cyclohexanone oxime, diacetyl mono oxime, benzophenone oxime, and other oxime-based blocking agents; 3,5-dimethylpyrazole and other pyrazole-based blocking agents; methanol, ethanol, and other alcohol-based blocking agents; phenol, cresol, and other phenol-based blocking agents; butyl mercaptan and other mercaptan-based blocking agents; acetanilide, ε-caprolactam, γ-butyrolactam, and other acid amide-based blocking agents; dimethyl malonate, methyl acetoacetate, and other active methylene-based blocking agents; succinic acid imide, maleic acid imide, and other imide-based blocking agents; urea-based blocking agents; phenyl N-phenyl carbamate and other carbamic acid-based blocking agents; diphenyl amine, aniline, and other amine-based blocking agents; ethylene imine, polyethylene imine, and other imine-based blocking agents; and the like.

Oxime-based blocking agents and pyrazole-based blocking agents are preferred as the isocyanate group blocking agent, and a blocking agent indicated by Formula (5) below is more preferred.

Chemical Formula (5)

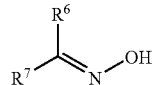

(5)

In Formula (5), $R^6$ and $R^7$ are each independently a $C_{1-8}$ alkyl group. $R^6$ and $R^7$ may also bond with each other and form a ring with the adjacent carbon atom.

Examples of $C_{1-8}$ alkyl groups indicated by $R^6$ and $R^7$ in Formula (5) include methyl, ethyl, propyl, isopropyl, butyl, isobutyl, s-butyl, t-butyl, pentyl, hexyl, octyl, and other straight-chain or branched alkyl groups. Among these, methyl, ethyl, propyl, and other $C_{1-4}$ straight-chain or branched alkyl groups are preferred. Examples of the ring formed by $R^6$ and $R^7$ bonding with each other and bonding with the adjacent carbon atom include cyclobutane, cyclopentane, cyclohexane, and other cycloalkane rings and the like having about 3 to 12 members (preferably 5 or 6 members).

Specific examples of the monomer component m1 indicated by Formula (1) include ethyl 2-[0-(1'-methylpropylideneamino)carboxyamino]methacrylate (=2-(1-methylpropylideneamino oxycarbonylaminoethyl)methacrylate) (the compound indicated by Formula (6)), 2-(3,5-dimethylpyrazol-1-yl)carbonylaminoethyl methacrylate (the compound indicated by Formula (7)), and the like.

Chemical Formula (6)

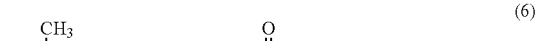

(6)

Chemical Formula (7)

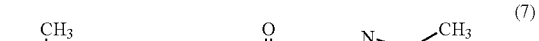

(7)

The content ratio (calculated in terms of the weight of the monomer used to synthesize the polymer) of the monomer component m1 in the polymer M is preferably 1 to 99 wt % (e.g., 10 to 95 wt %), more preferably 20 to 90 wt %, and more preferably 25 to 88 wt %. When the content ratio of the monomer component m1 in the polymer M is within this range, such effects as those described above can be significantly demonstrated without impeding the functions of the monomer components m2, m3 and other components described in detail hereinafter. In contrast, when the content ratio of the monomer component m1 in the polymer M is less than the lower limit of the aforementioned range, the effects of including a monomer component m1 such as those described above may not be adequately demonstrated. When the content ratio of the monomer component m1 in the polymer M exceeds the upper limit of the aforementioned range, the content ratios of the monomer components m2, m3 and other components are correspondingly reduced, and the functions thereof may not be adequately demonstrated. When the polymer M includes a plurality of types of monomer component m1, the sum of the content ratios of the plurality of types of monomer component m1 preferably satisfies such conditions as described above. When the polymer M is a mixture of a plurality of types of compounds, the weighted average value (weighted average value based on weight ratio) of the mixed compounds may be used as the content ratio of the monomer component m1. When the polymer M is a mixture of a plurality of types of compounds, all the compounds preferably contain the monomer component m1 in such a content ratio as described above.

Monomer Component m2

The polymer M contains a monomer component m2 having a carboxyl group or acid anhydride group. The polymer M constituting the color filter ink may also include a plurality of types of monomer component m2 in the polymer M molecule.

Including such a monomer component m2 in the polymer M enables the color filter ink to satisfactorily spread onto the substrate, reliably prevents entrainment of air bubbles and other problems, and enables a colored portion having excellent adhesion to the substrate to be suitably formed. When the color filter ink includes a pigment, including the monomer component m2 not only brings about particularly good pigment dispersion stability, but also provides long-term storability of the color filter ink. When the color filter ink includes a polymer Z and/or polymer W such as described hereinafter, adequately good affinity and compatibility between the polymer M and these polymers (polymers Z and W) can be obtained. As a result, the color filter ink can be provided with excellent discharge stability, and the colored portion formed using the color filter ink can be provided with particularly good transparency (reduction of light transmittance by non-transparency of the resin material is prevented) and particularly good adhesion to a substrate, and the potential for cracking and other problems is reduced.

The monomer component m2 may be an unsaturated carboxylic acid or acid anhydride thereof. Specific examples of the monomer component m2 include acrylic acid, methacrylic acid, itaconic acid, crotonic acid, maleic acid, fumaric acid, and other α,β-unsaturated carboxylic acids and acid anhydrides thereof (maleic anhydride, itaconic anhydride, and the like); and the like. Among these examples, acrylic acid and methacrylic acid (indicated by Formula (2) below) are particularly preferred.

Chemical Formula (2)

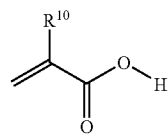

(2)

In Formula (2), $R^{10}$ is a hydrogen atom or a methyl group.

The content ratio (calculated in terms of the weight of the monomer used to synthesize the polymer) of the monomer component m2 in the polymer M is preferably 0.5 to 98 wt % (e.g., 2.5 to 70 wt %), more preferably 3 to 50 wt %, and more preferably 5 to 40 wt %. When the content ratio of the monomer component m2 in the polymer M is within this range, such effects as those described above can be significantly demonstrated without impeding the functions of the monomer component m1 described above and the monomer component m3 and other components described in detail hereinafter. In contrast, when the content ratio of the monomer component m2 in the polymer M is less than the lower limit of the aforementioned range, the effects of including a monomer component m2 such as those described above may not be adequately demonstrated. When the content ratio of the monomer component m2 in the polymer M exceeds the upper limit of the aforementioned range, the content ratios of the monomer components m1, m3 and other components are correspondingly reduced, and the functions thereof may not be adequately demonstrated. When the polymer M includes a plurality of types of monomer component m2, the sum of the content ratios of the plurality of types of monomer component m2 preferably satisfies such conditions as described above. When the polymer M is a mixture of a plurality of types of compounds, the weighted average value (weighted average value based on weight ratio) of the mixed compounds may be used as the content ratio of the monomer component m2. When the polymer M is a mixture of a plurality of types of compounds, all the compounds preferably contain the monomer component m2 in such a content ratio as described above.

Monomer Component m3

The polymer M contains a monomer component m3 ((meth)acrylic acid ester) indicated by Formula (3) above. The polymer M constituting the color filter ink may also include a plurality of types of monomer component m3 in the polymer M molecule.

Including such a monomer component m3 in the polymer M enables the colored portion formed using the color filter ink to be provided with a high degree of flatness. Including the monomer component m3 in the polymer M also makes it possible to provide the color filter ink with excellent discharge stability. Including the monomer component m3 in the polymer M also makes it possible to obtain excellent pigment dispersion stability when the color filter ink includes a pigment, and to provide the color filter ink with excellent storage stability (long-term storability).

Examples of the $C_{16-25}$ hydrocarbon group indicated by $R^5$ include hexadecyl (cetyl), heptadecyl, octadecyl (stearyl), nonadecyl, icosyl, docosyl (behenyl), and other alkyl groups; 10-cyclohexyl decyl, 12-cyclohexyl dodecyl, 14-cyclohexyl tetradecyl, 16-cyclohexyl hexadecyl, and other groups in which an alicyclic hydrocarbon group is bonded with an alkyl group; 10-phenyl decyl, 12-phenyl dodecyl, 14-phenyl tetradecyl, 16-phenyl hexadecyl, and other aralkyl groups; and the like.

Examples of hydrocarbon-substituted oxy groups which may be included in a $C_{16-25}$ hydrocarbon group include methoxy, ethoxy, and other alkoxy groups (e.g., $C_{1-10}$ alkoxy groups); phenoxy groups and other aryloxy groups; cyclohexyloxy groups, dicyclopentanyloxy groups, and other alicyclic hydrocarbon-substituted oxy groups; benzyloxy groups and other aralkyloxy groups; and other $C_{1-15}$ (preferably $C_{1-12}$) hydrocarbon-substituted oxy groups and the like.

Specific examples of the monomer component m3 include cetyl (meth)acrylate, stearyl (meth)acrylate, behenyl (meth)acrylate, and the like.

As described above, the carbon number of the hydrocarbon group (which may have a hydrocarbon-substituted oxy group) of the monomer component m3 that constitutes the polymer M (hereinafter referred to as the carbon number of $R^5$) is 16 to 25, but a carbon number of 16 to 22 is particularly preferred, and a carbon number of 16 to 20 is more preferred. The effects described above can thereby be more significantly demonstrated. In contrast, when the carbon number of $R^5$ is less than the lower limit of the aforementioned range or exceeds the upper limit of the aforementioned range, such excellent effects as those described above are not obtained. A significant characteristic of the present invention is the use of a polymer (polymer M) that includes a monomer component (monomer component m3) provided with a group ($R^5$) having a predetermined carbon number.

The content ratio (calculated in terms of the weight of the monomer used to synthesize the polymer) of the monomer component m3 in the polymer M is preferably 0.5 to 98 wt % (e.g., 2.5 to 70 wt %), more preferably 3 to 50 wt %, and even more preferably 5 to 40 wt %. When the content ratio of the monomer component m3 in the polymer M is within this range, such effects as those described above can be significantly demonstrated without impeding the functions of the above-described monomer components m1, m2 and other components. In contrast, when the content ratio of the monomer component m3 in the polymer M is less than the lower limit of the aforementioned range, the effects of including a monomer component m3 such as those described above may not be adequately demonstrated. When the content ratio of the monomer component m3 in the polymer M exceeds the upper limit of the aforementioned range, the content ratios of the monomer components m1, m2 and other components are correspondingly reduced, and the functions thereof may not be adequately demonstrated. When the polymer M includes a plurality of types of monomer component m3, the sum of the content ratios of the plurality of types of monomer component m3 preferably satisfies such conditions as described above. When the polymer M is a mixture of a plurality of types of compounds, the weighted average value (weighted average value based on weight ratio) of the mixed compounds may be used as the content ratio of the monomer component m3. When the polymer M is a mixture of a plurality of types of compounds, all the compounds preferably contain the monomer component m3 in such a content ratio as described above.

The ratio ($C_{m1}$ (wt %)) of the monomer component m1 and the ratio ($C_{m2}$ (wt %)) of the monomer component m2 in the polymer M preferably satisfy a relationship such as described below. Specifically, $C_{m1}/C_{m2}$ is preferably 2/98 to 98/2, more preferably 20/80 to 95/5, and more preferably 40/60 to 95/5.

The ratio ($C_{m1}$ (wt %)) of the monomer component m1 and the ratio ($C_{m3}$ (wt %)) of the monomer component m3 in the polymer M preferably satisfy a relationship such as described below. Specifically, $C_{m1}/C_{m3}$ is preferably 2/98 to 98/2, more preferably 20/80 to 95/5, and more preferably 40/60 to 95/5.

Examples of the polymer M include compounds indicated by Formula (8) below.

Chemical Formula (8)

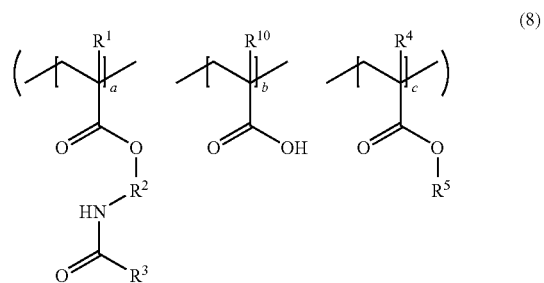

In Formula (8), $R^1$ is a hydrogen atom or a methyl group; $R^2$ is a $C_{1-8}$ bivalent aliphatic saturated hydrocarbon group; $R^3$ is a residue of a blocking agent $R^3H$ of an isocyanate group; $R^4$ is a hydrogen atom or a methyl group; $R^5$ is a $C_{16-25}$ hydrocarbon group which may have a hydrocarbon-substituted oxy group; $R^{10}$ is a hydrogen atom or a methyl group; and a, b, c, and d are each independently an integer of 1 or higher.

Such excellent effects as those described above are obtained by virtue of the fact that the color filter ink contains a polymer M that includes the monomer components m1, m2, and m3, and the above effects are not obtained when one or more of the monomer components m1, m2, and m3 are not included, or when the monomer components m1, m2, and m3 are not included in a single molecule (e.g., in such cases as when the color filter ink does not include the polymer M, and instead includes a polymer composed of only the monomer component m1, a polymer composed of only the monomer component m2, or a polymer composed of only the monomer component m3).

The polymer M may also include a component other than the monomer components m1, m2, and m3 described above. Effects originating from the chemical structure of the other monomer component can thereby be obtained while such characteristics as described above are demonstrated, for example. Examples of the other component include the monomer component m4, monomer component m5, monomer component m6, monomer component m7, and other components such as described below.

Monomer Component m4

The polymer M may contain the monomer component m4 ((meth)acrylic acid ester) indicated by Formula (4) below.

Chemical Formula (4)

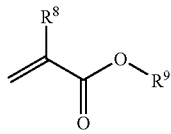

(4)

In Formula (4), $R^8$ is a hydrogen atom or a methyl group; and $R^9$ is a $C_{1-15}$ hydrocarbon group which may have a hydrocarbon-substituted oxy group.

Including the monomer component m4 in the polymer M enables the resin material to be well dissolved in the color filter ink even when the liquid medium described in detail hereinafter is highly hydrophilic, and the colored portion formed using the color filter ink can be provided with excellent transparency.

In the monomer component m4, $R^9$ is a $C_{1-15}$ hydrocarbon group which may have a hydrocarbon-substituted oxy group, but the carbon number of the hydrocarbon group is preferably 1 to 12. Examples of the hydrocarbon group indicated by $R^9$ include methyl, ethyl, propyl, isopropyl, butyl, isobutyl, s-butyl, t-butyl, pentyl, hexyl, octyl, 2-ethylhexyl, decyl, and other alkyl groups; cyclohexyl, dicyclopentanyl, isobornyl, and other alicyclic hydrocarbon groups; phenyl and other aryl groups; benzyl, 1-phenylethyl, 2-phenylethyl, and other aralkyl groups; groups in which two or more of the above-mentioned groups are bonded; and the like.

Examples of hydrocarbon-substituted oxy groups which may be included in a $C_{1-15}$ hydrocarbon group include methoxy, ethoxy, and other alkoxy groups (e.g., $C_{1-10}$ alkoxy groups); phenoxy groups and other aryloxy groups; cyclohexyloxy groups, dicyclopentanyloxy groups, and other alicyclic hydrocarbon-substituted oxy groups; benzyloxy groups and other aralkyloxy groups; and other $C_{1-15}$ (preferably $C_{1-12}$) hydrocarbon-substituted oxy groups and the like.

Specific examples of the monomer component m4 include methyl (meth)acrylate, ethyl (meth)acrylate, butyl (meth)acrylate, 2-ethylhexyl (meth)acrylate, phenyl (meth)acrylate, cyclohexyl (meth)acrylate, dicyclopentanyl (meth)acrylate, dicyclopentanyloxyethyl (meth)acrylate, isobornyl (meth)acrylate, benzyl (meth)acrylate, phenylethyl (meth)acrylate, and the like.

As described above, the carbon number of the hydrocarbon group (which may have a hydrocarbon-substituted oxy group) of the monomer component m4 (hereinafter referred to as the carbon number of $R^9$) is 1 to 15, but a carbon number of 1 to 8 is particularly preferred, and a carbon number of 1 to 4 is more preferred. The effects described above are thereby more significantly demonstrated.

Examples of the polymer M that includes the monomer component m4 such as described above include compounds indicated by Formula (9) below.

Chemical Formula (9)

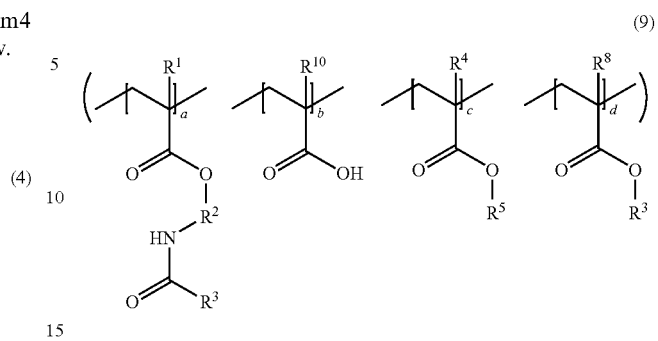

(9)

In Formula (9), $R^1$ is a hydrogen atom or a methyl group; $R^2$ is a $C_{1-8}$ bivalent aliphatic saturated hydrocarbon group; $R^3$ is a residue of a blocking agent $R^3H$ of an isocyanate group; $R^4$ is a hydrogen atom or a methyl group; $R^5$ is a $C_{16-25}$ hydrocarbon group which may have a hydrocarbon-substituted oxy group; $R^8$ is a hydrogen atom or a methyl group; $R^9$ is a $C_{1-15}$ hydrocarbon group which may have a hydrocarbon-substituted oxy group; $R^{10}$ is a hydrogen atom or a methyl group; and a, b, c, and d are each independently an integer of 1 or higher.

Monomer Component m5

The polymer M may contain the monomer component m5, which is an aromatic vinyl compound.

Including the monomer component m5 in the polymer M makes it possible to provide the color filter ink with particularly good discharge stability. The colored portion formed using the color filter ink can also be provided with particularly good transparency (reduction of light transmittance by non-transparency of the resin material is prevented) and particularly good adhesion to a substrate, and the potential for cracking and other problems is reduced.

Specific examples of the monomer component m5 include styrene, α-methyl styrene, vinyl toluene, vinyl naphthalene, vinyl biphenyl, and the like.

Monomer Component m6

The polymer M may contain the monomer component m6, which is a hydroxyl-containing compound.

Including the monomer component m6 in the polymer M makes it possible to obtain particularly good pigment dispersion stability when the color filter ink includes a pigment as the colorant. The curing reaction of the resin material during formation of the colored portion (particularly the curing reaction of a resin material that includes the polymer M as well as at least one type of polymer selected from the group that includes the polymer X, polymer Z, and polymer W such as described in detail hereinafter) can also be made to progress more optimally.

Specific examples of the monomer component m6 include 2-hydroxyethyl (meth)acrylate, hydroxypropyl (meth)acrylate, 2,3-dihydroxybutyl (meth)acrylate, 4-hydroxybutyl (meth)acrylate, 6-hydroxyhexyl (meth)acrylate, 8-hydroxyoctyl (meth)acrylate, and other hydroxyalkyl (meth)acrylates; 4-hydroxymethyl cyclohexyl (meth)acrylate, polyalkylene glycol mono(meth)acrylate, and other monoester compounds of a polyalcohol and acrylic acid or methacrylic acid; compounds in which ε-caprolactone is ring-open polymerized with the abovementioned monoester compounds of a polyalcohol and acrylic acid or methacrylic acid; hydroxyl-containing compounds in which ethylene oxide or propylene oxide is ring-open polymerized; and the like.

Monomer Component m7

The polymer M may also contain the monomer component m7, which is a vinyl compound having a 3- to 5-member cyclic ether group.

Oxirane ring (epoxy group)-containing polymerizable unsaturated compounds, oxetane ring (oxetanyl group)-containing polymerizable unsaturated compounds, and oxolane ring (oxolanyl group)-containing polymerizable unsaturated compounds are included as the monomer component m7 (vinyl compound having a 3- to 5-member cyclic ether group).

Including the monomer component m7 in the polymer M makes it possible to further enhance the adhesion to the substrate, hardness, and other characteristics of the colored portion formed using the color filter ink.

Examples of oxirane ring (epoxy group)-containing polymerizable unsaturated compounds include oxiranyl (meth)acrylate, glycidyl (meth)acrylate, 2-methylglycidyl (meth)acrylate, 2-ethylglycidyl (meth)acrylate, 2-oxiranylethyl (meth)acrylate, 2-glycidyloxyethyl (meth)acrylate, 3-glycidyloxypropyl (meth)acrylate, glycidyloxyphenyl (meth)acrylate, and other polymerizable unsaturated compounds that include an oxirane ring (monocycle) ((meth)acrylic acid ester derivatives and the like); 3,4-epoxycyclohexyl (meth)acrylate, 3,4-epoxycyclohexylmethyl (meth)acrylate, 2-(3,4-epoxycyclohexyl)ethyl (meth)acrylate, 2-(3,4-epoxycyclohexylmethyloxy)ethyl (meth)acrylate, 3-(3,4-epoxycyclohexylmethyloxy)propyl (meth)acrylate, and other polymerizable unsaturated compounds that include a 3,4-epoxycyclohexane ring or other epoxy-containing alicyclic carbon ring ((meth)acrylic acid ester derivatives and the like); 5,6-epoxy-2-bicyclo[2.2.1]heptyl (meth)acrylate and other polymerizable unsaturated compounds that include a 5,6-epoxy-2-bicyclo[2.2.1]heptane ring ((meth)acrylic acid ester derivatives and the like); epoxidized dicyclopentenyl (meth)acrylate, [3,4-epoxytricyclo[5.2.1.0$^{2,6}$]decan-9-yl (meth)acrylate, 3,4-epoxytricyclo[5.2.1.0$^{2,6}$]decan-8-yl (meth)acrylate, or a mixture thereof), epoxidized dicyclopentenyloxyethyl (meth)acrylate (2-(3,4-epoxytricyclo[5.2.1.0$^{2,6}$]decan-9-yloxy)ethyl (meth)acrylate, 2-(3,4-epoxytricyclo[5.2.1.0$^{2,6}$]decan-8-yloxy)ethyl (meth)acrylate, or a mixture thereof), epoxidized dicyclopentenyloxybutyl (meth)acrylate, epoxidized dicyclopentenyloxyhexyl (meth)acrylate, and other polymerizable unsaturated compounds that include a 3,4-epoxytricyclo[5.2.1.0$^{2,6}$]decane ring ((meth)acrylic acid ester derivatives and the like); and the like. Other oxirane ring (epoxy group)-containing polymerizable unsaturated compounds that may be used include vinyl ether compounds that include an epoxy group, aryl ether compounds that include an epoxy group, aromatic vinyl compounds that include an epoxy group, and the like. Examples of aromatic vinyl compounds that include an epoxy group are 4-vinyl benzyl glycidyl ether, 4-vinyl benzyl oxirane, 4-vinyl phenethyl oxirane, and other styrene derivatives.

Examples of oxetane ring (oxetanyl group)-containing polymerizable unsaturated compounds include oxetanyl (meth)acrylate, 3-methyl-3-oxetanyl (meth)acrylate, 3-ethyl-3-oxetanyl (meth)acrylate, (3-methyl-3-oxetanyl)methyl (meth)acrylate, (3-ethyl-3-oxetanyl)methyl (meth)acrylate, 2-(3-methyl-3-oxetanyl)ethyl (meth)acrylate, 2-(3-ethyl-3-oxetanyl)ethyl (meth)acrylate, 2-[(3-methyl-3-oxetanyl)methyloxy]ethyl (meth)acrylate, 2-[(3-ethyl-3-oxetanyl)methyloxy]ethyl (meth)acrylate, 3-[(3-methyl-3-oxetanyl)methyloxy]propyl (meth)acrylate, 3-[(3-ethyl-3-oxetanyl)methyloxy]propyl (meth)acrylate, vinyl ether compounds that include an oxetanyl group, aryl ethyl compounds that include an oxetanyl group, and the like.

Examples of oxolane ring (oxolanyl group)-containing polymerizable unsaturated compounds include tetrahydrofurfuryl (meth)acrylate, vinyl ether compounds that include an oxolanyl group, aryl ether compounds that include an oxolanyl group, and the like.

When the polymer M constituting the color filter ink includes a monomer component m7 such as described above, the 3- to 5-member cyclic ether group (oxirane ring (epoxy group), oxetane ring (oxetanyl group), or oxolane ring (oxolanyl group)) acts as a curable group. The 3- to 5-member cyclic ether group primarily contributes to enhancing chemical resistance (solvent resistance, alkali resistance, and other resistance).

When the polymer M includes the monomer components m1, m2, and m3, as well as at least one type of monomer component selected from the group that includes the monomer components m4, m5, m6, and m7, the total content ratio of the monomer components m4, m5, m6, and m7 in the polymer M is preferably 60 wt % or lower, more preferably 50 wt % or lower, and more preferably 40 wt % or lower. The effects of including the monomer components m4, m5, m6, and m7 are thereby demonstrated while the effects of including the monomer components m1, m2, and m3 described above are adequately demonstrated.

The weight-average molecular weight of the polymer M is preferably 500 to 100,000, more preferably 1,000 to 40,000, and more preferably 2,000 to 30,000. It is thereby possible to provide the color filter manufactured using the color filter ink with particularly good contrast ratio and brightness, and to provide the color filter with particularly good durability. The color filter ink can also be provided with excellent storage stability (long-term stability) and discharge stability, and the formed colored portion can be provided with excellent hardness and other characteristics. The production properties of the color filter ink can also be made particularly good when a manufacturing method such as described hereinafter is used.

The degree of dispersion (Weight-average molecular weight Mw/Number-average molecular weight Mn) of the polymer M is preferably 1 to 3.

The content ratio $C_M$ of the polymer M in the color filter ink is preferably 0.5 to 12 wt %, and more preferably 1.0 to 9.0 wt %.

The resin material includes the polymer M in the present invention as described above, but may also include another resin component (polymer).

A polymer X, polymer Y, polymer Z, and polymer W such as described below may be included as such a resin component (polymer).

Polymer X

The polymer X includes a monomer component x1 indicated by Formula (11) below, a monomer component x3 indicated by Formula (13) below, and a monomer component x4 indicated by Formula (14) below. An example of the polymer X is indicated by Formula (35) below.

Chemical Formula (11)

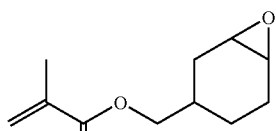
(11)

Chemical Formula (13)

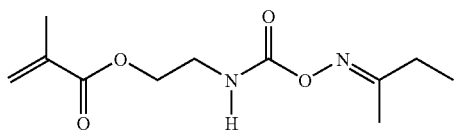
(13)

Chemical Formula (14)

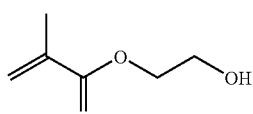
(14)

Chemical Formula (35)

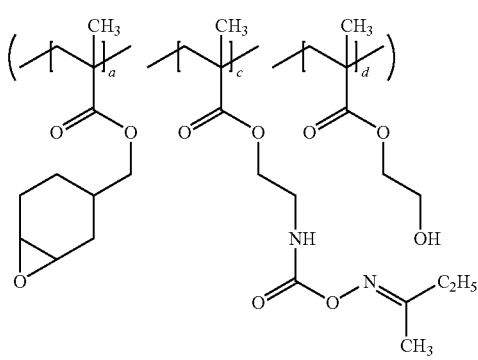
(35)

In Formula (35), a, c, and d are each independently an integer of 1 or higher.

Including such a polymer X makes it possible to provide the colored portion formed using the color filter ink with particularly good solvent resistance and other characteristics, and to obtain a particularly high degree of flatness of the surface of the formed colored portion, while maintaining adequately good curing reaction switching characteristics in the resin material as a whole, and affinity and compatibility between the polymer components in the color filter ink. As a result, unevenness of color and saturation among regions, reduced contrast, and other problems can be more reliably prevented in the color filter manufactured using the color filter ink, and the color filter can be provided with particularly good durability and reliability.

The polymer X may be composed of essentially a single compound, or may be a mixture of a plurality of types of compounds. However, when the polymer X is a mixture of a plurality of types of compounds, each compound contains the monomer components x1, x3, and x4.

Monomer Component x1

The polymer X contains a monomer component x1 indicated by Formula (11) above.

Including such a monomer component x1 enables curing (polymerization) of the resin material to proceed optimally in the colored portion formation step (curing step) performed in a heated environment, while unwanted reaction (polymerization) of the resin material can be reliably prevented from occurring during storage of the color filter ink or in the ink application step and other steps described hereinafter. Specifically, including the monomer component x1 makes it possible to obtain particularly good curing reaction switching characteristics. By including the monomer component x1, the pigment particles can be dispersed in the color filter ink with particularly good stability, for example, and the color filter ink can be provided with excellent long-term storability and discharge stability. Including the monomer component x1 also enables the formed colored portion to be provided with excellent hardness and other characteristics.

The content ratio (which is a value obtained by substitution with the weight of the monomer used to synthesize the polymer) of the monomer compound x1 in the polymer X is preferably 30 to 90 wt %, and more preferably 40 to 80 wt %. When the content ratio of the monomer component x1 in the polymer X is within this range, such effects as those described above can be significantly demonstrated without impeding the functions of the monomer components x2, x3, and x4 described in detail hereinafter. In contrast, when the content ratio of the monomer component x1 in the polymer X is less than the lower limit of the aforementioned range, the effects of including the monomer component x1 may not be adequately demonstrated. When the content ratio of the monomer component x1 in the polymer X exceeds the upper limit of the aforementioned range, the relative content ratios of the monomer components x2, x3, and x4 decrease, and the functions of these monomer components may not be adequately demonstrated. The reaction rate of the polymer X at high temperature also decreases, and it becomes difficult to manufacture color filters with adequately good productivity. When the polymer X is a mixture of a plurality of types of compounds, the weighted average value (weighted average value based on weight ratio) of the mixed compounds may be used as the content ratio of the monomer component x1. When the polymer X is a mixture of a plurality of types of compounds, all of the compounds preferably contain the monomer component x1 in such a content ratio as described above.

Monomer Component x2

The polymer X contains a monomer component x2 indicated by Formula (12) below.

Chemical Formula (12)

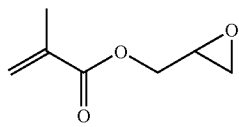
12

Including such a monomer component x2 (particularly with the monomer component x1 described above and the monomer component x3 described in detail hereinafter) enables curing (polymerization) of the resin material to proceed optimally in the colored portion formation step (curing step) performed in a heated environment, while unwanted reaction (polymerization) of the resin material can be reliably prevented from occurring during storage of the color filter ink or in the ink application step and other steps described hereinafter. Particularly in the colored portion formation step (curing step) performed in a heated environment, polymerization of the resin material can be initiated satisfactorily, and polymerization can be made to progress continuously. Including the monomer component x2 also enables the formed colored portion to be provided with excellent hardness and other characteristics.

Examples of the polymer X that includes the monomer component x2 include compounds indicated by Formula (21) below.

Chemical Formula (21)

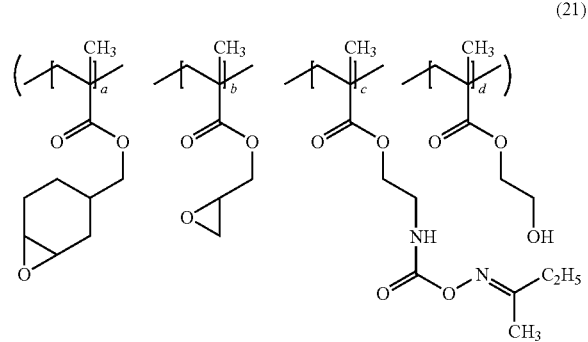

(21)

In Formula (21), a, b, c, and d are each independently an integer of 1 or higher.

The content ratio (which is a value obtained by substitution with the weight of the monomer used to synthesize the polymer) of the monomer compound x2 in the polymer X is preferably 5 to 60 wt %, and more preferably 10 to 50 wt %. When the content ratio of the monomer component x2 in the polymer X is within this range, such effects as those described above can be significantly demonstrated without impeding the functions of the aforementioned monomer component x1 and the monomer components x3 and x4 described in detail hereinafter. In contrast, when the content ratio of the monomer component x2 in the polymer X is less than the lower limit of the aforementioned range, the effects of including the monomer component x2 may not be adequately demonstrated. When the content ratio of the monomer component x2 in the polymer X exceeds the upper limit of the aforementioned range, the relative content ratios of the monomer components x1, x3, and x4 decrease, and the functions of these monomer components may not be adequately demonstrated. The reactivity of the polymer X at relatively low temperatures also increases, and the storage stability of the color filter ink tends to decrease. When the polymer X is a mixture of a plurality of types of compounds, the weighted average value (weighted average value based on weight ratio) of the mixed compounds may be used as the content ratio of the monomer component x2. When the polymer X is a mixture of a plurality of types of compounds, all the compounds preferably contain the monomer component x2 in such a content ratio as described above.

Monomer Component x3

The polymer X contains a monomer component x3 indicated by Formula (13) above.

Including the monomer component x3 also enables the formed colored portion to be provided with excellent chemical resistance, solvent resistance, and other characteristics. It is thereby possible to reliably prevent adverse effects from occurring when chemicals are applied, cleaning is performed (particularly cleaning using N-methyl-2-pyrrolidone, γ-butyrolactone, isopropyl alcohol, hydrochloric acid, aqueous sodium hydroxide, and the like), and other post-treatments are carried out after the colored portion formation step (curing step).

The monomer component x3 has adequately low reactivity at relatively low temperatures (100° C. or lower, for example) in the polymer X, as with the monomer component x1, but exhibits adequate reactivity in a heated environment such as that of the heat treatment performed in the colored portion formation step (curing step). Curing (polymerization) of the resin material can therefore be made to progress optimally in the colored portion formation step (curing step) performed in a heated environment, while unwanted reaction (polymerization) of the resin material can be reliably prevented from occurring during storage of the color filter ink or in the ink application step and other steps.

By including the monomer component x3, the pigment particles can be dispersed in the color filter ink with particularly good stability, for example, and the color filter ink can be provided with particularly good long-term storability and discharge stability.

The content ratio (which is a value obtained by substitution with the weight of the monomer used to synthesize the polymer) of the monomer compound x3 in the polymer X is preferably 2 to 20 wt %, and more preferably 3 to 15 wt %. When the content ratio of the monomer component x3 in the polymer X is within this range, such effects as those described above can be more significantly demonstrated without impeding the functions of the aforementioned monomer components x1, x2 and the monomer component x4 described in detail hereinafter. In contrast, when the content ratio of the monomer component x3 in the polymer X is less than the lower limit of the aforementioned range, the effects of including the monomer component x3 may not be adequately demonstrated. When the content ratio of the monomer component x3 in the polymer X exceeds the upper limit of the aforementioned range, the relative content ratios of the monomer components x1, x2, and x4 decrease, and the functions of these monomer components may not be adequately demonstrated. The colored portion formed using the color filter ink also tends to become too hard, and the conformity thereof to deformation of the substrate or the like due to temperature variation is reduced. When the polymer X is a mixture of a plurality of types of compounds, the weighted average value (weighted average value based on weight ratio) of the mixed compounds may be used as the content ratio of the monomer component x3. When the polymer X is a mixture of a plurality of types of compounds, all the compounds preferably contain the monomer component x3 in such a content ratio as described above.

Monomer Component x4

The polymer X contains a monomer component x4 indicated by Formula (14) above.

Including such a monomer component x4 makes it possible to reliably prevent thixotropy and viscosity of the color filter ink from increasing as the solids concentration increases when the dispersion medium is removed from the color filter ink that has been applied to a substrate during formation of a colored portion, and to prevent unwanted irregularities from forming on the surface of the formed colored portion.

The monomer component x4 has a hydroxyl group at a terminal end thereof. Having such a structure enables reactivity in a heated environment such as that of the heat treatment performed in the colored portion formation step (curing step) to be further increased while the reactivity at relatively low temperatures (100° C. or lower, for example) is kept adequately low. Curing (polymerization) of the resin material can thereby be made to progress more optimally in the colored portion formation step (curing step) performed in a heated environment, while unwanted reaction (polymerization) of the resin material can be reliably prevented from occurring during storage of the color filter ink or in the ink application step and other steps.

By including the monomer component x4, the pigment particles can be dispersed in the color filter ink with particularly good stability, for example, and the color filter ink can be provided with particularly good long-term storability and discharge stability.

The content ratio (which is a value obtained by substitution with the weight of the monomer used to synthesize the polymer) of the monomer compound x4 in the polymer X is preferably 2 to 20 wt %, and more preferably 3 to 15 wt %. When the content ratio of the monomer component x4 in the polymer X is within this range, such effects as those described above can be more significantly demonstrated without impeding the functions of the aforementioned monomer components x1, x2, and x3. In contrast, when the content ratio of the monomer component x4 in the polymer X is less than the lower limit of the aforementioned range, the effects of including the monomer component x4 may not be adequately demonstrated. When the content ratio of the monomer component x4 in the polymer X exceeds the upper limit of the aforementioned range, the relative content ratios of the monomer components x1, x2, and x3 decrease, and the functions of these monomer components may not be adequately demonstrated. The hardness of the colored portion formed using the color filter ink also tends to decrease. When the polymer X is a mixture of a plurality of types of compounds, the weighted average value (weighted average value based on weight ratio) of the mixed compounds may be used as the content ratio of the monomer component x4. When the polymer X is a mixture of a plurality of types of compounds, all the compounds preferably contain the monomer component x4 in such a content ratio as described above.

The polymer X may also include a monomer component (other monomer component) other than the monomer components x1, x2, x3, and x4 described above. Effects originating from the chemical structure of the other monomer component can thereby be obtained while such characteristics as described above are demonstrated, for example.

When the polymer X includes another monomer component (monomer component other than the monomer components x1, x2, x3, and x4), the content ratio of the other monomer component (sum of the content ratios when a plurality of types of other monomer components is included) in the polymer X is preferably 15 wt % or lower, and more preferably 10 wt % or lower.

The weight-average molecular weight of the polymer X is preferably 1,000 to 50,000, more preferably 1,200 to 10,000, and more preferably 1,500 to 5,000. It is thereby possible to obtain particularly good stability over time (long-term storability) of the color filter ink and discharge stability of the color filter ink, to provide the color filter with adequately good production properties, to more reliably provide the colored portion formed using the color filter ink with a high degree of flatness, and to more effectively prevent uneven color or other adverse effects from occurring in the image displayed using the color filter.

The degree of dispersion (Weight-average molecular weight Mw/Number-average molecular weight Mn) of the polymer X is preferably 1 to 3.

Polymer Y

The polymer Y includes a monomer component y1 indicated by Formula (15) below. An example of the polymer Y is indicated by Formula (36) below.

Chemical Formula (15)

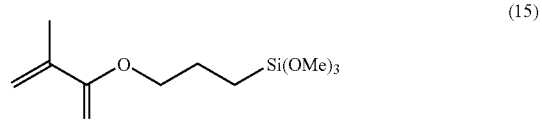

(15)

Chemical Formula (36)

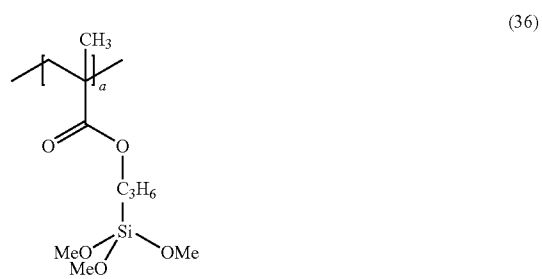

(36)

In Formula (36), a is an integer of 1 or higher.

Including such a polymer Y makes it possible to provide the colored portion formed using the color filter ink with particularly good adhesion to a substrate, and to provide the manufactured color filter with particularly good durability and reliability while the color filter ink is provided with excellent discharge stability, excellent dispersion stability of the pigment, and other characteristics.

The polymer Y may be composed of essentially a single compound, or may be a mixture of a plurality of types of compounds. However, when the polymer Y is a mixture of a plurality of types of compounds, each compound contains the monomer component y1.

Monomer Component y1

The polymer Y contains the monomer component y1 indicated by Formula (15) above.

Including such a monomer component y1 enables the formed colored portion to be provided with particularly good adhesion to a substrate. As a result, the color filter can be provided with particularly good durability.

The content ratio (which is a value obtained by substitution with the weight of the monomer used to synthesize the polymer) of the monomer compound y1 in the polymer Y is preferably 30 to 90 wt %, and more preferably 40 to 80 wt %. When the content ratio of the monomer component y1 in the polymer Y is within this range, such effects as those described above can be more significantly demonstrated without impeding the functions of the monomer component y2 described in detail hereinafter, when the polymer Y includes the monomer component y2, for example. In contrast, when the content ratio of the monomer component y1 in the polymer Y is less than the lower limit of the aforementioned range, the effects of including the monomer component y1 may not be adequately demonstrated. When the content ratio of the monomer component y1 in the polymer Y exceeds the upper limit of the aforementioned range, the relative content ratio of the monomer component y2 decreases, and the function of the monomer component y2 may not be adequately demonstrated when the polymer Y includes the monomer component y2, for example. The viscosity of the color filter ink also tends to increase in conjunction with an increase in solids concentration when the liquid medium is removed from the color filter ink applied to the substrate during formation of the colored portion, and unwanted irregularities are prone to occur on the surface of the formed colored portion. When the polymer Y is a mixture of a plurality of types of compounds, the weighted average value (weighted average value based on weight ratio) of the mixed compounds may be used as the content ratio of the monomer component y1. When the polymer Y is a mixture of a plurality of types of compounds, all the compounds preferably contain the monomer component y1 in such a content ratio as described above.

Monomer Component y2

The polymer Y contains the monomer component y2 indicated by Formula (16) below.

Chemical Formula (16)

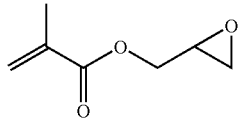

(16)

Including such a monomer component y2 (particularly with the monomer component y1 described above) enables curing (polymerization) of the resin material to proceed optimally in the colored portion formation step (curing step) performed in a heated environment, while unwanted reaction (polymerization) of the resin material can be reliably prevented from occurring during storage of the color filter ink or in the ink application step and other steps described hereinafter. Particularly in the colored portion formation step (curing step) performed in a heated environment, polymerization of the resin material can be initiated satisfactorily, and polymerization can be made to progress continuously. Including the monomer component y2 also enables the formed colored portion to be provided with excellent hardness and other characteristics.

Including the monomer component y2 in the polymer Y also enables the polymer Y to have adequately good affinity and compatibility with the polymer M, polymer X, and other polymers. As a result, the color filter ink can be provided with excellent discharge stability, and the colored portion formed using the color filter ink can be provided with excellent transparency (reduction of light transmittance by non-transparency of the resin material is prevented) and particularly good adhesion to a substrate, and the potential for cracking and other problems is reduced. In contrast, when the monomer component y2 is not included, the polymer Y cannot be provided with adequately good affinity and compatibility with the polymer M, polymer X, and other polymers, the color filter ink has inferior discharge stability, the manufactured color filter is prone to have uneven color and saturation, and contrast, durability, reliability, and other characteristics are adversely affected.

An example of the polymer Y that contains the monomer component y2 is indicated by Formula (22) below.

Chemical Formula (22)

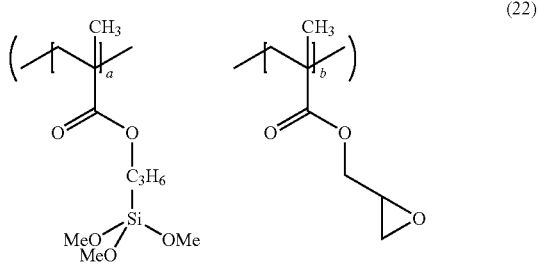

(22)

In Formula (22), a and b are each independently an integer of 1 or higher.

The content ratio (which is a value obtained by substitution with the weight of the monomer used to synthesize the polymer) of the monomer compound y2 in the polymer Y is preferably 10 to 70 wt %, and more preferably 20 to 60 wt %. When the content ratio of the monomer component y2 in the polymer Y is within this range, such effects as those described above can be more significantly demonstrated without impeding the functions of the aforementioned monomer component y1. In contrast, when the content ratio of the monomer component y2 in the polymer Y is less than the lower limit of the aforementioned range, the effects of including the monomer component y2 may not be adequately demonstrated. When the content ratio of the monomer component y2 in the polymer Y exceeds the upper limit of the aforementioned range, the relative content ratio of the monomer component y1 decreases, and the function of the monomer component y1 may not be adequately demonstrated. The reactivity of the polymer Y at relatively low temperature also increases, and the storage stability of the color filter ink tends to decrease. When the polymer Y is a mixture of a plurality of types of compounds, the weighted average value (weighted average value based on weight ratio) of the mixed compounds may be used as the content ratio of the monomer component y2. When the polymer Y is a mixture of a plurality of types of compounds, all the compounds preferably contain the monomer component y2 in such a content ratio as described above.

The polymer Y may also include a monomer component (other monomer component) other than the monomer components y1 and y2 described above. Effects originating from the chemical structure of the other monomer component can thereby be obtained while such characteristics as described above are demonstrated, for example.

When the polymer Y includes another monomer component (monomer component other than the monomer components y1 and y2), the content ratio of the other monomer component (sum of the content ratios when a plurality of types of other monomer components is included) in the polymer Y is preferably 15 wt % or lower, and more preferably 10 wt % or lower.

The weight-average molecular weight of the polymer Y is preferably 1,000 to 50,000, more preferably 1,200 to 10,000, and more preferably 1,500 to 5,000. It is thereby possible to obtain particularly good stability over time (long-term storability) of the color filter ink and discharge stability of the color filter ink, to provide the color filter with adequately good production properties, to more reliably provide the colored portion formed using the color filter ink with a high degree of flatness, and to more effectively prevent uneven color and the like from occurring in the image displayed using the color filter.

The degree of dispersion (Weight-average molecular weight Mw/Number-average molecular weight Mn) of the polymer Y is preferably 1 to 3.

Polymer Z

The polymer Z includes a monomer component z1 indicated by Formula (23) below, a monomer component z2 indicated by Formula (24) below, and a monomer component z3 indicated by Formula (25) below. An example of the polymer Z is indicated by Formula (26) below.

Chemical Formula (23)

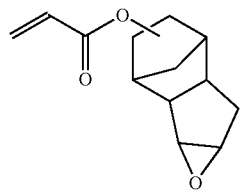

(23)

Chemical Formula (24)

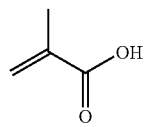

(24)

Chemical Formula (25)

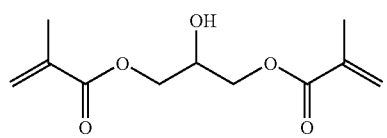

(25)

Chemical Formula (26)

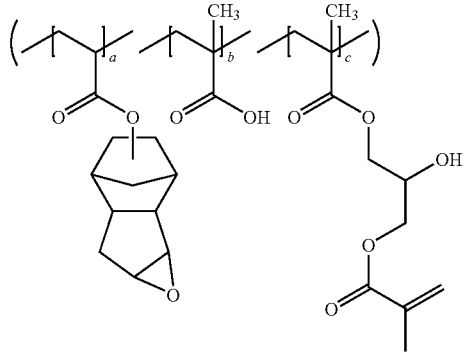

(26)

In Formula (26), a, b, and c are each independently an integer of 1 or higher.

Including such a polymer Z makes it possible to obtain particularly good curing reaction switching characteristics of the resin material, discharge stability of the color filter ink, and hardness and other characteristics of the formed colored portion, and to disperse the pigment in the color filter ink with particularly good stability when a pigment is included as the colorant. Including the polymer Z also makes it possible to more effectively prevent unwanted irregularities from occurring on the surface of the colored portion formed using the color filter ink, and to more effectively prevent uneven color and saturation, or reduced contrast ratio in the image displayed using the color filter. Including the polymer Z also makes it possible to more easily form fine particles (break up) from aggregates of the pigment particles used as a starting material, and to further enhance productivity of the color filter ink when a manufacturing method such as described hereinafter is used to manufacture the color filter ink (in the fine-dispersion step described hereinafter). Since the polymer Z has extremely high stability with respect to mechanical forces, even when the polymer Z is subjected to the fine-dispersion step described hereinafter along with the pigment, change in qualities and degradation are prevented from occurring in the fine-dispersion step. Consequently, by using the polymer Z, a color filter ink having excellent dispersion properties of the pigment can be more efficiently prepared while degradation and the like of the resin material is reliably prevented.

The polymer Z may be composed of essentially a single compound, or may be a mixture of a plurality of types of compounds. However, when the polymer Z is a mixture of a plurality of types of compounds, the compounds contain the monomer components z1, z2, and z3.

Monomer Component z1

The polymer Z contains the monomer component z1 indicated by Formula (23) above.

Including such a monomer component z1 enables curing (polymerization) of the resin material to proceed more optimally in the colored portion formation step (curing step) performed in a heated environment, while unwanted reaction (polymerization) of the resin material can be reliably prevented from occurring during storage of the color filter ink or in the ink application step and other steps described hereinafter. Specifically, the resin material can be provided with particularly good curing reaction switching characteristics. By including the monomer component z1, the pigment particles can be dispersed in the color filter ink with particularly good stability, and the color filter ink can be provided with particularly good long-term storability and discharge stability. The monomer component z1 has excellent reactivity in high-temperature environments, as well as extremely high stability with respect to mechanical force in the polymer Z. Therefore, even when, for example, the monomer component z1 is subjected to the fine-dispersion step described hereinafter along with the pigment, change in qualities and degradation of the polymer Z in this step are prevented, and the function of the polymer Z can be reliably demonstrated in the color filter ink. Including the monomer component z1 also enables the formed colored portion to be provided with excellent hardness and other characteristics.

Including the monomer component z1 in the polymer Z also enables the polymer Z, polymer M, and other polymers to have adequately good affinity and compatibility. As a result, the color filter ink can be provided with excellent discharge stability, and the colored portion formed using the color filter ink can be provided with excellent transparency (reduction of light transmittance by non-transparency of the resin material is prevented) and particularly good adhesion to a substrate, and the potential for cracking and other problems is reduced.

The content ratio (which is a value obtained by substitution with the weight of the monomer used to synthesize the polymer) of the monomer compound z1 in the polymer Z is preferably 50 to 95 wt %, and more preferably 60 to 85 wt %. When the content ratio of the monomer component z1 in the polymer Z is within this range, such effects as those described above can be more significantly demonstrated without impeding the functions of the monomer components z2 and z3 described in detail hereinafter. When the polymer Z is a mixture of a plurality of types of compounds, the weighted average value (weighted average value based on weight ratio) of the mixed compounds may be used as the content ratio of the monomer component z1. When the polymer Z is a mixture of a plurality of types of compounds, all of the compounds preferably contain the monomer component z1 in such a content ratio as described above.

Monomer Component z2

The polymer Z contains the monomer component z2 indicated by Formula (24) above.

Including such a monomer component z2 makes it possible for the color filter ink to spread satisfactorily on the substrate, and makes it possible to reliably prevent the entrainment of bubbles and other adverse events and satisfactorily form a colored portion that has excellent adhesion to the substrate. When the color filter ink includes a pigment and a dispersing agent, including the monomer component z2 makes it possible to obtain particularly good dispersion stability not only of the pigment, but also of the dispersing agent, and as a result, particularly good dispersion stability of the pigment and long-term storability of the color filter ink can be obtained.

The content ratio (calculated in terms of the weight of the monomer used to synthesize the polymer) of the monomer component z2 in the polymer Z is preferably 3 to 35 wt %, and more preferably 10 to 25 wt %. When the content ratio of the monomer component z2 in the polymer Z is within this range, such effects as those described above can be more significantly demonstrated without impeding the functions of the aforementioned monomer component z1 and the monomer component z3 described in detail hereinafter. When the polymer Z is a mixture of a plurality of types of compounds, the weighted average value (weighted average value based on weight ratio) of the mixed compounds may be used as the content ratio of the monomer component z2. When the polymer Z is a mixture of a plurality of types of compounds, all of the compounds preferably contain the monomer component z2 in such a content ratio as described above.

Monomer Component z3

The polymer Z contains the monomer component z3 indicated by Formula (25) above.

Such a monomer component z3 is a component that contributes to curing of the resin material in the colored portion formation step (curing step) described hereinafter, in the same manner as the aforementioned monomer components x1, x2, z1, and other components, but the monomer components x1, x2, and z1 have the function of providing the formed colored portion with a high degree of hardness, whereas the monomer component z3 has the functions of imparting an appropriate degree of flexibility to the formed colored portion and enabling the colored portion to conform to deformation of the substrate and maintain adhesion to the substrate or the like even when deformation (thermal expansion, thermal contraction, and the like) occurs in the substrate or the like to which the colored portion is provided. Satisfactory adhesion can thereby be maintained even when the manufactured color filter is repeatedly exposed to sudden temperature changes that accompany image display, for example, and light leakage (white spots, bright spots) and other problems can be more reliably prevented. Specifically, the color filter can be provided with particularly good durability.

The monomer component z3 has adequately low reactivity at relatively low temperatures (100° C. or lower, for example) in the polymer Z, but exhibits adequate reactivity in a heated environment such as that of the heat treatment performed in the colored portion formation step (curing step). Curing (polymerization) of the resin material can therefore be made to progress optimally in the colored portion formation step (curing step) performed in a heated environment, while unwanted reaction (polymerization) of the resin material can be reliably prevented from occurring during storage of the color filter ink or in the ink application step and other steps described hereinafter.

Including such a monomer component z3 makes it possible to reliably prevent thixotropy and viscosity of the color filter ink from increasing as the solids concentration increases when the liquid medium is removed from the color filter ink that has been applied to a substrate during formation of a colored portion, and to reliably prevent unwanted irregularities from forming on the surface of the formed colored portion.

The content ratio (calculated in terms of the weight of the monomer used to synthesize the polymer) of the monomer component z3 in the polymer Z is preferably 2 to 30 wt %, and more preferably 5 to 20 wt %. When the content ratio of the monomer component z3 in the polymer Z is within this range, such effects as those described above can be more significantly demonstrated without impeding the functions of the aforementioned monomer components z1, z2. When the polymer Z is a mixture of a plurality of types of compounds, the weighted average value (weighted average value based on weight ratio) of the mixed compounds may be used as the content ratio of the monomer component z3. When the polymer Z is a mixture of a plurality of types of compounds, all of the compounds preferably contain the monomer component z3 in such a content ratio as described above.

The weight-average molecular weight of the polymer Z is preferably 5,000 to 50,000, and more preferably 6,000 to 15,000. It is thereby possible to obtain particularly good stability over time (long-term storability) of the color filter ink and discharge stability of the color filter ink, to provide the color filter with adequately good production properties, to more reliably provide the colored portion formed using the color filter ink with a high degree of flatness, and to more effectively prevent uneven color and other adverse events from occurring in the image displayed using the color filter.

The degree of dispersion (Weight-average molecular weight Mw/Number-average molecular weight Mn) of the polymer Z is preferably 1 to 3.

Polymer W

The polymer W contains a monomer component w1 indicated by Formula (27) below, a monomer component w2 indicated by Formula (28) below, a monomer component w3 indicated by Formula (29) below, and a monomer component w4 indicated by Formula (30) below. An example of the polymer W is indicated by Formula (31) below.

Chemical Formula (27)

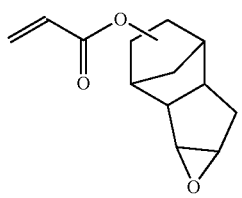
(27)

Chemical Formula (28)

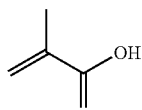
(28)

Chemical Formula (29)

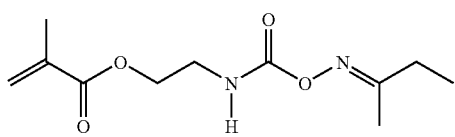
(29)

Chemical Formula (30)

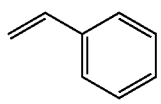
(30)

Chemical Formula (31)

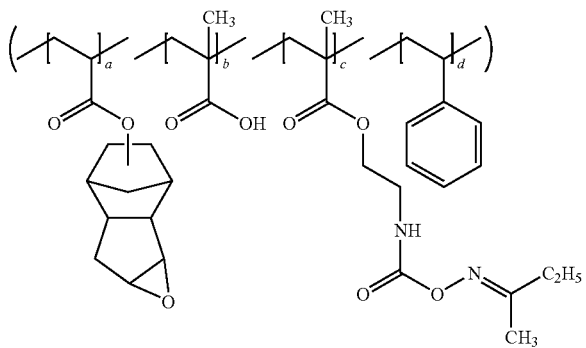
(31)

In Formula (31), a, b, c, and d are each independently an integer of 1 or higher.

Including such a polymer W makes it possible to obtain particularly good curing reaction switching characteristics of the resin material, discharge stability of the color filter ink, and hardness and other characteristics of the formed colored portion, and to disperse the pigment in the color filter ink with particularly good stability when a pigment is included as the colorant. Including the polymer W also makes it possible to more effectively prevent unwanted irregularities from occurring on the surface of the colored portion formed using the color filter ink, and to more effectively prevent uneven color and saturation, or reduced contrast ratio in the image displayed using the color filter. Including the polymer W also makes it possible to more easily form fine particles (break up) from aggregates of the pigment particles used as a starting material, and to further enhance productivity of the color filter ink when a manufacturing method such as described hereinafter is used to manufacture the color filter ink (in the fine-dispersion step described hereinafter). Since the polymer W has extremely high stability with respect to mechanical forces, even when the polymer W is subjected to the fine-dispersion step described hereinafter along with the pigment, change in qualities and degradation are prevented from occurring in the fine-dispersion step. Consequently, by using the polymer W, a color filter ink having excellent dispersion properties of the pigment can be more efficiently prepared while degradation and the like of the resin material is reliably prevented.

The polymer W may be composed of essentially a single compound, or may be a mixture of a plurality of types of compounds. However, when the polymer W is a mixture of a plurality of types of compounds, the compounds contain the monomer components w1, w2, w3, and w4.

Monomer Component w1

The polymer W contains a monomer component w1 indicated by Formula (27) above.

Including such a monomer component w1 enables curing (polymerization) of the resin material to proceed more optimally in the colored portion formation step (curing step) performed in a heated environment, while unwanted reaction (polymerization) of the resin material can be reliably prevented from occurring during storage of the color filter ink or in the ink application step and other steps described hereinafter. Specifically, the resin material can be provided with particularly good curing reaction switching characteristics. By including the monomer component w1, the pigment particles can be dispersed in the color filter ink with particularly good stability, and the color filter ink can be provided with particularly good long-term storability and discharge stability. The monomer component w1 has excellent reactivity in high-temperature environments, as well as extremely high stability with respect to mechanical force in the polymer W. Therefore, even when, for example, the monomer component w1 is subjected to the fine-dispersion step described hereinafter along with the pigment, change in qualities and degradation of the polymer W in this step are prevented, and the function of the polymer W can be reliably demonstrated in the color filter ink. Including the monomer component w1 also enables the formed colored portion to be provided with excellent hardness and other characteristics.

Including the monomer component w1 in the polymer W also enables the polymer W, polymer M, and other polymers to have adequately good affinity and compatibility. As a result, the color filter ink can be provided with excellent discharge stability, and the colored portion formed using the color filter ink can be provided with excellent transparency (reduction of light transmittance by non-transparency of the resin material is prevented) and particularly good adhesion to a substrate, and the potential for cracking and other problems is reduced.

The content ratio (calculated in terms of the weight of the monomer used to synthesize the polymer) of the monomer component w1 in the polymer W is preferably 25 to 75 wt %, and more preferably 40 to 60 wt %. When the content ratio of the monomer component w1 in the polymer W is within this range, such effects as those described above can be more significantly demonstrated without impeding the functions of the monomer components w2, w3, and w4 described in detail hereinafter. When the polymer W is a mixture of a plurality of types of compounds, the weighted average value (weighted average value based on weight ratio) of the mixed compounds may be used as the content ratio of the monomer component w1. When the polymer W is a mixture of a plurality of types of compounds, all the compounds preferably contain the monomer component w1 in such a content ratio as described above.

Monomer Component w2

The polymer W contains a monomer component w2 indicated by Formula (28) above.

Including such a monomer component w2 enables the color filter ink to satisfactorily spread onto the substrate, reliably prevents entrainment of air bubbles and other problems, and enables a colored portion having excellent adhesion to the substrate to be suitably formed. When the color filter ink includes a pigment and a dispersing agent, including the monomer component w2 brings about particularly good dispersion stability of the dispersing agent. As a result, particularly good pigment dispersion stability and long-term storability of the color filter ink can be obtained.

The content ratio (calculated in terms of the weight of the monomer used to synthesize the polymer) of the monomer component w2 in the polymer W is preferably 2 to 25 wt %, and more preferably 5 to 15 wt %. When the content ratio of the monomer component w2 in the polymer W is within this range, such effects as those described above can be significantly demonstrated without impeding the functions of the previously described monomer component w1 and the monomer components w3 and w4 described in detail hereinafter. When the polymer W is a mixture of a plurality of types of compounds, the weighted average value (weighted average value based on weight ratio) of the mixed compounds may be used as the content ratio of the monomer component w2. When the polymer W is a mixture of a plurality of types of compounds, all the compounds preferably contain the monomer component w2 in such a content ratio as described above.

Monomer Component w3

The polymer W contains a monomer component w3 indicated by Formula (29) above.

Including the monomer component w3 enables the formed colored portion to be provided with excellent chemical resistance, solvent resistance, and other characteristics. It is thereby possible to reliably prevent adverse effects from occurring when chemicals are applied, cleaning is performed (particularly cleaning using N-methyl-2-pyrrolidone, γ-butyrolactone, isopropyl alcohol, hydrochloric acid, aqueous sodium hydroxide, and the like), and other post-treatments are carried out after the colored portion formation step (curing step).

The monomer component w3 has adequately low reactivity at relatively low temperatures (100° C. or lower, for example) in the polymer W, but exhibits adequate reactivity in a heated environment such as that of the heat treatment performed in the colored portion formation step (curing step). Curing (polymerization) of the resin material can therefore be made to progress optimally in the colored portion formation step (curing step) performed in a heated environment, while unwanted reaction (polymerization) of the resin material can be reliably prevented from occurring during storage of the color filter ink or in the ink application step and other steps.

By including the monomer component w3, the pigment particles can be dispersed in the color filter ink with particularly good stability when the color filter ink includes a pigment as the colorant, for example, and the color filter ink can be provided with particularly good long-term storability and discharge stability.

The content ratio (which is a value obtained by substitution with the weight of the monomer used to synthesize the polymer) of the monomer compound w3 in the polymer W is preferably 5 to 50 wt %, and more preferably 10 to 40 wt %. When the content ratio of the monomer component w3 in the polymer W is within this range, such effects as those described above can be significantly demonstrated without impeding the functions of the previously described monomer components w1, w2 and the monomer component w4 described in detail hereinafter. When the polymer W is a mixture of a plurality of types of compounds, the weighted average value (weighted average value based on weight ratio) of the mixed compounds may be used as the content ratio of the monomer component w3. When the polymer W is a mixture of a plurality of types of compounds, all the compounds preferably contain the monomer component w3 in such a content ratio as described above.

Monomer Component w4

The polymer W contains a monomer component w4 indicated by Formula (30) above.

Including such a monomer component w4 makes it possible to reliably prevent thixotropy and viscosity of the color filter ink from increasing as the solids concentration increases when the dispersion medium is removed from the color filter ink that has been applied to a substrate during formation of a colored portion, and to prevent unwanted irregularities from forming on the surface of the formed colored portion.

Including the monomer component w4 enables the hydrophobic properties of the resin overall to be satisfactorily adjusted, and particularly good affinity and compatibility to be obtained in the polymers that constitute the resin material. As a result, the color filter ink can be provided with particularly good discharge stability, and the colored portion formed using the color filter ink can be provided with excellent transparency (reduction of light transmittance by non-transparency of the resin material is prevented) and particularly good adhesion to a substrate, and the potential for cracking and other problems is reduced.

The content ratio (which is a value obtained by substitution with the weight of the monomer used to synthesize the polymer) of the monomer compound w4 in the polymer W is preferably 3 to 40 wt %, and more preferably 5 to 30 wt %. When the content ratio of the monomer component w4 in the polymer W is within this range, such effects as those described above can be more significantly demonstrated without impeding the functions of the previously described monomer components w1, w2 and w3. When the polymer W is a mixture of a plurality of types of compounds, the weighted average value (weighted average value based on weight ratio) of the mixed compounds may be used as the content ratio of the monomer component w4. When the polymer W is a mixture of a plurality of types of compounds, all the compounds preferably contain the monomer component w4 in such a content ratio as described above.

The weight-average molecular weight of the polymer W is preferably 5,000 to 50,000, more preferably 6,000 to 15,000. It is thereby possible to obtain particularly good stability of the color filter ink over time (long-term storability) and discharge stability of the color filter ink, to provide the color filter with adequately good production properties, to more reliably provide the colored portion formed using the color filter ink with a high degree of flatness, and to more effectively prevent uneven color and the like from occurring in the image displayed using the color filter.

The degree of dispersion (Weight-average molecular weight Mw/Number-average molecular weight Mn) of the polymer W is preferably 1 to 3.

It is sufficient insofar as the polymers described above ultimately have a structure such as described above (partial structure corresponding to the monomer components), and the polymers described above may be synthesized using the monomer components as such described above, or may be synthesized using different components (precursors, derivatives, and the like) than the monomer components described above.

The content ratio of the resin material in the color filter ink is preferably 0.5 to 18 wt %, more preferably 1 to 15 wt %, and more preferably 3 to 12 wt %.

The relationship $0.2 \leq C_R/C_C \leq 9.0$ is preferably satisfied, the relationship $0.3 \leq C_R/C_C \leq 5.0$ is more preferably satisfied, and the relationship $0.4 \leq C_R/C_C \leq 3.5$ is even more preferably satisfied, wherein $C_R$ (wt %) is the content ratio of the resin material in the color filter ink, and $C_C$ (wt %) is the content ratio of the pigment in the color filter ink. Satisfying such a relationship enables the manufactured color filter to be provided with more excellent contrast and other characteristics, and adequate contrast to be maintained even when the thickness of the colored portion is reduced. In the conventional color filter ink, unwanted irregularities and other defects on the surface of the formed colored portion are prone to occur when the content ratio of the resin material is low with respect to the content ratio of the pigment (particularly when a pigment is used as the colorant), but in the present invention, unwanted irregularities can be reliably prevented from occurring on the surface of the formed colored portion even when the content ratio of the resin material is low with respect to the content ratio of the pigment, as described above. Specifically, satisfying a relationship such as described above causes the effects of the present invention to be more significantly demonstrated.

The resin material constituting the color filter ink may also include a polymer other than those described above (e.g., a thermoplastic polymer or a curable polymer other than the polymers W, X, Y, Z described above).

Liquid Medium

The liquid medium (liquid vehicle) has the function of dissolving and/or dispersing the colorant such as described above. Specifically, the liquid medium functions as a solvent and/or dispersion medium. Most of the liquid medium is usually removed in the process of manufacturing the color filter.

Ester compounds, ether compounds, hydroxyketones, carbonic diesters, cyclic amide compounds, and the like, for example, may be used as the liquid medium that constitutes the color filter ink, preferred among which are (1) ethers (polyalcohol ethers) as condensates of polyalcohols (e.g., ethylene glycol, propylene glycol, butylene glycol, glycerin, and the like); alkyl ethers (e.g., methyl ether, ethyl ether, butyl ether, hexyl ether, and the like) of polyalcohols or polyalcohol ethers; and esters (e.g., formate, acetate, propionate, and the like); (2) esters (e.g., methyl esters and the like) of polycarboxylic acids (e.g., succinic acid, glutamic acid, and the like); (3) ethers, esters, and the like of compounds (hydroxy acids) having at least one hydroxyl group and at least one carboxyl group in the molecule thereof; and (4) carbonic diesters having a chemical structure such as that obtained by reaction of a polyalcohol and a phosgene. Examples of compounds that can be used as the liquid medium include 2-(2-methoxy-1-methylethoxy)-1-methyl ethyl acetate, triethylene glycol dimethyl ether, triethylene glycol diacetate, diethylene glycol monoethyl ether acetate, 4-methyl-1,3-dioxolan-2-one, bis(2-butoxyethyl)ether, dimethyl glutarate, ethylene glycol di-n-butyrate, 1,3-butylene glycol diacetate, diethylene glycol monobutyl ether acetate, tetraethylene glycol dimethyl ether, 1,6-diacetoxyhexane, tripropylene glycol monomethyl ether, butoxypropanol, diethylene glycol methyl ethyl ether, diethylene glycol methyl butyl ether, triethylene glycol methyl ethyl ether, triethylene glycol methyl butyl ether, dipropylene glycol monomethyl ether acetate, diethylene glycol dimethyl ether, diethylene glycol ethyl methyl ether, 3-methoxybutyl acetate, diethylene glycol diethyl ether, ethyl octanoate, ethylene glycol monobutyl ether acetate, ethylene glycol monobutyl ether, cyclohexyl acetate, diethyl succinate, ethylene glycol diacetate, propylene glycol diacetate, 4-hydroxy-4-methyl-2-pentanone, dimethyl succinate, 1-butoxy-2-propanol, diethylene glycol monoethyl ether, diethylene glycol monomethyl ether, dipropylene glycol monomethyl ether, 3-methoxy-n-butyl acetate, diacetin, dipropylene glycol mono n-propyl ether, polyethylene glycol monomethyl ether, butyl glycolate, ethylene glycol monohexyl ether, dipropylene glycol mono n-butyl ether, N-methyl-2-pyrrolidone, triethylene glycol butyl methyl ether, bis(2-propoxyethyl)ether, diethylene glycol diacetate, diethylene glycol butyl methyl ether, diethylene glycol butyl ethyl ether, diethylene glycol butyl propyl ether, diethylene glycol ethyl propyl ether, diethylene glycol methyl propyl ether, diethylene glycol propyl ether acetate, triethylene glycol methyl ether acetate, triethylene glycol ethyl ether acetate, triethylene glycol propyl ether acetate, triethylene glycol butyl ether acetate, triethylene glycol butyl ethyl ether, triethylene glycol ethyl methyl ether, triethylene glycol ethyl propyl ether, triethylene glycol methyl propyl ether, dipropylene glycol methyl ether acetate, n-nonyl alcohol, diethylene glycol monobutyl ether, triethylene glycol monomethyl ether, ethylene glycol 2-ethylhexyl ether, triethylene glycol monoethyl ether, diethylene glycol monohexyl ether, triethylene glycol monobutyl ether, diethylene glycol mono-2-ethylhexyl ether, tripropylene glycol mono n-butyl ether, butyl cellosolve acetate, and the like, and one or more types of compounds selected from the above examples may be combined and used.

Among these examples, the liquid medium preferably includes one or more types of compounds selected from the group that includes 1,3-butylene glycol diacetate, bis(2-butoxyethyl)ether, 2-(2-methoxy-1-methylethoxy)-1-methylethyl acetate, and diethylene glycol monobutyl ether acetate. The polymer M can thereby be more uniformly dissolved in the color filter ink, the color filter ink can be provided with particularly good discharge stability, and particularly good contrast ratio and brightness can be obtained in the image displayed using the manufactured color filter. When the color filter ink includes a pigment as the colorant, the pigment particles can be dispersed with particularly good stability in the color filter ink. There is also relatively minimal variation in the physical properties of the color filter ink even when the color filter ink includes relatively large quantities of the colorant, the resin material, and other components. When the liquid medium is composed of such compounds as described above, the color filter ink can be reliably made to spread into the entire cell in the method for manufacturing a color filter such as described hereinafter.

When the liquid medium includes diethylene glycol monobutyl ether acetate among the examples given above, the color filter ink can be provided with a particularly low viscosity and particularly good discharge stability of droplets of the color filter ink. Since the color filter ink instantly spreads into the corners on the substrate, the thickness of the formed colored portion can be made more uniform, and particularly good color reproduction properties and depolarization properties (contrast ratio) can be obtained. Suitable solubility of water in the liquid medium can be obtained when the liquid medium includes diethylene glycol monobutyl ether acetate. The liquid medium that constitutes the color filter ink can therefore be reliably prevented from absorbing moisture from the outside. Water can also be suitably dissolved and removed even when water penetrates into the flow path or the like of the color filter ink in the droplet discharge device. As a result, particularly good discharge stability (e.g., uniformity of the droplet discharge quantity) of droplets of the color filter ink from the droplet discharge head can be obtained over a longer period of time.

When the liquid medium includes bis(2-butoxyethyl)ether and 1,3-butylene glycol diacetate among the examples described above, the color filter ink is extremely resistant to drying in the vicinity of the nozzles, and flight deflection in the ink application step is more effectively suppressed. In the flushing step performed to periodically discharge a small quantity of color filter ink to prevent nozzle blockage, the color filter ink can be prevented from drying in the vicinity of the nozzles during long-distance head movement, and dummy pixels or other waste areas provided in the substrate are no longer necessary. Since the ink does not easily dry, degradation, aggregation, and segregation of the colorant, resin, and other components can also be more reliably prevented.

Suitable solubility of water in the liquid medium can be obtained particularly when the liquid medium includes 1,3-butylene glycol diacetate. Water can therefore be suitably dissolved, and the color filter ink can move within the flow path while fluidity and dispersion stability are maintained, even when some moisture has penetrated into the inside of the flow path or the like of color filter ink in the droplet discharge device, while the liquid medium constituting the color filter ink is reliably prevented from absorbing excessive amounts of moisture from the outside.

Among examples (1) through (4) above, a compound of (1) is preferred, and a compound having a propylene glycol backbone and alkoxy groups at both terminal ends thereof is particularly suitable for use as the liquid medium. Through the use of such a compound, the color filter ink can be provided with particularly good discharge stability of droplets; unevenness of color, saturation, and the like in regions of the manufactured color filter can be more effectively suppressed, and the color filter can be provided with particularly good uniformity of characteristics between individual units. Particularly when the color filter ink includes a pigment as the colorant, because of the chemical structural interaction between the aforementioned compounds and the resin material such as previously described, the resin material can be unevenly distributed on the surfaces of the pigment particles in the color filter ink, particularly good discharge stability of droplets can be obtained, the dispersion stability of the pigment particles in the color filter ink can be made particularly good, and the color filter ink can be provided with particularly good long-term storage properties while the dissolving properties of the resin material such as previously described are made adequately good. The color filter can also be manufactured with particularly good productivity. The color filter can also be provided with particularly good durability. Even when the content ratio of the pigment in the color filter ink is relatively high, the dispersion stability of the pigment can be adequately good, and the color filter ink can be provided with excellent stability (long-term storage properties). Including a compound having a propylene glycol backbone and alkoxy groups at both terminal ends thereof as the liquid medium makes it possible to effectively prevent degradation of the droplet discharge head used for droplet discharge. The frequency of replacement, repair, and other maintenance of the droplet discharge head can therefore be reduced even when a large number of color filters are manufactured, and the color filter can be manufactured with excellent productivity.

The compound having the chemical structure such as described above (compound having a propylene glycol backbone and alkoxy groups at both terminal ends thereof) can be indicated by the general formula (32) below.

Chemical Formula (32)

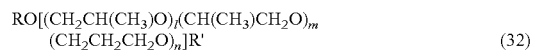

$$RO[(CH_2CH(CH_3)O)_l(CH(CH_3)CH_2O)_m(CH_2CH_2CH_2O)_n]R' \qquad (32)$$

In Formula (32), R and R' are each independently an alkyl group having a carbon number of 1 or higher; l, m, and n are integers 0 or higher; and l+m+n is 1 or higher.

Specific examples of R and R' in Formula (32) include such groups as the following: methyl ($CH_3$), ethyl ($CH_3CH_2$), propyl ($CH_3CH_2CH_2$), isopropyl ($CH_3CH(CH_3)$), butyl ($CH_3CH_2CH_2CH_2$), isobutyl ($CH_3CH(CH_3)CH_2$), sec-butyl ($CH_3CH_2CH(CH_3)$), t-butyl (($CH_3)_3C$), pentyl ($CH_3CH_2CH_2CH_2CH_2$), hexyl ($CH_3CH_2CH_2CH_2CH_2$), heptyl ($CH_3CH_2CH_2CH_2CH_2CH_2$), and octyl ($CH_3CH_2CH_2CH_2CH_2CH_2CH_2$), but $C_{1-4}$ alkyl groups are preferred.

As described above, l+m+n may be an integer of 1 or higher, but an integer of 2 to 5 is preferred, and an integer of 2 to 3 is more preferred. Such effects as those described above can thereby be more significantly demonstrated, the color filter ink can be provided with particularly good discharge stability and long-term storage properties (storage stability), and the manufactured color filter can be provided with particularly good durability. Unevenness of color, saturation, and the like in different regions of the color filter can also be more effectively suppressed, and particularly good uniformity of characteristics between individual units can be obtained.

Specific examples of compounds that can be used as the liquid medium that have a chemical structure such as described above include $CH_3OCH_2CH(CH_3)OCH_3$, $CH_3O(CH_2CH(CH_3)O)_2CH_3$, $CH_3O(CH_2CH(CH_3)O)_3CH_3$, $CH_3O(CH_2CH(CH_3)O)_4CH_3$, $CH_3O(CH_2CH(CH_3)O)_5CH_3$, $CH_3OCH_2CH_2CH_2OCH_3$, $CH_3O(CH_2CH_2CH_2O)_2CH_3$, $CH_3O(CH_2CH_2CH_2O)_3CH_3$, $CH_3O(CH_2CH_2CH_2O)_4CH_3$, $CH_3O(CH_2CH_2CH_2O)_5CH_3$, $CH_3O[(CH_2CH(CH_3)O)(CH(CH_3)CH_2O)]CH_3$, $CH_3O[(CH_2CH(CH_3)O)(CH_2CH_2CH_2O)]CH_3$, $CH_3O[(CH_2CH(CH_3)O)(CH(CH_3)CH_2O)(CH_2CH_2CH_2O)]CH_3$, $CH_3CH_2OCH_2CH(CH_3)OCH_3$, $CH_3CH_2O(CH_2CH(CH_3)O)_2CH_3$, $CH_3CH_2O(CH_2CH(CH_3)O)_3CH_3$, $CH_3CH_2O(CH_2CH(CH_3)O)_4CH_3$, $CH_3CH_2O(CH_2CH(CH_3)O)_5CH_3$, $CH_3CH_2OCH(CH_3)CH_2OCH_3$, $CH_3CH_2O(CH(CH_3)CH_2O)_2CH_3$, $CH_3CH_2O(CH(CH_3)CH_2O)_3CH_3$, $CH_3CH_2O(CH(CH_3)CH_2O)_4CH_3$, $CH_3CH_2O(CH(CH_3)CH_2O)_5CH_3$, $CH_3CH_2OCH_2CH_2CH_2OCH_3$, $CH_3CH_2O(CH_2CH_2CH_2O)_2CH_3$, $CH_3CH_2O(CH_2CH_2CH_2O)_3CH_3$, $CH_3CH_2O(CH_2CH_2CH_2O)_4CH_3$, $CH_3CH_2O(CH_2CH_2CH_2O)_5CH_3$, $CH_3CH_2O[(CH_2CH(CH_3)O)(CH(CH_3)CH_2O)]CH_3$, $CH_3CH_2O[(CH_2CH(CH_3)O)(CH_2CH_2CH_2O)]CH_3$, $CH_3CH_2O[(CH_2CH(CH_3)O)(CH(CH_3)CH_2O)(CH_2CH_2CH_2O)]CH_3$, $CH_3CH_2OCH_2CH(CH_3)OCH_2CH_3$, $CH_3CH_2O(CH_2CH(CH_3)O)_2CH_2CH_3$, $CH_3CH_2O(CH_2CH(CH_3)O)_3CH_2CH_3$, $CH_3CH_2O(CH_2CH(CH_3)O)_4CH_2CH_3$, $CH_3CH_2O(CH_2CH(CH_3)O)_5CH_2CH_3$, $CH_3CH_2OCH_2CH_2CH_2OCH_2CH_3$, $CH_3CH_2O(CH_2CH_2CH_2O)_2CH_2CH_3$, $CH_3CH_2O(CH_2CH_2CH_2O)_3CH_2CH_3$, $CH_3CH_2O(CH_2CH_2CH_2O)_4CH_2CH_3$, $CH_3CH_2O $(CH_2CH_2CH_2O)_5CH_2CH_3$, $CH_3CH_2O[(CH_2CH(CH_3)O)(CH(CH_3)CH_2O)]CH_2CH_3$, $CH_3CH_2O[(CH_2CH(CH_3)O)(CH_2CH_2CH_2O)]CH_2CH_3$, $CH_3CH_2O[(CH_2CH(CH_3)O)(CH(CH_3)CH_2O)(CH_2CH_2CH_2O)]CH_2CH_3$, $CH_3OCH_2CH(CH_3)OCH_2CH_2CH_2CH_3$, $CH_3O(CH_2CH(CH_3)O)_2CH_2CH_2CH_2CH_3$, $CH_3O(CH_2CH(CH_3)O)_3CH_2CH_2CH_2CH_3$, $CH_3O(CH_2CH(CH_3)O)_4CH_2CH_2CH_2CH_3$, $CH_3O(CH_2CH(CH_3)O)_5CH_2CH_2CH_2CH_3$, $CH_3OCH(CH_3)CH_2OCH_2CH_2CH_2CH_3$, $CH_3O(CH(CH_3)CH_2O)_2CH_2CH_2CH_2CH_3$, $CH_3O(CH(CH_3)CH_2O)_3CH_2CH_2CH_2CH_3$, $CH_3O(CH(CH_3)CH_2O)_4CH_2CH_2CH_2CH_3$, $CH_3O(CH(CH_3)CH_2O)_5CH_2CH_2CH_2CH_3$, $CH_3OCH_2CH_2CH_2OCH_2CH_2CH_2CH_3$, $CH_3O(CH_2CH_2CH_2O)_2CH_2CH_2CH_2CH_3$, $CH_3O(CH_2CH_2CH_2O)_3CH_2CH_2CH_2CH_3$, $CH_3O(CH_2CH_2CH_2O)_4CH_2CH_2CH_2CH_3$, $CH_3O(CH_2CH_2CH_2O)_5CH_2CH_2CH_2CH_3$, $CH_3O[(CH_2CH(CH_3)O)(CH(CH_3)CH_2O)]CH_2CH_2CH_2CH_3$, $CH_3O[(CH_2CH(CH_3)O)(CH_2CH_2CH_2O)]CH_2CH_2CH_2CH_3$, $CH_3O[(CH_2CH(CH_3)O)(CH(CH_3)CH_2O)(CH_2CH_2CH_2O)]CH_2CH_2CH_2CH_3$, and the like, and one or more types of compounds selected from the above examples may be combined and used.

Compounds such as those described above include compounds having a propylene glycol backbone and alkoxy groups at both terminal ends thereof, but the propylene glycol backbone preferably has a structure in which a plurality of 1,2-propylene glycols is condensed (i.e., a compound in which 1 in Formula (32) is 2 or greater). Such effects as those described above can thereby be more significantly demonstrated, the color filter ink can be provided with particularly good discharge stability and long-term storage properties (storage stability), and the manufactured color filter can be provided with particularly good durability. Unevenness of color, saturation, and the like in different regions of the color filter can also be more effectively suppressed, and particularly good uniformity of characteristics between individual units can be obtained. Examples of compounds (liquid media) having a structure in which a plurality of 1,2-propylene glycols is condensed in this manner include $CH_3O(CH_2CH(CH_3)O)_2CH_3$, $CH_3O(CH_2CH(CH_3)O)_3CH_3$, $CH_3O(CH_2CH(CH_3)O)_4CH_3$, $CH_3O(CH_2CH(CH_3)O)_5CH_3$, $CH_3O[(CH_2CH(CH_3)O)(CH(CH_3)CH_2O)]CH_3$, $CH_3O[(CH_2CH(CH_3)O)(CH(CH_3)CH_2O)(CH_2CH_2CH_2O)]CH_3$, $CH_3CH_2O(CH_2CH(CH_3)O)_2CH_3$, $CH_3CH_2O(CH_2CH(CH_3)O)_3CH_3$, $CH_3CH_2O(CH_2CH(CH_3)O)_4CH_3$, $CH_3CH_2O(CH_2CH(CH_3)O)_5CH_3$, $CH_3CH_2O(CH(CH_3)CH_2O)_3CH_3$, $CH_3CH_2O[(CH_2CH(CH_3)O)(CH(CH_3)CH_2O)]CH_3$, $CH_3CH_2O[(CH_2CH(CH_3)O)(CH(CH_3)CH_2O)(CH_2CH_2CH_2O)]CH_3$, $CH_3CH_2O(CH_2CH(CH_3)O)_2CH_2CH_3$, $CH_3CH_2O(CH_2CH(CH_3)O)_3CH_2CH_3$, $CH_3CH_2O(CH_2CH(CH_3)O)_5CH_2CH_3$, $CH_3CH_2O[(CH_2CH(CH_3)O)(CH(CH_3)CH_2O)]CH_2CH_3$, $CH_3CH_2O[(CH_2CH(CH_3)O)(CH_2CH_2CH_2O)]CH_2CH_3$, $CH_3CH_2O[(CH_2CH(CH_3)O)(CH(CH_3)CH_2O)(CH_2CH_2CH_2O)]CH_2CH_3$, $CH_3O(CH_2CH(CH_3)O)_2CH_2CH_2CH_2CH_3$, $CH_3O(CH_2CH(CH_3)O)_3CH_2CH_2CH_2CH_3$, $CH_3O(CH(CH_3)CH_2O)_2CH_2CH_2CH_2CH_3$, $CH_3O(CH(CH_3)CH_2O)_3CH_2CH_2CH_2CH_3$, $CH_3O(CH_2CH_2CH_2O)_2CH_2CH_2CH_2CH_3$, $CH_3O(CH_2CH_2CH_2O)_3CH_2CH_2CH_2CH_3$, $CH_3O[(CH_2CH(CH_3)O)(CH(CH_3)CH_2O)]CH_2CH_2CH_2CH_3$, $CH_3O[(CH_2CH(CH_3)O)(CH_2CH_2CH_2O)]CH_2CH_2CH_2CH_3$, $CH_3O[(CH_2CH(CH_3)O)(CH(CH_3)CH_2O)(CH_2CH_2CH_2O)]CH_2CH_2CH_2CH_3$, and the like.

The propylene glycol backbone constituting the aforementioned compound preferably has a structure in which two to three propylene glycols are condensed (i.e., "l+m+n" in Formula (32) is 2 to 3). Such effects as those described above can thereby be more significantly demonstrated, the color filter ink can be provided with particularly good discharge stability and long-term storage properties (storage stability), and the manufactured color filter can be provided with particularly good durability. Unevenness of color, saturation, and the like in different regions of the color filter can also be more effectively suppressed, and particularly good uniformity of characteristics between individual units can be obtained. Examples of compounds (liquid media) having a structure in which two to three propylene glycols are condensed in this manner include $CH_3O(CH_2CH(CH_3)O)_2CH_3$, $CH_3O(CH_2CH(CH_3)O)_3CH_3$, $CH_3O(CH_2CH_2CH_2O)_2CH_3$, $CH_3O(CH_2CH_2CH_2O)_3CH_3$, $CH_3O[(CH_2CH(CH_3)O)(CH(CH_3)CH_2O)]CH_3$, $CH_3O[(CH_2CH(CH_3)O)(CH_2CH_2CH_2O)]_3CH_3$, $CH_3O[(CH_2CH(CH_3)O)(CH(CH_3)CH_2O)(CH_2CH_2CH_2O)]CH_3$, $CH_3CH_2O(CH_2CH(CH_3)O)_2CH_3$, $CH_3CH_2O(CH_2CH(CH_3)O)_3CH_3$, $CH_3CH_2O(CH_2CH_2CH_2O)_2CH_3$, $CH_3CH_2O(CH_2CH_2CH_2O)_3CH_3$, $CH_3CH_2O[(CH_2CH(CH_3)O)(CH(CH_3)CH_2O)]CH_3$, $CH_3CH_2O[(CH_2CH(CH_3)O)(CH_2CH_2CH_2O)]CH_3$, $CH_3CH_2O[(CH_2CH(CH_3)O)(CH(CH_3)CH_2O)(CH_2CH_2CH_2O)]CH_3$, $CH_3CH_2O(CH_2CH(CH_3)O)_2CH_2CH_3$, $CH_3CH_2O(CH_2CH(CH_3)O)_3CH_2CH_3$, $CH_3CH_2O(CH_2CH_2CH_2O)_2CH_2CH_3$, $CH_3CH_2O(CH_2CH_2CH_2O)_3CH_2CH_3$, $CH_3CH_2O[(CH_2CH(CH_3)O)(CH(CH_3)CH_2O)]CH_2CH_3$, $CH_3CH_2O[(CH_2CH(CH_3)O)(CH_2CH_2CH_2O)]CH_2CH_3$, $CH_3CH_2O[(CH_2CH(CH_3)O)(CH(CH_3)CH_2O)(CH_2CH_2CH_2O)]CH_2CH_3$, $CH_3O(CH_2CH(CH_3)O)_2CH_2CH_2CH_2CH_3$, $CH_3O(CH_2CH(CH_3)O)_3CH_2CH_2CH_2CH_3$, $CH_3O(CH(CH_3)CH_2O)_2CH_2CH_2CH_2CH_3$, $CH_3O(CH(CH_3)CH_2O)_3CH_2CH_2CH_2CH_3$, $CH_3O(CH_2CH_2CH_2O)_2CH_2CH_2CH_2CH_3$, $CH_3O(CH_2CH_2CH_2O)_3CH_2CH_2CH_2CH_3$, $CH_3O[(CH_2CH(CH_3)O)(CH(CH_3)CH_2O)]CH_2CH_2CH_2CH_3$, $CH_3O[(CH_2CH(CH_3)O)(CH_2CH_2CH_2O)]CH_2CH_2CH_2CH_3$, $CH_3O[(CH_2CH(CH_3)O)(CH(CH_3)CH_2O)(CH_2CH_2CH_2O)]CH_2CH_2CH_2CH_3$, and the like.

When the liquid medium is composed of a plurality of types of compounds, such effects as those described below are obtained when one or more types of compounds selected from the group that includes diethylene glycol mono n-butyl ether, triethylene glycol mono n-butyl ether, and ethyl 3-ethoxypropionate are included as secondary components (secondary liquid mediums).

Specifically, these compounds (compounds as secondary components) have relatively high boiling points and dissolve easily in a resin material such as described above. During formation of the colored portion, after most of the liquid medium that is the primary component is removed, such a compound (secondary component) can be removed with relative ease. On the other hand, since the secondary component easily dissolves the resin material described above, the secondary component readily maintains the fluidity of the color filter ink during formation of the colored portion. As a result, high fluidity is maintained in the color filter ink, and surface irregularities are minimized in the formed colored portion while convection of the color filter ink during removal of the secondary component is prevented.

The ratio of the secondary component in the liquid medium (the sum of the ratios when two or more types of compounds selected from the above group are included as secondary components) is 50 wt % or lower, and preferably 1 to 40 wt %.

The boiling point of the liquid medium at atmospheric pressure (1 atm) is preferably 160 to 300° C., more preferably 180 to 290° C., and even more preferably 200 to 280° C. When the boiling point of the liquid medium at atmospheric pressure is within this range, blockage and other adverse events in the droplet discharge head for discharging the color filter ink can be more effectively prevented, and the color filter can be manufactured with particularly good productivity.

The vapor pressure of the liquid medium at 25° C. is preferably 0.7 mmHg or lower, and more preferably 0.1 mmHg or lower. When the vapor pressure of the liquid medium is within this range, blockage and the like in the droplet discharge head for discharging the color filter ink can be more effectively prevented, and the color filter can be manufactured with particularly good productivity.

The content ratio of the liquid medium in the color filter ink is preferably 50 to 98 wt %, more preferably 60 to 95 wt %, and even more preferably 65 to 93 wt %. When the content ratio of the liquid medium is within this range, the manufactured color filter can be provided with excellent durability while the discharge properties of the color filter ink from the droplet discharge head are made particularly good. Adequate color saturation can also be maintained in the manufactured color filter.

The color filter ink may include components other than those described above. Dispersing agents and the like are included as examples of components other than those described above that constitute the color filter ink.

Dispersing Agent

The color filter ink may include a dispersing agent. The ink can thereby be provided with particularly good droplet discharge stability. The dispersing agent also contributes to enhancing the dispersion properties of the pigment particles in the color filter ink when the color filter ink includes a pigment.

Examples of dispersing agents include cationic, anionic, nonionic, amphoteric, silicone-based, fluorine-based, and other surfactants.

More specific examples of dispersing agents include DISPERBYK 101, DISPERBYK 102, DISPERBYK 103, DISPERBYK P104, DISPERBYK P104S, DISPERBYK 220S, DISPERBYK 106, DISPERBYK 108, DISPERBYK 109, DISPERBYK 110, DISPERBYK 111, DISPERBYK 112, DISPERBYK 116, DISPERBYK 140, DISPERBYK 142, DISPERBYK 160, DISPERBYK 161, DISPERBYK 162, DISPERBYK 163, DISPERBYK 164, DISPERBYK 166, DISPERBYK 167, DISPERBYK 168, DISPERBYK 170, DISPERBYK 171, DISPERBYK 174, DISPERBYK 180, DISPERBYK 182, DISPERBYK 183, DISPERBYK 184, DISPERBYK 185, DISPERBYK 2000, DISPERBYK 2001, DISPERBYK 2050, DISPERBYK 2070, DISPERBYK 2095, DISPERBYK 2150, DISPERBYK LPN6919, DISPERBYK 9075, and DISPERBYK 9077 (all manufactured by Byk Chemie Japan); EFKA 4008, EFKA 4009, EFKA 4010, EFKA 4015, EFKA 4020, EFKA 4046, EFKA 4047, EFKA 4050, EFKA 4055, EFKA 4060, EFKA 4080, EFKA 4400, EFKA 4401, EFKA 4402, EFKA 4403, EFKA 4406, EFKA 4408, EFKA 4300, EFKA 4330, EFKA 4340, EFKA 4015, EFKA 4800, EFKA 5010, EFKA 5065, EFKA 5066, EFKA 5070, EFKA 7500, and EFKA 7554 (all manufactured by Ciba Specialty Chemicals); SOLSPERSE 3000, SOLSPERSE 9000, SOLSPERSE 13000, SOLSPERSE 16000, SOLSPERSE 17000, SOLSPERSE 18000, SOLSPERSE 20000, SOLSPERSE 21000, SOLSPERSE 24000, SOLSPERSE 26000, SOLSPERSE 27000, SOLSPERSE 28000, SOLSPERSE 32000, SOLSPERSE 32500, SOLSPERSE 32550, SOLSPERSE 33500 SOLSPERSE 35100, SOLSPERSE 35200, SOLSPERSE 36000, SOLSPERSE 36600, SOLSPERSE 38500, SOLSPERSE 41000, SOLSPERSE 41090, and SOLSPERSE 20000 (all manufactured by Nippon Lubrizol); Ajisper PA111, Ajisper PB711, Ajisper PB821, Ajisper PB822, and Ajisper PB824 (all manufactured by Ajinomoto Fine-Techno); DISPARLON 1850, DISPARLON 1860, DISPARLON 2150, DISPARLON 7004, DISPARLON DA-100, DISPARLON DA-234, DISPARLON DA-325, DISPARLON DA-375, DISPARLON DA-705, DISPARLON DA-725, and DISPARLON PW-36 (all manufactured by Kusumoto Chemicals); Floren DOPA-14, Floren DOPA-15B, Floren DOPA-17, Floren DOPA-22, Floren DOPA-44, Floren TG-710, and Floren D-90 (all manufactured by Kyoei Kagaku); ANTI-TERRA-205 (manufactured by Byk Chemie Japan); HINOACT KF-1000, KF-1525, HINOACT 1300M, HINOACT T9050, HINOACT T6000, HINOACT T7000, HINOACT T8000, and HINOACT T8000E (all manufactured by Kawaken Fine Chemicals); and the like, and one or more types of compounds selected from the above examples may be combined and used.

It is particularly preferred that the color filter ink include as dispersing agents a dispersing agent having a predetermined acid value (also referred to hereinafter as an acid-value dispersing agent) and a dispersing agent having a predetermined amine value (also referred to hereinafter as an amine-value dispersing agent). The viscosity-reducing effects demonstrated by the acid-value dispersing agent for reducing the viscosity of the color filter ink, and the effects of the amine-value dispersing agent for stabilizing the viscosity of the color filter ink are thereby obtained at the same time. As a result, the pigment can be dispersed in the color filter ink with particularly good stability, and the color filter ink can be provided with particularly good droplet discharge stability.

Specific examples of acid-value dispersing agents include DISPERBYK P104, DISPERBYK P104S, DISPERBYK 220S, DISPERBYK 110, DISPERBYK 111, DISPERBYK 170, DISPERBYK 171, DISPERBYK 174, and DISPERBYK 2095 (all manufactured by Byk Chemie Japan); EFKA 5010, EFKA 5065, EFKA 5066, EFKA 5070, EFKA 7500, and EFKA 7554 (all manufactured by Ciba Specialty Chemicals); SOLSPERSE 3000, SOLSPERSE 16000, SOLSPERSE 17000, SOLSPERSE 18000, SOLSPERSE 36000, SOLSPERSE 36600, and SOLSPERSE 41000 (all manufactured by Nippon Lubrizol); HINOACT KF-1000 (manufactured by Kawaken Fine Chemicals); and the like.

Specific examples of amine-value dispersing agents include DISPERBYK 102, DISPERBYK 160, DISPERBYK 161, DISPERBYK 162, DISPERBYK 163, DISPERBYK 164, DISPERBYK 166, DISPERBYK 167, DISPERBYK 168, DISPERBYK 2150, DISPERBYK LPN6919, DISPERBYK 9075, and DISPERBYK 9077 (all manufactured by Byk Chemie Japan); EFKA 4015, EFKA 4020, EFKA 4046, EFKA 4047, EFKA 4050, EFKA 4055, EFKA 4060, EFKA 4080, EFKA 4300, EFKA 4330, EFKA 4340, EFKA 4400, EFKA 4401, EFKA 4402, EFKA 4403, and EFKA 4800 (all manufactured by Ciba Specialty Chemicals); Ajisper PB711 (manufactured by Ajinomoto Fine Techno); ANTI-TERRA-205 (manufactured by Byk Chemie Japan); KF-1525, HINOACT 1300M, HINOACT T9050, HINOACT T6000, HINO- ACT T7000, HINOACT T8000, and HINOACT T8000E (all manufactured by Kawaken Fine Chemicals); and the like.

Using dispersing agents (acid-value dispersing agents and amine-value dispersing agents) such as those described above enables excellent pigment dispersion stability in the ink to be obtained without adversely affecting the coloration of the formed colored portion.

When an acid-value dispersing agent and an amine-value dispersing agent are used jointly, the acid value (acid value on a solid basis) of the acid-value dispersing agent is not particularly limited, but is preferably 5 to 370 KOH mg/g, more preferably 20 to 270 KOH mg/g, and more preferably 30 to 135 KOH mg/g. When the acid value of the acid-value dispersing agent is within the aforementioned range, particularly good dispersion stability of the pigment can be obtained in the case of joint use with an amine-value dispersing agent, and it is possible to more significantly demonstrate the effects of reducing and stabilizing the viscosity of the color filter ink that are obtained in the case of joint use with an acid-value dispersing agent. The acid value of the dispersing agent can be calculated by a method based on DIN EN ISO 2114, for example.

The acid-value dispersing agent preferably does not have a predetermined amine value; i.e., the acid-value dispersing agent preferably has an amine value of zero.

When an amine-value dispersing agent and an acid-value dispersing agent are jointly used, the amine value (amine value on a solid basis) of the amine-value dispersing agent is not particularly limited, but is preferably 5 to 200 KOH mg/g, more preferably 25 to 170 KOH mg/g, and more preferably 30 to 130 KOH mg/g. When the amine value of the amine-value dispersing agent is within the aforementioned range, particularly good dispersion stability of the pigment can be obtained in the case of joint use with an acid-value dispersing agent, and it is possible to more significantly demonstrate the effects of reducing and stabilizing the viscosity of the color filter ink that are obtained in the case of joint use with an acid-value dispersing agent. The amine value of the dispersing agent can be calculated by a method based on DIN 16945, for example.

The amine-value dispersing agent preferably does not have a predetermined acid value; i.e., the amine-value dispersing agent preferably has an acid value of zero.

When an acid-value dispersing agent and an amine-value dispersing agent are jointly used, the relation $0.1 \leq X_A/X_B \leq 1$ is preferably satisfied, and the relation $0.15 \leq X_A/X_B \leq 0.5$ is more preferably satisfied, wherein $X_A$ (wt %) is the content ratio of the acid-value dispersing agent in the color filter ink, and $X_B$ (wt %) is the content ratio of the amine-value dispersing agent in the color filter ink. Satisfying such a relation makes it possible to more significantly demonstrate the synergistic effects of jointly using the acid-value dispersing agent and the amine-value dispersing agent, and to obtain particularly good discharge stability of droplets, and other effects.

The relation $0.01 \leq (AV \times X_A)/(BV \times X_B) \leq 1.9$ is preferably satisfied, and the relation $0.10 \leq (AV \times X_A)/(BV \times X_B) \leq 1.5$ is more preferably satisfied, wherein AV (KOH mg/g) is the acid value of the acid-value dispersing agent, BV (KOH mg/g) is the amine value of the amine-value dispersing agent, $X_A$ (wt %) is the content ratio of the acid-value dispersing agent, and $X_B$ (wt %) is the content ratio of the amine-value dispersing agent. Satisfying such a relation makes it possible to more significantly demonstrate the synergistic effects of jointly using the acid-value dispersing agent and the amine-value dispersing agent, and to obtain particularly good discharge stability of droplets, and other effects.

A dispersing agent other than the ones described above may be used as the dispersing agent. For example, a compound provided with a cyamelide backbone, for example, may be used as the dispersing agent. The use of such a compound as the dispersing agent makes it possible to obtain particularly good dispersion properties of the pigment in the dispersion medium (liquid medium) in which the resin material such as described above is dissolved, and to provide the color filter ink with particularly good discharge stability. Such excellent effects are obtained by the synergistic effects of using a resin material such as described above jointly with a compound provided with a cyamelide backbone, and not merely by using a compound provided with a cyamelide backbone as the dispersing agent.

A compound having the partial structure indicated by Formula (33) and Formula (34) below, for example, may be used as the dispersing agent. Using such a compound as the dispersing agent makes it possible to obtain particularly good dispersion properties of the colorant (pigment) in the color filter ink, and to provide the color filter ink with particularly good discharge stability.

Chemical Formula (33)

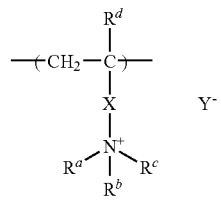

(33)

In Formula (33), $R^a$, $R^b$, and $R^c$ are each independently a hydrogen atom, or a cyclic or chain hydrocarbon group which may be substituted; or two or more of $R^a$, $R^b$, and $R^c$ bond with each other and form a cyclic structure; $R^d$ is a hydrogen atom or a methyl group; X is a bivalent linking group; and $Y^-$ is a counter anion.

Chemical Formula (34)

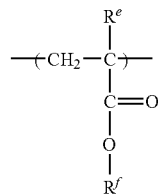

(34)

In Formula (34), $R^e$ is a hydrogen atom or a methyl group; $R^f$ is a cyclic or chain alkyl group which may have a substituted group, an aryl group which may have a substituted group, or an aralkyl group which may have a substituted group.

The content ratio of the dispersing agent in the color filter ink is preferably 0.5 to 15 wt %, and more preferably 0.5 to 8 wt %.

Other Components

The color filter ink of the present invention may include components other than those described above. Examples of such components include various cross-linking agents; thermal acid generators such as diazonium salt, iodonium salt, sulfonium salt, phosphonium salt, selenium salt, oxonium salt, ammonium salt, benzothiazolium salt, and other onium salts; diazonium salt, iodonium salt, sulfonium salt, phosphonium salt, selenium salt, oxonium salt, ammonium salt, and other photoacid generators; various polymerization initiators; acid crosslinking agents; surfactants; intensifiers; photostabilizers; luminescent materials; leveling agents; antioxidants; UV absorbers; adhesive improvers; various polymerization accelerators; various photostabilizers; glass, alumina, and other fillers; vinyl trimethoxysilane, vinyl triethoxysilane, vinyl tris(2-methoxyethoxy)silane, N-(2-aminoethyl)-3-aminopropyl methyl dimethoxysilane, N-(2-aminoethyl)-3-aminopropyl trimethoxysilane, 3-aminopropyl triethoxysilane, 3-glycidoxypropyl trimethoxysilane, 3-glycidoxypropyl methyl dimethoxysilane, 2-(3,4-epoxycyclohexyl)ethyl trimethoxysilane, 3-chloro propyl methyl dimethoxysilane, 3-chloro propyl trimethoxysilane, 3-methacryloxypropyl trimethoxysilane, 3-mercapto propyl trimethoxysilane, and other adhesion accelerators; 2,2-thiobis(4-methyl-6-t-butyl phenol), 2,6-di-t-butyl phenol, and other antioxidants; 2-(3-t-butyl-5-methyl-2-hydroxyphenyl)-5-chloro benzotriazole, alkoxybenzophenone, and other UV absorbers; sodium polyacrylate, and other anti-coagulants; and the like.

Examples of cross-linking agents that may be used include polycarboxylic acid anhydrides, polycarboxylic acids, polyfunctional epoxy monomers, polyfunctional acrylic monomers, polyfunctional vinyl ether monomers, and polyfunctional oxetane monomers. Specific examples of polycarboxylic acid anhydrides include phthalic anhydride, itaconic anhydride, succinic anhydride, citraconic anhydride, dodecenyl succinic anhydride, tricarballylic anhydride, maleic anhydride, hexahydrophthalic anhydride, dimethyl tetrahydrophthalic anhydride, himic anhydride, nadic anhydride, and other aliphatic or alicyclic dicarboxylic anhydrides; 1,2,3,4-butane tetracarboxylic acid dianhydride and cyclopentane tetracarboxylic acid dianhydride; benzophenone tetracarboxylic anhydride and other aromatic polycarboxylic acid anhydrides; ethylene glycol bistrimellitate, glycerin tris trimellitate, and other ester-containing organic anhydrides, among which an aromatic polycarboxylic acid anhydride is preferred. An epoxy resin curing agent composed of a commercially available carboxylic acid anhydride can also be suitably used. Specific examples of polycarboxylic acids include succinic acid, glutaric acid, adipic acid, butane tetracarboxylic acid, maleic acid, itaconic acid, and other aliphatic polycarboxylic acids; hexahydrophthalic acid, 1,2-cyclohexane dicarboxylic acid, 1,2,4-cyclohexane tricarboxylic acid, cyclopentane tetracarboxylic acid, and other aliphatic polycarboxylic acids; and phthalic acid, isophthalic acid, terephthalic acid, pyromellitic acid, trimellitic acid, 1,4, 5,8-naphthalene tetracarboxylic acid, benzophenone tetracarboxylic acid, and other aromatic polycarboxylic acid, but among these, aromatic polycarboxylic acid is preferred. Specific examples of a polyfunctional epoxy monomer include the product name CELLOXIDE 2021 manufactured by Daicel Chemical Industries, the product name Epolead GT401 manufactured by Daicel Chemical Industries, the product name Epolead PB3600 manufactured by Daicel Chemical Industries, bisphenol A, hydrogenated bisphenol A, and triglycidyl isocyanurate. Specific example of a polyfunctional acrylic monomer include pentaerythritol ethoxytetraacrylate, pentaerythritol tetraacrylate, pentaerythritol triacrylate, pentaerythritol ethoxytetraacrylate, ditrimethylolpropane tetraacrylate, trimethylolpropane triacrylate, trimethylolpropane ethoxytriacrylate, dipentaerythritol hexaacrylate trimethallyl isocyanurate, and triallyl isocyanurate. Examples of a polyfunctional vinyl ether monomer include 1,4-butanediol vinyl ether, 1,6-hexanediol divinyl ether, nonanediol divinyl ether, cyclohexanediol divinyl ether, cyclohexanedimethanol divinyl ether, triethylene glycol divinyl ether, trimethylolpropane trivinyl ether, and pentaerythritol tetravinyl ether. Examples of polyfunctional oxetane monomers include xylylene dioxetane, biphenyl-type oxetane, and novolac-type oxetane.

A leveling agent smoothes the surface of the color filter ink applied to the cells and flattens the colored portion by reducing the surface tension of the color filter ink. Therefore, a leveling agent in the color filter ink acts synergistically with the effects of the resin material such as described above, and makes it possible to obtain a flatter surface of the color filter ink in the cells. The formed colored portions are therefore made more flat.

Leveling agents include acrylic-based leveling agents, vinyl ether-based leveling agents, silicone-based leveling agents, fluorine/silicone-based leveling agents, acetylene glycol-based leveling agents, and the like, and one or more of these types of leveling agents may be combined and used. Specific examples of leveling agents include OX-880EF, OX-881, OX-883, OX-883HF, OX-70, OX-77EF, OX-60, OX-710, OX-720, OX-720EF, OX-750HF, LAP-10, LAP-20, LAP-30, 1970, 230, LF-1970, LF-1980, LF-1982, LF-1983, LF-1984, LF-1985, LHP-95, LHP-96, UVX-35, UVX-36, UVX-39, AQ-200 (all manufactured by Kusumoto Chemicals, Ltd.), BYK-350, BYK-352, BYK-354, BYK-355, BYK-358N/361N, BYK-380N, BYK-381, BYK-392 (all manufactured by Byk Chemie Japan), and other acrylic-based leveling agents; LHP-90, LHP-91 (manufactured by Kusumoto Chemicals, Ltd.), and other vinyl ether-based leveling agents; BYK-307, BYK-300, BYK-302, BYK-306, BYK-330, BYK-331, BYK-344, BYK-silclean 3700 (all manufactured by Byk Chemie Japan), KP-321, KP-324 (manufactured by Shin-Etsu Chemical Co., Ltd.), and other silicone-based leveling agents; Megafac F-443, F-444, F-445, F-446, F-470, F-471, F-472SF, F-474, F-475, F-477, F-478, F-479, F-480SF, F-482, F-483, F-484, F-486, F-487, F-489 (all manufactured by Dainippon Ink and Chemicals, Inc.), and other fluorine-silicon-based leveling agents; SURFYNOL 104, SURFYNOL 82, SURFYNOL 2502, SURFYNOL 420, SURFYNOL 440, SURFYNOL 465, SURFYNOL 485, SURFYNOL 104E, SURFYNOL 104H, SURFYNOL 104A, SURFYNOL 104BC, SURFYNOL 104DPM, SURFYNOL 104PA, SURFYNOL 104PG-50, SURFYNOL 104S, SURFYNOL SE, SURFYNOL SE-F, SURFYNOL 504, SURFYNOL 61, SURFYNOL 2502, SURFYNOL 82, SURFYNOL DF110D, SURFYNOL DF37, SURFYNOL DF58, SURFYNOL DF75, SURFYNOL DF210, SURFYNOL CT111, SURFYNOL CT121, SURFYNOL CT131, SURFYNOL CT136, SURFYNOL CT151, SURFYNOL TG, SURFYNOL GA, SURFYNOL PSA-336, Dynol 604, ENVIROGEM AD-01, Olfine E1004, Olfine E1010, Olfine PD-001, Olfine PD-002W, Olfine PD-004, Olfine EXP.4001, Olfine EXP.4036, Olfine EXP.4051F, Olfine SPC, Olfine AF-103, Olfine AF-104, Olfine AK-02, Olfine SK-14, Olfine AE-3, Olfine PD-003, Olfine PD-201, Olfine PD-202, Olfine PD-301, Olfine B, Olfine P, Olfine Y, Olfine A, Olfine STG, Olfine SPC (all manufactured by Nisshin Chemical Industry Co., Ltd.), and other acetylene glycol-based leveling agents; Novec FC-4430, Novec FC-4432 (all manufactured by Sumitomo 3M Ltd.), Phosphanol ML-200, Phosphanol ML-220, Phosphanol RD-510Y, Phosphanol RS-410, Phosphanol RS-610, Phosphanol RS-710, Phosphanol RL-210, Phosphanol RL-310, Phosphanol RB-410, Phosphanol RD-720N (all manufactured by Toho Chemical Industry Co., Ltd.), LANCO FLOW L, LANCO FLOW U, SOLSPERSE 20000 (all manufactured by Lubrizol Deutschland GmbH), Futergent 100, Futergent 100C, Futergent 110, Futergent 140A, Futergent 150, Futergent 150CH, Futergent A-K, Futergent 501, Futergent 250, Futergent 251, Futergent 222F, FTX-218, Futergent 300, Futergent 310, Futergent 400SW, Futergent 251, FTX-212M, Futergent 250, FTX-245M, FTX-290M, FTX-207S, FTX-211S, FTX-2205, FTS-230S, FTX-209F, FTX-213F, Futergent 222F, FTX-233F, FTX-245F, FTX-208G, FTX-218G, FTX-230G, FTS-240G, FTX-204D, FTX-208D, FTX-212D, FTX-216D, FTX-218D, FTX-220D, FTX-222D, FTX-720C, FTX-740C (all manufactured by Neos Company, Ltd.), Surflon S-111n, Surflon S-113, Surflon S-121, Surflon S-131, Surflon S-132, Surflon S-141, Surflon S-145, Surflon S-381, Surflon S-383, Surflon S-393, Surflon SC-101, Surflon KH-40, Surflon SA-100 (all manufactured by AGC Seimi Chemical Co., Ltd.), UNIDYNE DS-401, UNIDYNE DS-403, UNIDYNE NS-1602, UNIDYNE NS-1603, UNIDYNE NS-1605 (all manufactured by Nisshin Kasei Co., Ltd.), and the like. Among such leveling agents, acrylic-based leveling agents, vinyl ether-based leveling agents, and acetylene glycol-based leveling agents are preferred for use. It is particularly preferred that one or more types of leveling agents selected from SURFYNOL DF-58, LHP-95, LHP-90, and LF1970 be combined and used. The surface of the formed colored portion can thereby be made more flat, and unevenness of color and saturation among regions of the obtained color filter can be minimized.

An antioxidant is capable of preventing deterioration of the color filter ink due to oxidation or the like, and of preventing degradation of the pigment, resin material, and other components due to heat, light, or other factors in the colored portion formed by the color filter ink. A red colorant in particular is prone to be degraded by heat, light, and other factors in comparison to a green, blue, or other colorant, but by using an antioxidant with the red colorant, the red colorant can be suitably prevented from deteriorating.

The antioxidant used may be one or a combination of two or more types of antioxidants including various phosphorus-based antioxidants; various sulfur-based antioxidants; IRGANOX 1010, IRGANOX 1035, IRGANOX 1076, IRGANOX 1135, IRGANOX 1520L (all manufactured by Ciba Japan K. K.), and various other hindered phenol-based antioxidants; TINUVIN 111FDL, TINUVIN 123, TINUVIN 144, TINUVIN 152, TINUVIN 292, TINUVIN 5100, TINUVIN 5050, TINUVIN 5060, TINUVIN 5151 (all manufactured by Ciba Japan K. K.), and various other hindered amine-based antioxidants; and various other antioxidants. Among these examples, at least one type of hindered amine-based antioxidant or hindered phenol-based antioxidant is preferably used, a hindered phenol-based antioxidant is more preferably used, and TINUVIN 152 is more preferably used. Such antioxidants suitably and effectively prevent deterioration of the color filter ink and the colored portion, have minimal effect on the dispersion properties of the pigment in the color filter ink, and have minimal effect on the hue, brightness, contrast ratio, and other optical characteristics in the formed colored portion.

A UV absorber has the function of preventing degradation of the colored portion and other components by absorbing ultraviolet rays in the colored portion. Benzophenone-based UV absorbers, salicylate-based UV absorbers, benzotriazole-based UV absorbers, and various other types of UV absorbers can be used as the UV absorber.

A thermal acid generator is a component for generating acid by applying heat, and particularly preferred among those described above are sulfonium salt and benzothiazolium. More specific examples of thermal acid generators in terms of product names include Sunaid SI-45, Sunaid SI-47, Sunaid SI-60, Sunaid SI-60L, Sunaid SI-80, Sunaid SI-80L, Sunaid SI-100, Sunaid SI-100L, Sunaid SI-145, Sunaid SI-150, Sunaid SI-160, Sunaid SI-110L, Sunaid SI-180L (all product names, manufactured by Sanshin Chemical Industry Co., Ltd.), CI-2921, CI-2920, CI-2946, CI-3128, CI-2624, CI-2639, CI-2064 (all product names, manufactured by Nippon Soda Co., Ltd.), CP-66, CP-77 (product names, manufactured by Adeka Corporation), and FC-520 (product name, manufactured by 3M Company).

A photoacid generator is a component for generating acid by using light, and more specific examples include the product names CYRACURE UVI-6970, CYRACURE UVI-6974, CYRACURE UVI-6990, CYRACURE UVI-950 (all product names, manufactured by US Union Carbide), IRGACURE 261 (product name, Ciba Specialty Chemicals), SP-150, SP-151, SP-170, Optomer SP-171 (all product names, manufactured by Adeka Corporation), CG-24-61 (product name, manufactured by Ciba Specialty Chemicals), Daicat II (product name, manufactured by Daicel Chemical Industries, Ltd.), UVAC 1591 (product name, manufactured by Daicel UCB Co., Ltd.), CI-2064, CI-2639, CI-2624, CI-2481, CI-2734, CI-2855, CI-2823, CI-2758 (product name, manufactured by Nippon Soda Co., Ltd.), PI-2074 (product name, manufactured by Rhone Poulenc, pentafluorophenyl borate tolyl cumyl iodonium), FFC509 (product name, manufactured by 3M Company), BBI-102, BBI-101, BBI-103, MPI-103, TPS-103, MDS-103, DTS-103, NAT-103, NDS-103 (product name, manufactured by Midori Kagaku Co., Ltd.), and CD-1012 (product name, manufactured by Sartomer Co., Inc.).

The color filter ink may also include polyalkylene glycol. Polyalkylene glycol is capable of maintaining the fluidity of the color filter ink by reducing thixotropy of the color filter ink during formation of the colored portion, and as a result, can contribute to flattening the colored portion. The polyalkylene glycol is removed by heating during formation of the colored portion.

Examples of the glycol constituting the polyalkylene glycol include ethylene glycol, 1,2-propylene glycol, and other propylene glycols, as well as various butylene glycols, various pentylene glycols, various hexylene glycols, and the like, and one or more of these glycols may be combined and used. Among these examples, the use of an oligomer of ethylene glycol, or an oligomer of 1,2-propylene glycol is preferred.

The polyalkylene glycol also preferably has a hydroxyl group. For example, terminal hydroxyl groups are preferably not substituted. Thixotropy of the ink can be further reduced by the presence of a hydroxyl group in the polyalkylene glycol. The color filter ink also has excellent affinity to a substrate (particularly glass substrate) such as described hereinafter, and the color filter ink can be made to spread suitably into the cell.

The degree of polymerization of the polyalkylene glycol is preferably 3 to 40, and more preferably 3 to 20. Thixotropy of the color filter ink can thereby be adequately reduced.

The weight-average molecular weight of the polyalkylene glycol is preferably 150 to 2,000, more preferably 180 to 1,000, and more preferably 180 to 500. Thixotropy of the color filter ink can thereby be adequately reduced.

The viscosity (viscosity measured using an oscillation viscometer) of the color filter ink at 25° C. is not particularly limited, but is preferably 4 to 12 mPa·s, and more preferably 5 to 11 mPa·s. When the viscosity of the ink is within this range, particularly good droplet discharge stability by the inkjet method can be obtained, color filters can be produced with particularly good efficiency (efficiency of forming colored portions), and unwanted fluctuation of the thickness of the colored portion and other problems can be effectively prevented. The viscosity of the color filter ink can be measured using an oscillation viscometer, for example, particularly in accordance with JIS Z8809.

Color Filter Ink Manufacturing Method

Preferred embodiments of the method for manufacturing a color filter ink such as described above, and particularly of a method for manufacturing a color filter ink that includes a pigment as the colorant, will next be described.

The manufacturing method of the present embodiment has a polymer M solution preparation step of preparing a polymer M solution in which the polymer M is dissolved in a solvent; a fine-dispersion step of subjecting the polymer M solution, to which a pigment has been added, to a fine-dispersion process using a bead mill, and obtaining a pigment dispersion in which the pigment is fine-dispersed; and a dilution step of mixing a resin material for dilution (resin component other than the polymer M) into the pigment dispersion.

Polymer M Solution Preparation Step

In the polymer M solution preparation step, there is prepared a polymer M solution in which the polymer M is dissolved in a solvent. Thus, by causing the solution (polymer M solution) mixed with the pigment to include the polymer M prior to the step (fine-dispersion step) described hereinafter for fine-dispersing the pigment, fine particles can be efficiently, easily, and reliably formed (broken up) from aggregates of pigment particles used as a starting material, productivity of the color filter ink can be enhanced, and the color filter ink ultimately obtained can be provided with particularly good pigment dispersion stability. Using the polymer M solution also enables the fine-dispersion step described hereinafter to be performed under relatively mild conditions, and unwanted change in qualities, degradation, and other effects in the constituent materials of the color filter ink can therefore be reliably prevented.

A dispersing agent is preferably used in the present step. The synergistic effects of jointly using the polymer M and the dispersing agent can thereby be more significantly demonstrated. When a dispersing agent is used in the present step, a mixture including a solvent and the dispersing agent (prior to mixing the polymer M and the solvent, or at the time of mixing the polymer M and the solvent) is preferably stirred (the dispersing agent is preferably pre-dispersed). The associated state of the dispersing agent can thereby be released (undone) in the obtained polymer M solution, and the function of the dispersing agent can be more effectively demonstrated. The acid-value dispersing agent and amine-value dispersing agent described above have the characteristic of being readily attracted to each other electrically, but by pre-dispersing the dispersing agent prior to fine-dispersing the pigments (fine-dispersion step) according to the present embodiment, the acid-value dispersing agent and amine-value dispersing agent can be uniformly and stably adhered to the surfaces of the pigment particles in a state in which association is adequately released; aggregation of the dispersing agents with each other, aggregation of pigment particles with each other, and other effects can be reliably prevented; and particularly good pigment dispersion stability and droplet discharge stability can be obtained even when an acid-value dispersing agent and an amine-value dispersing agent are used as dispersing agents.

When the color filter ink is prepared so as to include the polymer Z and polymer W, the polymer Z and polymer W are preferably used together with the polymer M in the present step.

The content ratio of the dispersing agent (sum of the content ratios of the plurality of types of dispersing agents when a plurality of types of dispersing agents is included) in the polymer M solution prepared in the present step is not particularly limited, but is preferably 5 to 30 wt %, and more preferably 6 to 25 wt %. When the content ratio of the dispersing agent is within this range, such effects as previously described are demonstrated more significantly.

The content ratio of the solvent in the polymer M solution prepared in the present step is not particularly limited, but is preferably 40 to 80 wt %, and more preferably 53 to 75 wt %. When the content ratio of the solvent is within this range, such effects as previously described are demonstrated more significantly. A solvent having the same composition as the dispersion medium constituting the desired color filter ink may be used as the solvent, or a solvent having a different composition may be used. In the present step, when a solvent having a different composition than the dispersion medium constituting the desired color filter ink is used as the solvent, a dispersion medium having the desired composition can be obtained in the color filter ink ultimately obtained by diluting with a predetermined liquid (solvent), and performing liquid (solvent) replacement involving vacuum processing, heat treatment, or the like in a subsequent step, for example.

In the present step, a polymer M solution is obtained by stirring a mixture of the abovementioned components using various types of agitators.

Examples of agitators that can be used in the present step include a Dispermill or other single-shaft or twin-shaft mixer or the like.

The stirring time for which the agitator is used is not particularly limited, but is preferably 1 to 30 minutes, and more preferably 3 to 20 minutes. Particularly good dispersion stability of pigment particles in the color filter ink ultimately obtained, and particularly good discharge stability of the color filter ink can thereby be obtained while adequately good production properties of the color filter ink are obtained.

The speed of the stirring vanes of the agitator in the present step is not particularly limited, but is preferably 500 to 4000 rpm, and more preferably 800 to 3000 rpm. The dispersion stability of pigment particles in the color filter ink ultimately obtained can thereby be made particularly good while adequately good production properties of the color filter ink are obtained. Degradation, change in qualities, and the like of the polymer M, the dispersing agent, and other components due to heat and the like can also be reliably prevented.

Fine-Dispersion Step

A pigment is then added to the polymer M solution obtained in the step described above, inorganic beads are added in multiple stages, and a fine-dispersion process is performed (fine-dispersion step).

As described above, since the polymer M solution used in the present step includes the polymer W, the pigment can be efficiently formed into fine particles (broken up), and the color filter ink can be manufactured with particularly good productivity. The reason for this is considered to be that the polymer W surrounds the pigment in the present step, formation of fine particles (breaking up) of the pigment is accelerated, and the pigment particles formed into fine particles are prevented from re-aggregating.

Particularly in the present embodiment, inorganic beads are added in multiple stages in the step (fine-dispersion step) of fine-dispersing the pigment. In the fine-dispersion step, adding the inorganic beads in multi-stage fashion makes it possible to form fine particles of the pigment with particularly superior efficiency, and to make the pigment particles adequately small in the color filter ink ultimately obtained. Particularly when an acid-value dispersing agent and an amine-value dispersing agent are jointly used, the effects of using such materials, and the effects of using a method having a polymer M solution preparation step and a multi-stage fine-dispersion step act synergistically, the color filter ink ultimately obtained can be provided with extremely excellent dispersion stability of pigment and discharge stability of droplets, and the color filter ink can be used to manufacture a color filter having extremely excellent contrast.

The inorganic beads may be added in three or more stages in the present step, but the inorganic beads are preferably added in two stages. The production properties of the color filter ink can thereby be made particularly good while the color filter ink ultimately obtained is provided with adequately good long-term dispersion stability of the pigment particles.

A method for adding the inorganic beads in two stages will be described below. Specifically, a typical example of a method will be described for performing a first treatment using first organic beads, and a second treatment using second organic beads in the fine-dispersion step.

The inorganic beads (first inorganic beads and second inorganic beads) used in the present step may be composed of any material insofar as the material is an inorganic material, but preferred examples of the inorganic beads include zirconia beads (e.g., Toray Ceram milling balls (trade name); manufactured by Toray) and the like.

First Treatment

In the present step, the pigments are first added to the polymer M solution prepared in the polymer W solution preparation step described above, and a first treatment is performed for primary fine-dispersion using first inorganic beads having a predetermined grain size.

The first inorganic beads used in the first treatment preferably have a larger grain size than the second inorganic beads used in the second treatment. The efficiency of fine particle formation (fine-dispersion) of the pigments in the overall fine-dispersion step can thereby be made particularly good.

The average grain size of the first inorganic beads is not particularly limited, but is preferably 0.5 to 3.0 mm, more preferably 0.5 to 2.0 mm, and more preferably 0.5 to 1.2 mm. When the average grain size of the first inorganic beads is within the aforementioned range, the efficiency of fine particle formation (fine-dispersion) of the pigments in the overall fine-dispersion step can be made particularly good. In contrast, when the average grain size of the first inorganic beads is less than the lower limit of the aforementioned range, severe reduction of the efficiency of fine particle formation (grain size reduction) of the pigment particles by the first treatment tends to occur according to the type and other characteristics of the pigments. When the average grain size of the first inorganic beads exceeds the upper limit of the aforementioned range, although the efficiency of fine particle formation (grain size reduction) of the pigment particles by the first treatment can be made relatively excellent, the efficiency of fine particle formation (grain size reduction) of the pigment particles by the second treatment is reduced, and the efficiency of fine particle formation (fine-dispersion) of the pigments is reduced in the fine-dispersion step as a whole.

The amount of the first inorganic beads used is not particularly limited, but is preferably 100 to 600 parts by weight, and more preferably 200 to 500 parts by weight with respect to 100 parts by weight of the polymer M solution.

The amount of the pigments added to the polymer M solution is not particularly limited, but is preferably 12 parts by weight or more, and more preferably 18 to 35 parts by weight with respect to 100 parts by weight of the polymer M solution.

The first treatment may be performed by stirring using various types of agitators in a state in which the pigments and the first inorganic beads are added to the polymer M solution.

Examples of agitators that can be used in the first treatment include a ball mill or other media-type dispersing device, a Dispermill or other single-shaft or twin-shaft mixer, or the like.

The stirring time (processing time of the first treatment) for which the agitator is used is not particularly limited, but is preferably 10 to 120 minutes, and more preferably 15 to 40 minutes. Fine particle formation (fine-dispersion) of the pigments can thereby be efficiently advanced without reducing the production properties of the color filter ink.

The speed of the stirring vanes of the agitator in the first treatment is not particularly limited, but is preferably 1000 to 5000 rpm, and more preferably 1200 to 3800 rpm. Fine particle formation (fine-dispersion) of the pigments can thereby be efficiently advanced without reducing the production properties of the color filter ink. Degradation, change in qualities, and the like of the polymer W, dispersing agent, and other components due to heat and the like can also be reliably prevented.

Second Treatment

A second treatment using second inorganic beads is performed after the first treatment. A pigment dispersion is thereby obtained in which the pigment particles are adequately fine-dispersed.

The second treatment may be performed in a state in which the first inorganic beads are included, but the first inorganic beads are preferably removed prior to the second treatment. Fine particle formation (fine-dispersion) of the pigments in the second treatment can thereby be performed with particularly good efficiency. The first inorganic beads can be easily and reliably removed by filtration or the like, for example.

The second inorganic beads used in the second treatment preferably have a smaller grain size than the first inorganic beads used in the first treatment. The pigments can thereby be adequately formed into fine particles (fine-dispersed) in the color filter ink ultimately obtained, particularly good dispersion stability (long-term dispersion stability) of the pigment particles in the color filter ink over a long period of time can be obtained, and particularly good discharge stability of droplets can be obtained.

The average grain size of the second inorganic beads is not particularly limited, but is preferably 0.03 to 0.3 mm, and more preferably 0.05 to 0.2 mm. When the average grain size of the second inorganic beads is within the aforementioned range, the pigments can be formed into fine particles (fine-dispersed) with particularly good efficiency in the fine-dispersion step as a whole. In contrast, when the average grain size of the second inorganic beads is less than the lower limit of the aforementioned range, severe reduction of the efficiency of fine particle formation (grain size reduction) of the pigment particles by the second treatment tends to occur according to the type and other characteristics of the pigments. When the average grain size of the second inorganic beads exceeds the upper limit of the aforementioned range, fine particle formation (fine-dispersion) of the pigment particles can be difficult to adequately advance.

The amount of the second inorganic beads used is not particularly limited, but is preferably 100 to 600 parts by weight, and more preferably 200 to 500 parts by weight with respect to 100 parts by weight of the polymer M solution.

The second treatment can be performed using various types of agitators.

Examples of agitators that can be used in the second treatment include a ball mill or other media-type dispersing device, a Dispermill or other single-shaft or twin-shaft mixer, or the like.

The stirring time (processing time of the second treatment) for which the agitator is used is not particularly limited, but is preferably 10 to 120 minutes, and more preferably 15 to 40 minutes. Fine particle formation (fine-dispersion) of the pigments can thereby be adequately advanced without reducing the production properties of the color filter ink.

The speed of the stirring vanes of the agitator in the second treatment is not particularly limited, but is preferably 1000 to 5000 rpm, and more preferably 1200 to 3800 rpm. Fine particle formation (fine-dispersion) of the pigments can thereby be efficiently advanced without reducing the production properties of the color filter ink. Degradation, change in qualities, and the like of the dispersing agent and other components due to heat and the like can also be reliably prevented.

A case was described above in which the fine-dispersion process was performed in two stages, but three or more stages of processing may also be performed. In such a case, the inorganic beads used in the later stages preferably have a smaller diameter than the inorganic beads used in the first stages. In other words, the average grain size of the inorganic beads ($n^{th}$ inorganic beads) used in the $n^{th}$ process is preferably smaller than the average grain size of the inorganic beads ($(n-1)^{th}$ inorganic beads) used in the $(n-1)^{th}$ process. By satisfying such a relationship, the pigment particles can be formed into fine particles (fine-dispersed) with particularly good efficiency, and the diameter of the pigment particles can be reduced in the color filter ink ultimately obtained.

In the fine-dispersion step (e.g., the first treatment and the second treatment), the solvent may be used for dilution or the like, for example, as needed.

Dilution Step

The pigment dispersion obtained in a fine-dispersion step such as described above is mixed with a resin material for dilution (resin component other than the polymer M) (dilution step). The color filter ink is thereby obtained.

The polymer M constituting the resin material is thus included in the system during the fine-dispersion step in the present embodiment, and an additional resin component (dilution resin) is used after the fine-dispersion step. Particularly good dispersion stability of the pigment in the color filter ink (long-term stability of the color filter ink) is thereby obtained, and the colored portion formed using the color filter ink can be provided with particularly good adhesion to a substrate, for example.

A polymer other than the polymer M, such as the polymers X, Y, Z, W described above, or another polymer, for example, may be used as the resin material added in the present step, but the polymer X and/or polymer Y is preferably used. The polymer M may be used in the present step as well as in the previously described polymer M solution preparation step.

The present step is preferably performed in a state in which the second inorganic beads used in the second treatment have been removed. The second inorganic beads can be easily and reliably removed by filtration, for example.

The present step can be performed using various types of agitators.

Examples of agitators that can be used in the present step include a Dispermill or other single-shaft or twin-shaft mixer, or the like.

The stirring time (processing time of the present step) for which the agitator is used is not particularly limited, but is preferably 1 to 60 minutes, and more preferably 15 to 40 minutes.

The speed of the stirring vanes of the agitator in the present step is not particularly limited, but is preferably 1000 to 5000 rpm, and more preferably 1200 to 3800 rpm.

In the present step, a liquid having a different composition than the solvent used in the aforementioned step may be added. A color filter ink having the desired characteristics can thereby be reliably obtained while the polymer M is appropriately dissolved in the aforementioned polymer M solution preparation step, the dispersing agent is appropriately dispersed, and the pigment particles are appropriately fine-dispersed in the fine-dispersion step.

In the present step, at least a portion of the solvent used in the aforementioned step may be removed prior to mixing of the pigment dispersion and the dilution resin, or after mixing of the pigment dispersion and the dilution resin. The composition of the solvent in the polymer M solution preparation step and the fine-dispersion step, and the composition of the liquid medium in the color filter ink ultimately obtained can thereby be made to differ from each other. As a result, a color filter ink having the desired characteristics can be reliably obtained while the polymer M is appropriately dissolved in the aforementioned polymer M solution preparation step, the dispersing agent is appropriately dispersed, and the pigment particles are appropriately fine-dispersed in the fine-dispersion step. The solvent can be removed by placing the liquid to be removed in a reduced-pressure atmosphere, heating, or another method, for example.

Color Filter Ink Set

The color filter ink such as that described above is used in the manufacture of a color filter using an inkjet method. A color filter ordinarily has colored portions having a plurality of colors (ordinarily, RGB corresponding to the three primary colors of light) in correlation with a full color display. A plurality of types of color filter ink that correspond to the plurality of colors of colored portions is used in the formation of the colored portions. Specifically, an ink set (color filter ink set) provided with a plurality of colors of color filter ink is used to manufacture color filters. In the present invention, it is sufficient insofar as a color filter ink such as described above is used to form at least one type of colored portion in the manufacturing of a color filter, but the color filter ink is preferably used to form all of the colors of colored portions.

More specifically, the color filter ink set of the present invention is preferably provided with red ink that includes a red colorant (particularly a red pigment), green ink that includes a green colorant (particularly a green pigment), and blue ink that includes a blue colorant (particularly a blue pigment). The color filter manufactured using the color filter ink set can thereby be provided with a particularly wide color reproduction range. The balance of luminance between colors in the color filter can also be easily adjusted, and an image having excellent quality can be suitably displayed.

Color Filter

Following is a description of an example of a color filter manufactured using the color filter ink (ink set) described above.

FIG. 1 is a sectional view showing a preferred embodiment of the color filter of the present invention.

A color filter 1 is provided with a substrate 11 and colored portions 12 formed using the color filter ink described above, as shown in FIG. 1. The colored portions 12 are provided with a first colored portion 12A, a second colored portion 12B, and a third colored portion 12C, having mutually different colors. A partition wall 13 is disposed between adjacent colored portions 12.

Substrate

The substrate 11 is a plate-shaped member having optical transparency, and has a function for holding the colored portions 12 and the partition wall 13.

It is preferred that the substrate 11 be essentially composed of a transparent material. A clearer image can thereby be formed by light transmitted through the color filter 1.

The substrate 11 is preferably one having excellent heat resistance and mechanical strength. Deformations or the like caused by, e.g., heat applied during the manufacture of the color filter 1 can thereby be reliably prevented. Examples of a constituent material of the substrate 11 that satisfies such conditions include glass, silicon, polycarbonate, polyester, aromatic polyamide, polyamidoimide, polyimide, norbornene-based ring-opening polymers, and hydrogenated substances.

Colored Portions

The colored portions 12 are formed using a color filter ink (color filter ink set) such as that described above.

Since the colored portions 12 are formed using a color filter ink (color filter ink set) such as that described above, they are formed by the desired quantity of ink, have the desired shape (highly flat surface), and have little variation in characteristics between pixels, and unintentional color mixing (mixing of a plurality of color filter inks) and the like is reliably prevented. For this reason, the color filter 1 is highly reliable in that the occurrence of unevenness of color and saturation, and the like is suppressed. The color filter 1 also has excellent contrast and excellent coloration properties of the colored portions 12.

Each colored portion 12 is disposed inside a cell 14, which is an area enclosed by a later-described partition wall 13.

The first colored portion 12A, the second colored portion 12B, and the third colored portion 12C have mutually different colors. For example, the first colored portion 12A can be a red filter area (R), second colored portion 12B can be a green filter area (G), and the third colored portion 12C can be a blue filter area (B).

The colored portions 12A, 12B, 12C as a single set of different colors constitute a single pixel. A predetermined number of the colored portions 12 are disposed in the lateral and longitudinal directions in the color filter 1. For example, when the color filter 1 is a color filter for high definition, 1366×768 pixels are disposed; when the color filter is a color filter for full high definition, 1920×1080 pixels are disposed; and when the color filter is a color filter for super high definition, 7680×4320 pixels are disposed. The color filter 1 may be provided with spare pixels outside of the effective area, for example.

Partition Wall

A partition wall (bank) 13 is disposed between adjacent colored portions 12. Adjacent colored portions 12 can thereby be reliably prevented from color mixing, and as a result, a sharp image can be reliably displayed.

The partition wall 13 may be composed of a transparent material, but is preferably composed of material having light-blocking properties. An image with excellent contrast can thereby be displayed. The color of the partition wall (light-blocking portion) 13 is not particularly limited, but black is preferred. Accordingly, the contrast of a displayed image is particularly good.

The height of the partition wall 13 is not particularly limited, but is preferably about the same as the thickness of the colored portions 12. Color mixing between adjacent colored portions 12 can thereby be reliably prevented. The specific thickness of the partition wall 13 is preferably 0.1 to 10 μm, and more preferably 0.5 to 3.5 μm. Color mixing between adjacent colored portions 12 can thereby be reliably prevented, and image display devices and electronic devices provided with the color filter 1 can be provided with excellent visual angle characteristics.

The partition wall 13 may be composed of any material, but is preferably composed principally of a resin material, for example. Accordingly, a partition wall 13 having a desired shape can be easily formed using a method described hereinafter. In the case that the partition wall 13 functions as a light-blocking portion, carbon black or another light-absorbing material may be included as a constituent element of the partition wall.

Method for Manufacturing Color Filter

Next, an example of the method for manufacturing the color filter 1 will be described.

Figure 5:
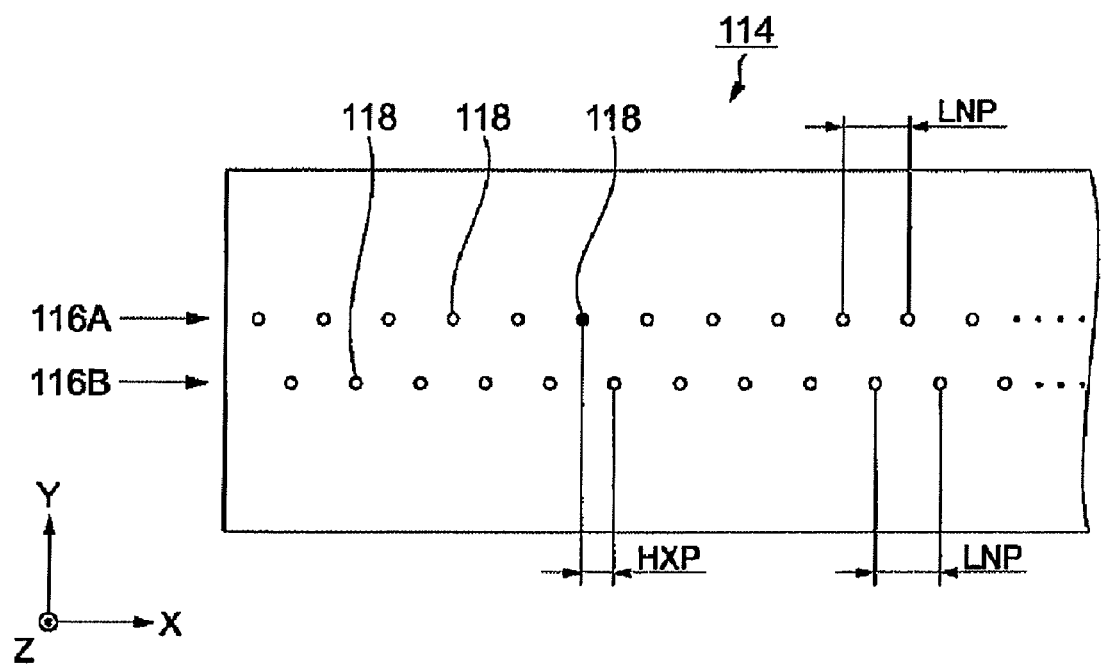
FIG. 5 is a view showing the bottom surface of the droplet discharge head in the droplet discharge device shown in FIG. 3
Figure 6:
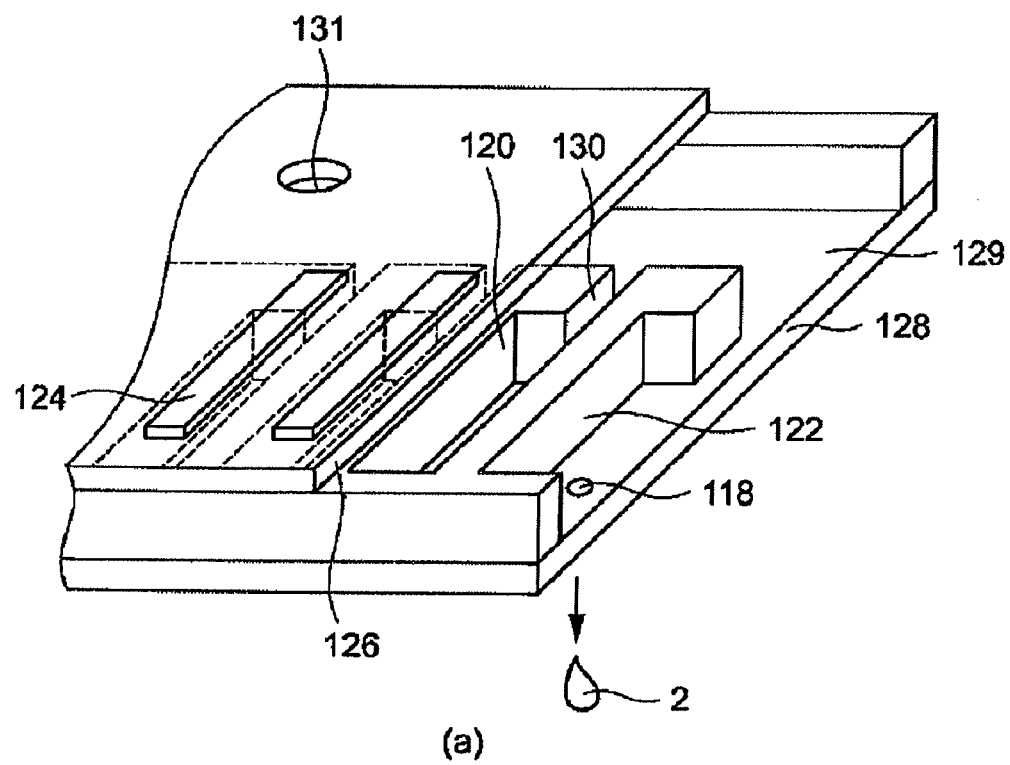
Figure 6:
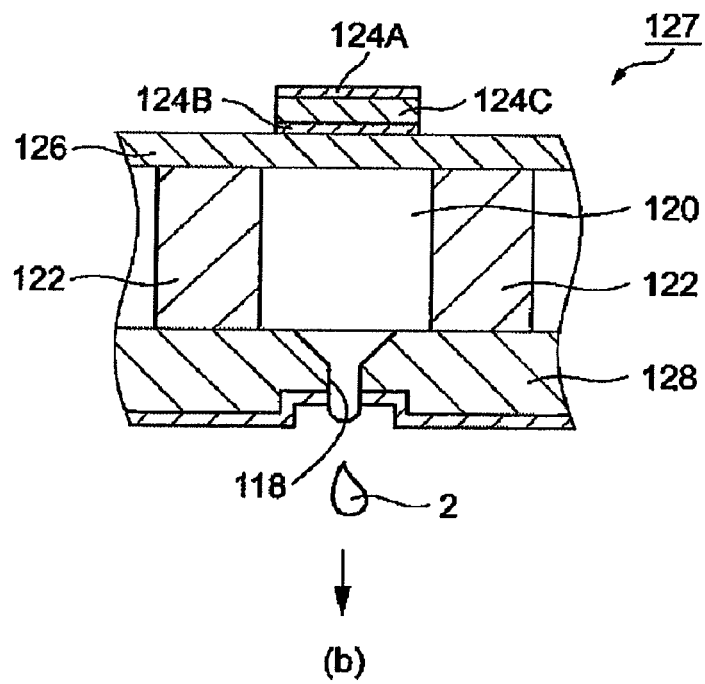

FIG. 2 is a cross-sectional view showing a method for manufacturing a color filter; FIG. 3 is a perspective view showing the droplet discharge device used in the manufacture of the color filter; FIG. 4 is a view of droplet discharge means in the droplet discharge device shown in FIG. 3, as seen from the stage side; FIG. 5 is a view showing the bottom surface of the droplet discharge head in the droplet discharge device shown in FIG. 3; and FIG. 6 is a view showing the droplet discharge head in the droplet discharge device shown in FIG. 3, wherein FIG. 6(a) is a cross-sectional perspective view and FIG. 6(b) is a cross-sectional view.

The present embodiment has a substrate preparation step (1a) for preparing a substrate 11, a partition wall formation step (1b, 1c) for forming a partition wall 13 on the substrate 11, an ink application step (1d) for applying color filter ink 2 into an area surrounded by the partition wall 13 by using an inkjet method, and a colored portion formation step (1e) for forming solid colored portions 12 by removing the liquid medium from the color filter ink 2 and curing the resin material, as shown in FIG. 2.

Substrate Preparation Step

First, a substrate 11 is prepared (1a). It is preferred that the substrate 11 to be prepared in the present step undergo a washing treatment. The substrate 11 to be prepared in the present step may be washed by chemical treatment using a silane-coupling agent or the like, a plasma treatment, ion plating, sputtering, gas phase reaction, vacuum deposition, or another suitable washing treatment.

Partition Wall Formation Step

Next, a radiation-sensitive composition is applied to substantially the entire surface of one of the surfaces of the substrate 11 to form (1b) a coated film 3. A prebaking treatment may be performed as required after the radiation-sensitive composition has been applied to the substrate 11. The prebaking treatment may be carried out under the conditions of, e.g., a heating temperature of 50 to 150° C. and a heating time of 30 to 600 seconds.

Next, a partition wall 13 is formed (1c) by irradiating the surface via a photomask, performing a post exposure bake (PEB), and carrying out a development treatment using an alkali development fluid. PEB can be carried out under the following example conditions: a heating temperature of 50 to 150° C., a heating time of 30 to 600 seconds, and a radiation intensity of 1 to 500 mJ/cm$^2$. The development treatment can be performed using, e.g., fluid overflow, dipping, vibration soaking, or another method, and the development treatment time can be set to 10 to 300 seconds, for example. After the development treatment, a post baking treatment may be performed as required. The post baking treatment can be carried out under the following example conditions: a heating temperature of 150 to 280° C. and a heating time of 3 to 120 minutes.

The coated film 3 may also be subjected to a liquid-repellent treatment prior to development. For example, a fluororesin may be applied to the coated film 3 by a stamping method or the like prior to development, or the surface of the coated film 3 (radiation-sensitive composition) may be doped with fluorine by a plasma polymerization treatment. Applying such a treatment makes only the bank surface (upper surface in the drawing; area other than the inner wall surface) fluid repellent, and imparts flatness to the surface of the colored portion 12 formed in a subsequent step. Among radiation-sensitive compositions, a fluororesin having a low specific gravity may be added so as to orient only the surface.

Ink Application Step

Next, the color filter ink 2 is applied (1d) to the cells 14 surrounded by the partition wall 13 using the inkjet method.

The present step is carried out using a plurality of types of color filter inks 2 that correspond to the plurality of colors of the colored portions 12 to be formed. In this case, a partition wall 13 is provided, and mixing of two or more color filter inks 2 can therefore be reliably prevented.

The color filter ink 2 as described above includes the resin material (polymer M), and has excellent droplet discharge stability. The droplet discharge quantity can therefore be easily and reliably controlled while flight deflection and other problems are reliably prevented from occurring even when the color filter 1 being manufactured is large, or when a large number of color filters 1 are continuously manufactured. As a result, color mixing, uneven color/saturation, reduced contrast, and other problems can be reliably prevented in the manufactured color filter 1.

The color filter ink 2 is discharged using a droplet discharge device such as that shown in FIGS. 3 to 6.

The droplet discharge device 100 used in the present step is provided with a tank 101 for holding the color filter ink 2, a tube 110, and a discharge scan unit 102 to which the color filter ink 2 is fed from the tank 101 via the tube 110, as shown in FIG. 3. The discharge scan unit 102 is provided with droplet discharge means 103 in which a plurality of droplet discharge heads (inkjet heads) 114 is mounted on a carriage 105, a first position controller 104 (movement means) for controlling the position of the droplet discharge means 103, a stage 106 for holding the substrate 11 (hereinafter simply referred to as "substrate 11") on which the partition wall 13 is formed in an aforementioned step, a second position controller 108 (movement means) for controlling the position of the stage 106, and control means 112. The tank 101 and the plurality of droplet discharge heads 114 in the droplet discharge means 103 are connected by the tube 110, and the color filter ink 2 is fed by compressed air from the tank 101 to each of the plurality of droplet discharge heads 114.

The first position controller 104 moves the droplet discharge means 103 along the X-axis direction and Z-axis direction orthogonal to the X-axis direction, in accordance with a signal from the control means 112. The first position controller 104 also has a function for rotating the droplet discharge means 103 about the axis parallel to the Z-axis. In the present embodiment, the Z-axis direction is the direction parallel to the perpendicular direction (i.e., the direction of gravitational acceleration). The second position controller 108 moves the stage 106 along the Y-axis direction, which is orthogonal to both the X-axis direction and the Z-axis direction, in accordance with a signal from the control means 112. The second position controller 108 also has a function for rotating the stage 106 about the axis parallel to the Z-axis.

The stage 106 has a surface parallel to both the X-axis direction and the Y-axis direction. The stage 106 is configured so as to be capable of securing or holding the substrate 11 on the planar surface thereof, the substrate having the cells 14 in which the color filter ink 2 is to be applied.

As described above, the droplet discharge means 103 is moved in the X-axis direction by the first position controller 104. On the other hand, the stage 106 is moved in the Y-axis direction by the second position controller 108. In other words, the relative position of the droplet discharge heads 114 in relation to the stage 106 is changed by the first position controller 104 and the second position controller 108 (the substrate 11 held on the stage 106 and the droplet discharge means 103 move in a relative fashion).

The control means 112 is configured so as to receive from an external information processor discharge data that express the relative position in which the color filter ink 2 is to be discharged.

The droplet discharge means 103 has a plurality of droplet discharge heads 114, which have substantially the same structure as each other, and a carriage 105 for holding the droplet discharge heads 114, as shown in FIG. 4. In the present embodiment, the number of droplet discharge heads 114 held in the droplet discharge means 103 is eight. Each of the droplet discharge heads 114 has a bottom surface on which a plurality of later-described nozzles 118 is disposed. The shape of the bottom surface of each of the droplet discharge heads 114 is a polygon having two short sides and two long sides. The bottom surface of the droplet discharge heads 114 held in the droplet discharge means 103 faces the stage 106 side, and the long-side direction and the short-side direction of the droplet discharge heads 114 are parallel to the X-axis direction and the Y-axis direction, respectively.

The droplet discharge heads 114 have a plurality of nozzles 118 aligned in the X-axis direction, as shown in FIG. 5. The plurality of nozzles 118 is disposed so that a nozzle pitch HXP in the X-axis direction in the droplet discharge heads 114 has a prescribed value. The specific value of the nozzle pitch HXP is not particularly limited, but may be 50 to 90 μm, for example. In this case, "the nozzle pitch HXP in the X-axis direction in the droplet discharge heads 114" corresponds to the pitch between a plurality of nozzle images obtained by projecting all of the nozzles 118 in the droplet discharge heads 114 on the X axis along the Y-axis direction.

In the present embodiment, the plurality of nozzles 118 in the droplet discharge heads 114 forms a nozzle row 116A and a nozzle row 116B, both of which extend in the X-axis direction. The nozzle row 116A and the nozzle row 116B are disposed in parallel across an interval. In the present embodiment, 90 nozzles 118 are aligned in a row in the X-axis direction with a fixed interval LNP in each nozzle row 116A and nozzle row 116B. The specific value of LNP is not particularly limited, but may be 100 to 180 μm, for example.

The position of the nozzle row 116B is offset in the positive direction of the X-axis direction (to the right in FIG. 5) by half the length of the nozzle pitch LNP in relation to the position of the nozzle row 116A. For this reason, the nozzle pitch HXP in the X-axis direction of the droplet discharge heads 114 is half the length of the nozzle pitch LNP of the nozzle row 116A (or the nozzle row 116B).

Therefore, the nozzle line density in the X-axis direction of the droplet discharge heads 114 is twice the nozzle line density of the nozzle row 116A (or the nozzle row 116B). In the present specification, "the nozzle line density in the X-axis direction" corresponds to the number per unit length of the plurality of nozzle images obtained by projecting a plurality of nozzles on the X-axis along the Y-axis direction. Naturally, the number of nozzle rows included in the droplet discharge heads 114 is not limited to two rows. The droplet discharge heads 114 may include M number of nozzle rows. In this case, M is a natural number of 1 or higher. In this case, the plurality of nozzles 118 in each of the M number of nozzle rows is aligned at a pitch having a length that is M times that of the nozzle pitch HXP. In the case that M is a natural number of 2 or higher, another (M−1) number of nozzle rows are offset in the X-axis direction without overlapping, by a length i times that of the nozzle pitch HXP, in relation to a single nozzle row among the M number of nozzle rows. Here, i is a natural number from 1 to (M−1).

In the present embodiment, since the nozzle row 116A and the nozzle row 116B are each composed of 90 nozzles 118, a single droplet discharge head 114 has 180 nozzles 118. However, five nozzles at each end of the nozzle row 116A are set as "reserve nozzles." Similarly, five nozzles at each end of the nozzle row 116B are set as "reserve nozzles." The color filter ink 2 is not discharged from these 20 "reserve nozzles." For this reason, 160 nozzles 118 among the 180 nozzles 118 in the droplet discharge heads 114 function as nozzles for discharging the color filter ink 2.

In the droplet discharge means 103, the plurality of droplet discharge heads 114 is disposed in two rows along the X-axis direction, as shown in FIG. 4. One of the rows of droplet discharge heads 114 and the other row of droplet discharge heads 114 are disposed so that a portion of the droplet discharge heads overlap as viewed from the Y-axis direction, with consideration given to the reserve nozzles. The nozzles 118 for discharging the color filter ink 2 are thereby configured so as to be continuous in the X-axis direction at the nozzle pitch HXP across the length of the dimension in the X-axis direction of the substrate 11 in the droplet discharge means 103.

In the droplet discharge means 103 of the present embodiment, the droplet discharge heads 114 are disposed so as to cover the entire length of the dimension in the X-axis direction of the substrate 11. However, the droplet discharge means in the present invention may cover a portion of the length of the dimension in the X-axis direction of the substrate 11.

Each of the droplet discharge heads 114 is an inkjet head, as shown in the diagram. More specifically, each of the droplet discharge heads 114 is provided with a vibration plate 126 and a nozzle plate 128. A fluid reservoir 129 in which the color filter ink 2 fed from the tank 101 via a hole 131 is constantly filled is positioned between the vibration plate 126 and the nozzle plate 128.

A plurality of partition walls 122 is disposed between the vibration plate 126 and the nozzle plate 128. The portions enclosed by the vibration plate 126, the nozzle plate 128, and a pair of partition walls 122 are cavities 120. Since the cavities 120 are disposed in correspondence with the nozzles 118, the number of cavities 120 and the number of nozzles 118 is the same. The color filter ink 2 is fed to the cavities 120 from the fluid reservoir 129 via supply ports 130 positioned between pairs of partition walls 122.

An oscillator 124 is positioned on the vibration plate 126 in correspondence with each of the cavities 120. The oscillator 124 includes a piezoelement 124C, and a pair of electrodes 124A, 124B that sandwich the piezoelement 124C. The color filter ink 2 is discharged from the corresponding nozzle 118 by applying a drive voltage between the pair of electrodes 124A, 124B. The shape of the nozzles 118 is adjusted so that the color filter ink 2 is discharged in the Z-axis direction from the nozzles 118.

The nozzle plate 128 is composed of a stainless steel base, a silica film composed primarily of a silica compound provided so as to cover the base, and a liquid-repellent film that includes a fluoroalkyl compound provided so as to cover the silica film.

The silica film also has the functions of bonding the liquid-repellent film and the stainless steel base together, and protecting the stainless steel base.

The control means 112 (see FIG. 3) may be configured so as to independently apply signals to each of the plurality of oscillators 124. In other words, the volume of the color filter ink 2 discharged from the nozzles 118 can be controlled for each nozzle 118 in accordance with a signal from the control means 112. The control means 112 can also set the nozzles 118 that will perform a discharge operation during a coating scan, as well as the nozzles 118 that will not perform a discharge operation.

In the present specification, the portion that includes a single nozzle 118, a cavity 120 that corresponds to the nozzle 118, and the oscillator 124 that corresponds to the cavity 120 will be referred to as a "discharge portion 127". In accordance with this designation, a single droplet discharge head 114 has the same number of discharge portions 127 as the number of nozzles 118.

The color filter ink 2 corresponding to the plurality of colored portions 12 of the color filter 1 is applied to the cells 14 using such a droplet discharge device 100. The color filter ink 2 can be selectively applied with good efficiency in the cells 14 by using such a device. As described above, the color filter ink 2 has excellent stable discharge properties, and flight deflection, loss of stability in the droplet discharge quantity, and other problems are much less likely to occur, even when droplet discharge is carried out over a long period of time. Therefore, it is possible to reliably prevent problems such as the mixing (color mixing) of a plurality of types of ink used in the formation of colored portions having different colors, and variability in the color saturation between the plurality of colored portions in which the same color saturation is normally required. In the configuration of the diagrams, the droplet discharge device 100 has a tank 101 for holding the color filter ink 2, a tube 110, and other components for only one color, but these members may have a plurality of colors the correspond to the plurality of colored portions 12 of the color filter 1. Also, in the manufacture of the color filter 1, a plurality of droplet discharge devices 100 corresponding to a plurality of color filter inks 2 may be used.

In the present invention, the droplet discharge heads 114 may use an electrostatic actuator in place of the piezoelement as the drive element. The droplet discharge heads 114 may have a configuration in which an electrothermal converter is used and color filter ink is discharged using the thermal expansion of material produced by an electrothermal converter.

Colored Portion Formation Step (Curing Step)

Next, the liquid medium is removed from the color filter ink 2 in the cells 14, and solid colored portions 12 are formed by curing the resin material (1*e*). The color filter 1 is obtained in this manner.

Since the color filter ink includes the polymer M, as described above, it is possible to effectively prevent the occurrence of unwanted surface irregularities during formation of the colored portion 12, and to provide the surface of the colored portion 12 with a high degree of flatness. Unwanted aggregation of the pigment can also be prevented and suppressed even when the color filter ink includes a pigment as the colorant. For such reasons as these, the obtained color filter 1 allows images to be displayed with excellent contrast and brightness.

The present step is ordinarily carried out by heating. Performing the present step by heating enables the formed colored portion 12 to have particularly good adhesion to the substrate 11. It is also possible to reliably prevent the liquid medium from remaining in the formed colored portion 12. As a result, the color filter 1 can be provided with particularly good durability and reliability. The production properties of the color filter 1 are also enhanced.

The heating temperature (temperature of the heated substrate 11) in the present step is not particularly limited, but is preferably 100 to 280° C., and more preferably 110 to 250° C. Curing of the resin material can thereby be efficiently promoted while preventing unwanted degradation, decomposition, and other problems with the constituent materials of the colored portion 12, and the liquid medium can also be suitably removed from the color filter ink 2.

The heating time in the present step is also not particularly limited, but is preferably 30 to 190 minutes, and more preferably 40 to 130 minutes.

The present step may also include multiple heat treatments at different temperatures. Specifically, the present step may include a first heat treatment for heating the substrate 11 at a relatively low temperature, and a second heat treatment for heating the substrate 11 at a temperature higher than that of the first heat treatment.

Unwanted degradation, decomposition, and the like of the constituent materials of the colored portion 12 can thereby be prevented, the production properties of the color filter 1 can be enhanced, and the liquid medium can be effectively prevented from remaining in the formed colored portion 12.

The surface of the colored portion 12 can also be made more flat by performing a first heat treatment for heating the substrate 11 at a relatively low temperature, and a second heat treatment for heating the substrate 11 at a temperature higher than that of the first heat treatment in the present step.

In such a case, heating the substrate 11 at a relatively low temperature in the first heat treatment makes it possible to gradually remove the liquid medium while preventing convection of the color filter ink 2, and to eliminate or reduce the fluidity of the color filter ink while the surface of the color filter ink 2 is kept flat. Heating at a relatively low temperature also makes it possible to prevent unwanted curing of the resin material.

In the second heat treatment, the liquid medium that could not be removed by the first heat treatment can be completely removed. When the resin material is reacted and the color filter ink 2 is cured in the present step, the color filter ink 2 that was fixed in a flat surface state in the first heat treatment can be efficiently cured in the flat surface state thereof.

When the first heat treatment and second heat treatment are performed in the present step as described above, the treatment temperature (temperature of the heated substrate 11) in the first heat treatment is not particularly limited, but is preferably 30 to 100° C., and more preferably 40 to 80° C. The liquid medium can thereby be suitably removed from the color filter ink 2 while convention of the color filter ink 2 is reliably prevented.

The amount of time for the first heat treatment is also not particularly limited, but is preferably 3 to 50 minutes, and more preferably 5 to 40 minutes.

The treatment temperature (temperature of the heated substrate 11) in the second heat treatment is not particularly limited, but is preferably 120 to 280° C., and more preferably 150 to 250° C. The liquid medium that could not be removed by the first heat treatment can thereby be completely removed. When the resin material (curable resin material) is reacted and the color filter ink 2 is cured in the present step, the color filter ink 2 that was fixed in a flat surface state in the first heat treatment can be efficiently cured in the flat surface state thereof.

The amount of time for the second heat treatment is also not particularly limited, but is preferably 25 to 150 minutes, and more preferably 30 to 100 minutes.

In the present step, such treatments as those involving irradiation of active energy rays, and treatments in which the substrate 11 to which the color filter ink 2 has been applied is placed under a reduced-pressure environment, for example, may also be performed.

The curing reaction of the resin material can be made to proceed with good efficiency by irradiating active energy rays; the curing reaction of the resin material can be reliably promoted even when the heating temperature is relatively low; the occurrence of adverse effects on the substrate 11 and other components can reliably prevented; and other effects can be obtained. Examples of the active energy rays that may be used include light rays of various wavelengths, e.g., UV rays, X-rays, g-rays, i-rays, and excimer lasers.

The substrate 11 on which the color filter ink 2 has been applied can be placed under a reduced-pressure environment (reduced-pressure treatment), whereby the liquid medium can be reliably removed and adverse effects on the substrate 11, the resulting colored portions 12, and the like can be more reliably prevented even when the heating temperature is relatively low. The joint use of heat treatment and reduced-pressure treatment also enables the colored portions to be formed more efficiently.

Image Display Device

Preferred embodiments of the liquid crystal display device, which is an image display device (electrooptic device) having the color filter 1, will next be described.

Figure 7:
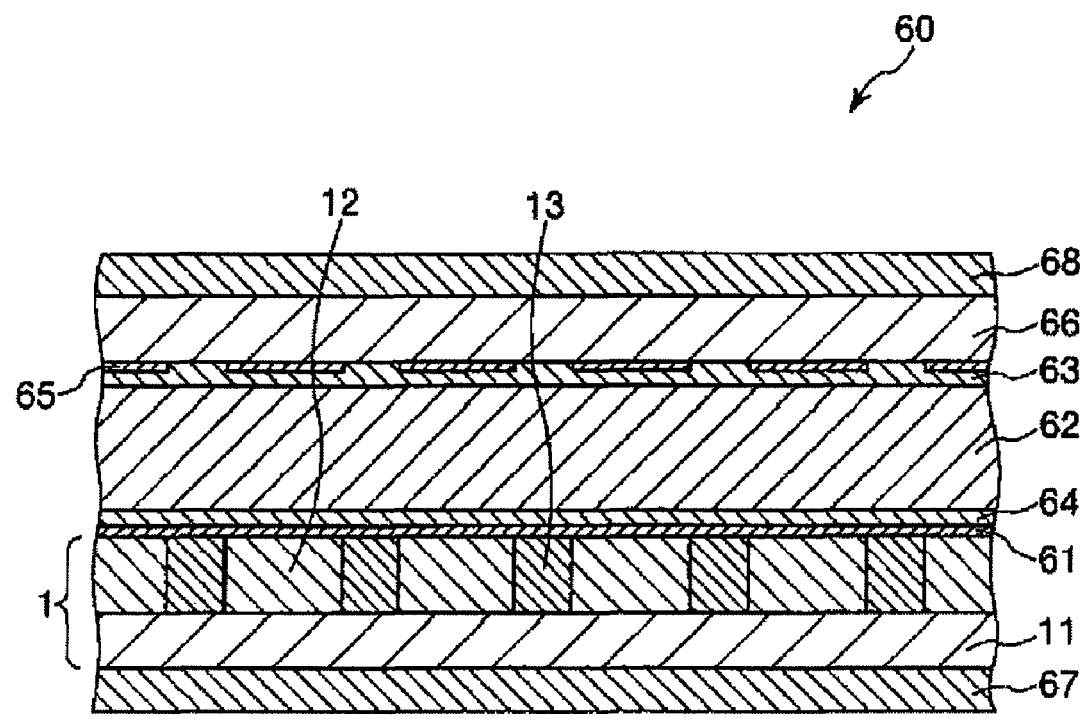
FIG. 7 is a sectional view showing an embodiment of the liquid crystal display device.

FIG. 7 is a cross-sectional view showing a preferred embodiment of the liquid crystal display device. As shown in the diagram, the liquid crystal display device 60 has a color filter 1, a substrate (opposing substrate) 66 arranged on the surface on which the colored portions 12 of the color filter 1 are disposed, a liquid crystal layer 62 composed of a liquid crystal sealed in the gaps between the color filter 1 and the substrate 66, a polarizing plate 67 disposed on the surface (lower side in FIG. 7) opposite from the surface that faces the liquid crystal layer 62 of the substrate 11 of the color filter 1, and a polarizing plate 68 disposed on the side (upper side in FIG. 7) opposite from the surface that faces liquid crystal layer 62 of the substrate 66. A shared electrode 61 is disposed on the surface (the surface opposite from the surface facing the substrate 11 of the colored portions 12 and the partition wall 13) on which the colored portions 12 and the partition wall 13 of the color filter 1 are disposed. Pixel electrodes 65 are disposed in the form of a matrix in positions that correspond to the colored portions 12 of the color filter 1 on the substrate (opposing substrate) 66, facing the liquid crystal layer 62 and color filter 1. An alignment film 64 is disposed between the shared electrode 61 and the liquid crystal layer 62, and an alignment film 63 is disposed between the substrate 66 (pixel electrodes 65) and the liquid crystal layer 62.

The substrate 66 is a substrate having optical transparency with respect to visible light, and is a glass substrate, for example.

The shared electrode 61 and the pixel electrodes 65 are composed of a material having optical transparency with respect to visible light, and are ITO or the like, for example.

Since the color filter 1 of the present invention has excellent heat resistance and other characteristics, even when the electrode (shared electrode 61 in the configuration shown in the drawing) is formed on the color filter 1 (particularly when formed by vapor-phase film formation) during manufacturing, discoloration of the colored portion 12 is reliably prevented, change in qualities, degradation, and the like in the colored portion 12 are prevented, the color filter 1 can be provided with particularly good adhesion to the electrode (shared electrode 61), and a satisfactory voltage holding ratio (VHR) can be obtained.

Although not depicted in the diagram, a plurality of switching elements (e.g., TFT: thin film transistors) is disposed so as to correspond to the pixel electrodes 65. The pixel electrodes 65 corresponding to the colored portions 12 can be used to control the transmission properties of light in areas that correspond to the colored portions 12 (pixel electrodes 65) by controlling the state of the voltage applied between the shared electrode 61 and the pixel electrodes.

In the liquid crystal display device 60, light emitted from the backlight, which is not depicted, is incident from the polarizing plate 68 side (the upper side in FIG. 7). The light that passes through the liquid crystal layer 62 and enters the colored portions 12 (12A, 12B, 12C) of the color filter 1 is emitted from the polarizing plate 67 (lower side of FIG. 7) as light having a color that corresponds to the colored portions 12 (12A, 12B, 12C).

As described above, the colored portions 12 are formed using the color filter ink 2 (color filter ink set) of the present invention and therefore have reduced variability in the characteristics between colors and between pixels. As a result, an image having reduced unevenness of color and saturation, and the like between regions can be stably displayed in the liquid crystal display device 60. Since the colored portions 12 are formed using the color filter ink of the present invention, excellent contrast is obtained.

Electronic Device

A liquid crystal display device or another image display device (electrooptic device) 1000 having a color filter 1 such as that described above can be used in a display unit of a variety of electronic equipment.

FIG. 8 is a perspective view showing the configuration of a mobile (or notebook) personal computer to which the electronic equipment of the present invention has been applied.

In the diagram, a personal computer 1100 is composed of a main unit 1104 provided with a keyboard 1102, and a display unit 1106. The display unit 1106 is rotatably supported by the main unit 1104 via a hinge structure.

In the personal computer 1100, the display unit 1106 is provided with an image display device 1000.

Figure 9:
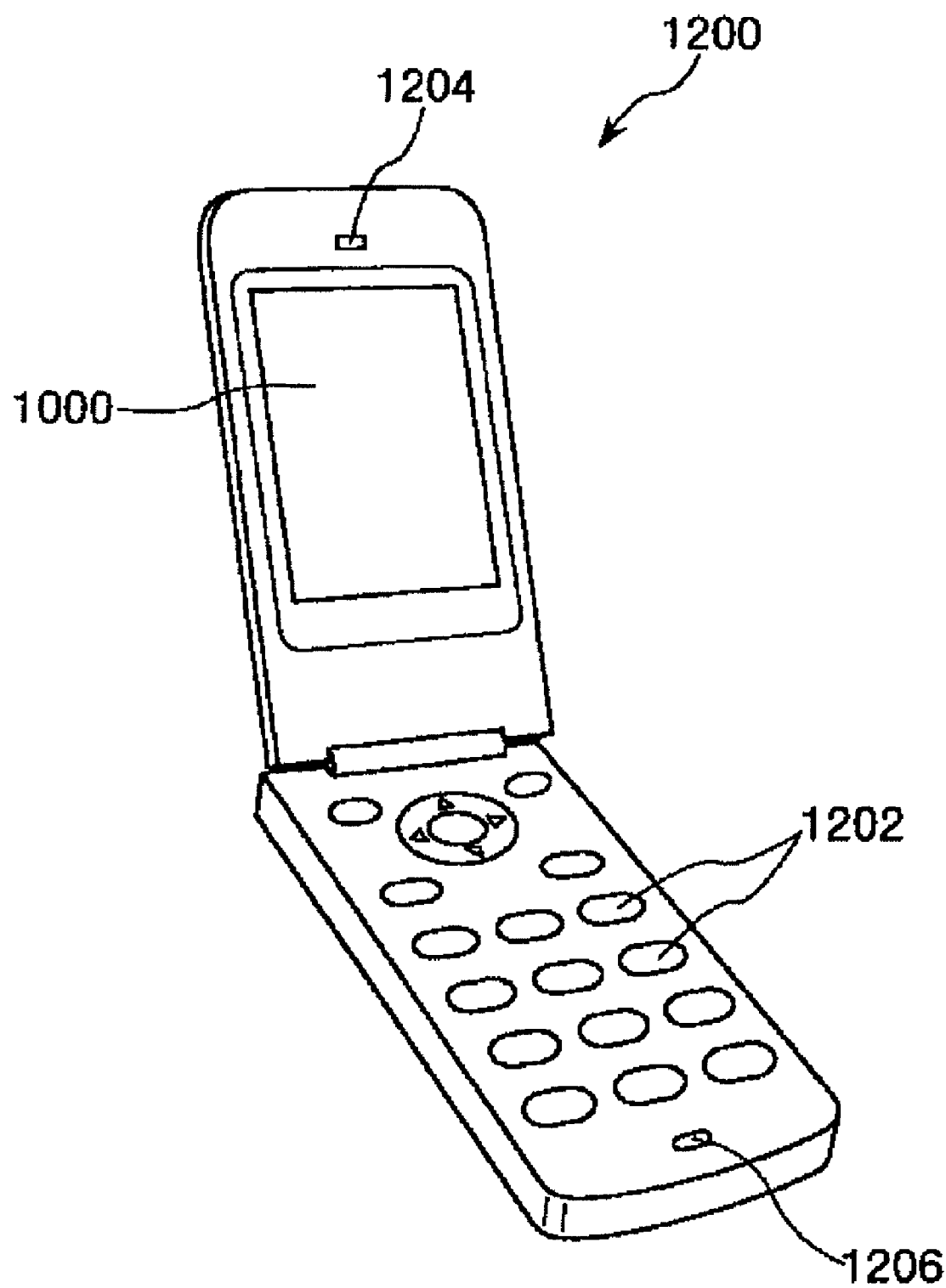
FIG. 9 is a perspective view showing the configuration of a portable telephone (including PHS) to which the electronic device of the present invention has been applied.

FIG. 9 is a perspective view showing the configuration of a portable telephone (including PHS) to which the electronic device of the present invention has been applied.

In the diagram, the portable telephone 1200 has a plurality of operating buttons 1202, an earpiece 1204, and a mouthpiece 1206, as well as an image display device 1000 provided to the display unit.

Figure 10:
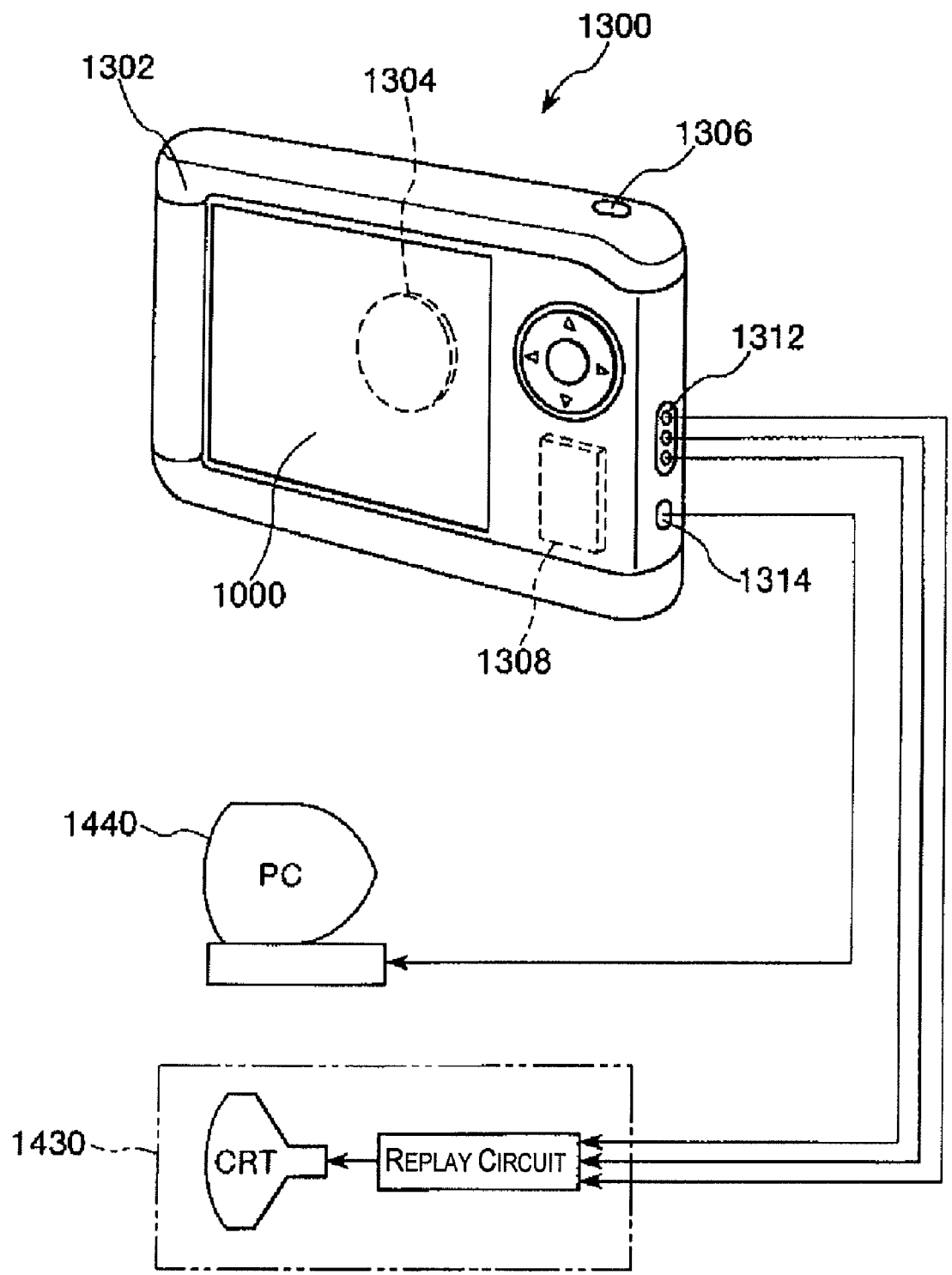
FIG. 10 is a perspective view showing the configuration of a digital still camera in which the electronic device of the present invention has been applied.

FIG. 10 is a perspective view showing the configuration of a digital still camera in which the electronic device of the present invention has been applied. In the diagram, connection to external apparatuses is displayed in a simplified manner.

In this case, an ordinary camera exposes a silver-salt photography film to the optical image of a photographed object, but in contrast, a digital still camera 1300 photoelectrically converts the optical image of a photographed image and generates an imaging signal (image signal) with the aid of a CCD (Charge Coupled Device) or another imaging element.

An image display device 1000 is disposed in the display portion on the back surface of a case (body) 1302 in the digital still camera 1300, is configured to perform display operation on the basis of a pickup signal from the CCD, and functions as a finder for displaying the photographed object as an electronic image.

A circuit board 1308 is disposed inside the case. The circuit board 1308 has a memory that can store (record) the imaging signal.

A photo-detection unit 1304 that includes an optical lens (imaging optical system), a CCD, and the like is disposed on the front surface side (back surface side in the configuration of the diagram) of the case 1302.

A photographer confirms the image of the object to be photographed displayed on the display unit, and the imaging signal of the CCD when a shutter button 1306 is pressed is transferred and stored in the memory of the circuit board 1308.

In the digital still camera 1300, a video signal output terminal 1312 and a data communication I/O terminal 1314 are disposed on the side surface of the case 1302. A television monitor 1430 is connected to the video signal output terminal 1312 as required, and a personal computer 1440 is connected to the data communication I/O terminal 1314 as required, as shown in the diagram. An imaging signal stored in the memory of the circuit board 1308 is configured to be outputted by a prescribed operation to the television monitor 1430 and the personal computer 1440.

The electronic device of the present invention may be applied to the above-described personal computer (mobile personal computer), portable telephone, and digital still camera, and other examples include televisions (e.g., liquid crystal display devices), video cameras, view finder-type and direct-view monitor-type video tape recorders, laptop personal computers, car navigation devices, pagers, electronic assistants (including those with a communication function), electronic dictionaries, calculators, electronic game devices, word processors, work stations, videophones, security television monitors, electronic binoculars, POS terminals, apparatuses having a touch panel (e.g., cash dispensers for financial institutions, and automatic ticketing machines), medical equipment (e.g., electronic thermometers, sphygmomanometers, blood glucose sensors, electrocardiograph display devices, ultrasound diagnostic devices, and endoscopic display devices), fish finders, various measuring apparatuses, instruments (e.g., instruments in vehicles, aircraft, and ships), flight simulators, and various other monitors, and projectors, and other projection display devices. Among these, televisions have display units that are tending to become markedly larger in recent years, but in electronic devices having such a large display unit (e.g., a display unit having a diagonal length of 80 cm or more), unevenness of color and saturation, and other problems particularly readily occur when a color filter manufactured using a conventional color filter ink is used. However, in accordance with the present invention, the occurrence of such problems can be reliably prevented. In other words, the effect of the present invention is more markedly demonstrated when application is made to an electronic device having a large display unit such as that described above.

The present invention above was described based on preferred embodiments, but the present invention is not limited to these embodiments.

For example, in the embodiments described above, color filter ink corresponding to the colored portions of various colors was applied inside the cells, the liquid medium was thereafter removed in a single process from the color filter ink of each color in the cells, and the resin material was cured. In other words, a process was described in which the colored portion formation step (curing step) was carried out a single time, but the ink application step and the colored portion formation step may be repeated for each color.

It is also possible to substitute or to add as another configuration the parts constituting a color filter, image display device, and electronic device with any part that demonstrates the same function. For example, in the color filter of the present invention, a protective film for covering the colored portions may be provided to the surface opposite from the surface facing the substrate of the colored portions. Damage, degradation, and the like of the colored portions can thereby be more effectively prevented.

The color filter ink of the present invention may be manufactured by any method, and is not limited to being manufactured using a method such as described above. For example, the color filter ink of the present invention may be manufactured by a method that does not have a dilution step, or a method that has a fine-dispersion step that is not multi-stage.

In the embodiments described above, a case in which an ink set for a color filter is provided with three types (three colors) of color filter inks corresponding to the three primary colors of light was mainly described, but the number and type (color) of color filter inks constituting the ink set for a color filter is not limited to the arrangement described above. For example, in the present invention, the ink set for a color filter may be one provided with four or more types of color filter inks.

EXAMPLES

Specific examples of the present invention will next be described.

1. Polymer Synthesis

Synthesis Example 1

As the medium (solvent), 100 parts by weight of diethylene glycol monobutyl ether acetate was placed in a reaction container (flask) provided with an agitator, a reflux condenser, a dropping funnel, a nitrogen introduction tube, and a temperature gauge, and heated to 80° C. Next, a solution in which 60 parts by weight of 2-[O-(1'-methylpropylideneamino)carboxyamino]ethyl(=2-(1-methylpropylideneamino oxycarbonylaminoethyl)methacrylate) methacrylate as the monomer component m1, 20 parts by weight of methacrylic acid as the monomer component m2, and 20 parts by weight of stearyl methacrylate as the monomer component m3 were dissolved in 30 parts by weight of diethylene glycol monobutyl ether acetate was dropped into the flask over 4 hours using a dropping pump. A solution in which 5 parts by weight of azobisdimethyl valeronitrile as a radical initiator (polymerization initiator) was dissolved in 90 parts by weight of diethylene glycol monobutyl ether acetate was also dropped into the flask over 4 hours using a separate dropping pump. After dropping of the polymerization initiator was completed, the solution was held at the same temperature (aged) for 4 hours and cooled to room temperature, and a polymer M1 was obtained as the polymer M indicated by Formula (8) above and containing the monomer components m1, m2, and m3.

Synthesis Examples 2 through 8

The same operation as synthesis example 1 described above was carried out, except that the types of monomer components and mediums (solvents) used to synthesize the polymers, and the ratios of components were adjusted, and the compositions of the polymers were varied as shown in Table 1. As a result, seven types of polymers M (polymers M2 through M8) were obtained.

Synthesis Example 9

As the medium (solvent), 314 parts by weight of diethylene glycol monobutyl ether acetate was placed in a reaction container (flask) provided with an agitator, a reflux condenser, a dropping funnel, a nitrogen introduction tube, and a temperature gauge, and heated to 90° C. Next, 20 parts by weight of 2,2'-azobis(isobutyronitrile) (AIBN) as a radical initiator and 30 parts by weight of diethylene glycol monobutyl ether acetate (solvent) were added, and a solution in which 180 parts by weight of the monomer component (compound) x1 indicated by Formula (11) above, 90 parts by weight of the monomer component (compound) x2 indicated by Formula (12) above, 15 parts by weight of the monomer component (compound) x3 indicated by Formula (13) above, 15 parts by weight of the monomer component (compound) x4 indicated by Formula (14) above, and 50 parts by weight of 2,2'-azobis(isobutyronitrile) (AIBN) were dissolved in 200 parts by weight of diethylene glycol monobutyl ether acetate was dropped into the flask over 5 hours using a dropping pump, and then aged for 4 hours. The solution was then cooled to room temperature, and a polymer X1 was obtained as the polymer X indicated by Formula (21) above and containing the monomer components x1, x2, x3, x4.

Synthesis Examples 10 and 11

The same operation as synthesis example 9 described above was carried out, except that the types of mediums (solvents) used to synthesize the polymers, and the ratios of components were adjusted, and the compositions of the polymers were varied as shown in Table 1. As a result, two types of polymers X (polymers X2 and X3) were obtained.

Synthesis Example 12

As the medium (solvent), 314 parts by weight of diethylene glycol monobutyl ether acetate was placed in a reaction container (flask) provided with an agitator, a reflux condenser, a dropping funnel, a nitrogen introduction tube, and a temperature gauge, and heated to 90° C. Next, 20 parts by weight of 2,2'-azobis(isobutyronitrile) (AIBN) as a radical initiator and 30 parts by weight of diethylene glycol monobutyl ether acetate (solvent) were added, and a solution in which 200 parts by weight of the monomer component (compound) y1 indicated by Formula (15) above, 100 parts by weight of the monomer component (compound) y2 indicated by Formula (16), and 50 parts by weight of 2,2'-azobis(isobutyronitrile) (AIBN) were dissolved in 200 parts by weight of diethylene glycol monobutyl ether acetate was dropped into the flask over 5 hours using a dropping pump, and then aged for 4 hours. The solution was then cooled to room temperature, and a polymer Y1 was obtained as the polymer Y indicated by Formula (22) above and containing the monomer components y1, y2.

Synthesis Examples 13 and 14

The same operation as synthesis example 12 described above was carried out, except that the types of mediums (solvents) used to synthesize the polymers, and the ratios of components were adjusted, and the compositions of the polymers were varied as shown in Table 1. As a result, two types of polymers Y (polymers Y2 and Y3) were obtained.

Synthesis Example 15

As the medium (solvent), 246 parts by weight of diethylene glycol monobutyl ether acetate was placed in a reaction container (flask) provided with an agitator, a reflux condenser, a dropping funnel, a nitrogen introduction tube, and a temperature gauge, and heated to 80° C. Next, a solution in which 276 parts by weight of the monomer component (compound) z1 indicated by Formula (23) above, 51 parts by weight of the monomer component (compound) z2 indicated by Formula (24), and 39 parts by weight of azobisdimethyl valeronitrile as a radical initiator were dissolved in 360 parts by weight of diethylene glycol monobutyl ether acetate was dropped into the flask over 5 hours using a dropping pump, and then aged for 3 hours.

Then, 26 parts by weight of glycidyl methacrylate and 2 parts by weight of methoquinone were added to the flask, and reaction was carried out for 10 hours at 110° C. The solution was then cooled to room temperature, and a polymer Z1 was obtained as the polymer Z indicated by Formula (26) above and containing the monomer components z1, z2, z3.

Synthesis Examples 16 and 17

The same operation as synthesis example 15 described above was carried out, except that the types of mediums (solvents) used to synthesize the polymers, and the ratios of components were adjusted, and the compositions of the polymers were varied as shown in Table 1. As a result, two types of polymers Z (polymers Z2 and Z3) were obtained.

Synthesis Example 18

As the medium (solvent), 180 parts by weight of diethylene glycol monobutyl ether acetate was placed in a reaction container (flask) provided with an agitator, a reflux condenser, a dropping funnel, a nitrogen introduction tube, and a temperature gauge, and heated to 85° C. Next, a solution in which 188 parts by weight of the monomer component (compound) w1 indicated by Formula (27) above, 34 parts by weight of the monomer component (compound) w2 indicated by Formula (28) above, 74 parts by weight of the monomer component (compound) w3 indicated by Formula (29) above, 74 parts by weight of the monomer component (compound) w4 indicated by Formula (30) above, and 64 parts by weight of azobisdimethyl valeronitrile as a radical initiator were dissolved in 386 parts by weight of diethylene glycol monobutyl ether acetate was dropped into the flask over 5 hours using a dropping pump, and then aged for 3 hours. The solution was then cooled to room temperature, and a polymer W1 was obtained as the polymer W indicated by Formula (31) above and containing the monomer components w1, w2, w3, w4.

Synthesis Examples 19 and 20

The same operation as synthesis example 18 described above was carried out, except that the types of mediums (solvents) used to synthesize the polymers, and the ratios of components were adjusted, and the compositions of the polymers were varied as shown in Table 1. As a result, two types of polymers W (polymers W2 and W3) were obtained.

Synthesis Examples 21 through 25

The same operation as synthesis example 1 described above was carried out, except that the types of monomer components used to synthesize the polymers, and the ratios of components were adjusted, and the compositions of the polymers were varied as shown in Table 1. As a result, five types of polymers M' (polymers M'1 through M'5) were obtained.

Table 1 shows the ratios of the monomer components that constitute the polymers synthesized in synthesis examples 1 through 28, as well as the weight-average molecular weight Mw of each polymer. In Table 1, "m1a" refers to 2-[O-(1'-methylpropylideneamino)carboxyamino]ethyl(=2-(1-methylpropylideneamino oxycarbonylaminoethyl)methacrylate) methacrylate, "m1b" refers to 2-(3,5-dimethylpyrazole-1-yl) carbonylaminoethyl methacrylate, "m1c" refers to 2-(3,5-dimethylpyrazole-1-yl)carbonylaminoethyl acrylate, "m2a" refers to methacrylic acid, "m2b" refers to acrylic acid, "m3a" refers to stearyl methacrylate, "m3b" refers to behenyl methacrylate, "m3c" refers to palmityl acrylate, "m3d" refers to lignoceryl methacrylate, "m4a" refers to methyl methacrylate, "m4b" refers to ethyl acrylate, "m4c" refers to pentyl acrylate, "m5" refers to styrene, "m6" refers to 2-hydroxyethyl methacrylate, "m7" refers to a mixture of 3,4-epoxytricyclo[5.2.1.0$^{2,6}$]decane-9-yl acrylate and 3,4-epoxytricyclo[5.2.1.0$^{2,6}$]decane-8-ylacrylate, and "m3" refers to cerotinyl methacrylate. In all of the polymers synthesized as described above, the degree of dispersion (Weight-average molecular weight Mw/Number-average molecular weight Mn) was in the range of 1 to 3.

TABLE 1

| | MONOMER COMPONENT (PARTS BY WEIGHT) | | | | | | | | | | | | |
|---|---|---|---|---|---|---|---|---|---|---|---|---|---|
| | m1a | m1b | m1c | m2a | m2b | m3a | m3b | m3c | m3d | m4a | m4b | m4c | m5 |
| POLYMER M1 | 60 | — | — | 20 | — | 20 | — | — | — | — | — | — | — |
| POLYMER M2 | — | 35 | — | 35 | — | 10 | — | — | — | 10 | — | — | — |
| POLYMER M3 | 40 | — | — | 30 | — | 15 | — | — | — | — | — | — | 10 |
| POLYMER M4 | — | 40 | — | — | 15 | — | — | 45 | — | — | — | — | — |
| POLYMER M5 | 76 | — | — | 8 | — | — | — | 4 | — | 4 | — | — | — |
| POLYMER M6 | — | — | 90 | — | 4 | — | 4 | — | — | — | 2 | — | — |
| POLYMER M7 | 28 | — | — | — | 42 | — | — | — | 30 | — | — | — | — |
| POLYMER M8 | — | — | 24 | — | 28 | — | — | — | 24 | — | — | 24 | — |
| POLYMER X1 | — | — | — | — | — | — | — | — | — | — | — | — | — |
| POLYMER X2 | — | — | — | — | — | — | — | — | — | — | — | — | — |
| POLYMER X3 | — | — | — | — | — | — | — | — | — | — | — | — | — |
| POLYMER Y1 | — | — | — | — | — | — | — | — | — | — | — | — | — |
| POLYMER Y2 | — | — | — | — | — | — | — | — | — | — | — | — | — |
| POLYMER Y3 | — | — | — | — | — | — | — | — | — | — | — | — | — |
| POLYMER Z1 | — | — | — | — | — | — | — | — | — | — | — | — | — |
| POLYMER Z2 | — | — | — | — | — | — | — | — | — | — | — | — | — |
| POLYMER Z3 | — | — | — | — | — | — | — | — | — | — | — | — | — |
| POLYMER W1 | — | — | — | — | — | — | — | — | — | — | — | — | — |
| POLYMER W2 | — | — | — | — | — | — | — | — | — | — | — | — | — |
| POLYMER W3 | — | — | — | — | — | — | — | — | — | — | — | — | — |
| POLYMER M1 | 75 | — | — | 25 | — | — | — | — | — | — | — | — | — |
| POLYMER M2 | 75 | — | — | — | — | 25 | — | — | — | — | — | — | — |
| POLYMER M3 | — | — | — | 50 | — | 50 | — | — | — | — | — | — | — |
| POLYMER M4 | 60 | — | — | 20 | — | — | — | — | 20 | — | — | — | — |
| POLYMER M5 | 60 | — | — | 20 | — | — | — | — | — | — | — | — | — |

| | MONOMER COMPONENT (PARTS BY WEIGHT) | | | | | | | | | | | | | | | | |
|---|---|---|---|---|---|---|---|---|---|---|---|---|---|---|---|---|---|
| | m6 | m7 | m3 | x1 | x2 | x3 | x4 | y1 | y2 | z1 | z2 | z3 | w1 | w2 | w3 | w4 | Mw |
| POLYMER M1 | — | — | — | — | — | — | — | — | — | — | — | — | — | — | — | — | 14000 |
| POLYMER M2 | — | — | — | — | — | — | — | — | — | — | — | — | — | — | — | — | 21000 |
| POLYMER M3 | — | 5 | — | — | — | — | — | — | — | — | — | — | — | — | — | — | 23000 |
| POLYMER M4 | — | — | — | — | — | — | — | — | — | — | — | — | — | — | — | — | 5000 |
| POLYMER M5 | 8 | — | — | — | — | — | — | — | — | — | — | — | — | — | — | — | 26000 |
| POLYMER M6 | — | — | — | — | — | — | — | — | — | — | — | — | — | — | — | — | 32000 |
| POLYMER M7 | — | — | — | — | — | — | — | — | — | — | — | — | — | — | — | — | 9000 |
| POLYMER M8 | — | — | — | — | — | — | — | — | — | — | — | — | — | — | — | — | 27000 |
| POLYMER X1 | — | — | — | 60 | 30 | 5 | 5 | — | — | — | — | — | — | — | — | — | 3600 |
| POLYMER X2 | — | — | — | 40 | 49 | 7 | 4 | — | — | — | — | — | — | — | — | — | 4200 |
| POLYMER X3 | — | — | — | 80 | 10 | 4 | 6 | — | — | — | — | — | — | — | — | — | 4700 |
| POLYMER Y1 | — | — | — | — | — | — | — | 67 | 33 | — | — | — | — | — | — | — | 3300 |
| POLYMER Y2 | — | — | — | — | — | — | — | 40 | 60 | — | — | — | — | — | — | — | 2800 |
| POLYMER Y3 | — | — | — | — | — | — | — | 80 | 20 | — | — | — | — | — | — | — | 4600 |
| POLYMER Z1 | — | — | — | — | — | — | — | — | — | 78 | 10 | 12 | — | — | — | — | 12000 |
| POLYMER Z2 | — | — | — | — | — | — | — | — | — | 60 | 22 | 18 | — | — | — | — | 10000 |
| POLYMER Z3 | — | — | — | — | — | — | — | — | — | 85 | 10 | 5 | — | — | — | — | 9400 |
| POLYMER W1 | — | — | — | — | — | — | — | — | — | — | — | — | 51 | 9 | 20 | 20 | 6800 |
| POLYMER W2 | — | — | — | — | — | — | — | — | — | — | — | — | 42 | 15 | 13 | 30 | 12000 |
| POLYMER W3 | — | — | — | — | — | — | — | — | — | — | — | — | 55 | 5 | 35 | 5 | 3100 |
| POLYMER M1 | — | — | — | — | — | — | — | — | — | — | — | — | — | — | — | — | 13000 |
| POLYMER M2 | — | — | — | — | — | — | — | — | — | — | — | — | — | — | — | — | 13000 |
| POLYMER M3 | — | — | — | — | — | — | — | — | — | — | — | — | — | — | — | — | 15000 |
| POLYMER M4 | — | — | — | — | — | — | — | — | — | — | — | — | — | — | — | — | 12000 |
| POLYMER M5 | — | — | 20 | — | — | — | — | — | — | — | — | — | — | — | — | — | 14000 |

2. Preparation of Color Filter Ink (Color Filter Ink Set)

Example 1

Added to an agitator (single-shaft mixer) having a capacity of 400 cc were DISPERBYK 111 as an acid-value dispersing agent, DISPERBYK 166 as an amine-value dispersing agent, the polymer M1, the polymer Z1, the polymer W1, and diethylene glycol monobutyl ether acetate as a medium (component constituting the dispersion medium in the color filter ink) for dissolving the polymers (polymers M1, Z1, and W1); and a polymer M solution in which the polymers M1, Z1, and W1 were dissolved in the medium was obtained by stirring the mixture for 10 minutes in a Dispermill (polymer M solution preparation step). The speed of the stirring vanes of the agitator at this time was set to 2000 rpm.

Pigments were then added as described below to the polymer M solution obtained by the polymer M solution preparation step, inorganic beads were added in multiple stages using an agitator (bead mill), and the fine-dispersion step of performing the fine-dispersion process was performed.

First, pigments were added to the obtained polymer M solution, and the mixture was stirred for 10 minutes. At this time, the speed of the stirring vanes of the bead mill (agitator) was set to 2000 rpm. A mixture of C. I. pigment red 177 and a pigment derivative indicated by Formula (17) above, a mixture of C. I. pigment red 254 and a pigment derivative indicated by Formula (18) above, and a powder of a sulfonated pigment derivative having the chemical structure indicated by Formula (20) above were used as the pigments. At this time, the mixture of the pigments and the polymer solution was diluted by diethylene glycol monobutyl ether acetate to give a pigment content ratio of 16 wt %.

Inorganic beads (first inorganic beads: zirconia beads; "Toray Ceram milling balls" (trade name); manufactured by Toray) having an average grain size of 0.8 mm were then added, the mixture was stirred for 30 minutes at room temperature, and the first stage of dispersion processing (first treatment) was performed. At this time, the speed of the stirring vanes of the agitator was set to 2000 rpm.

The inorganic beads (first inorganic beads) were then removed by filtration using a filter ("PALL HDCII Membrane Filter"; manufactured by PALL), after which inorganic beads (second inorganic beads: zirconia beads; "Toray Ceram milling balls" (trade name); manufactured by Toray) having an average grain size of 0.1 mm were added, the mixture was further stirred for 30 minutes, and the second stage of dispersion processing (second treatment) was performed. At this time, the speed of the stirring vanes of the bead mill (agitator) was set to 2000 rpm. The mixture was also diluted at this time by diethylene glycol monobutyl ether acetate to give a pigment content ratio of 13 wt % in the obtained pigment dispersion.

The inorganic beads (second inorganic beads) were then removed by filtration using a filter ("PALL HDCII Membrane Filter"; manufactured by PALL), and a pigment dispersion was obtained.

Polymer X1, polymer Y1, a leveling agent (SURFYNOL DF58, manufactured by Nisshin Chemical Industry Co., Ltd.), an antioxidant (TINUVIN 152, manufactured by Ciba Japan K. K.), and diethylene glycol monobutyl ether acetate and diethylene glycol mono n-butyl ether as liquid mediums were then added to and mixed with the pigment dispersion obtained as described above (dilution step). The present step was performed by placing the abovementioned materials in a 400 cc agitator (single-shaft mixer) and stirring the mixture for 10 minutes in a Dispermill. At this time, the speed of the stirring vanes of the agitator was set to 2000 rpm. The desired red color filter ink (R ink) was thereby obtained.

A green color filter ink (G ink) and a blue color filter ink (B ink) were prepared in the same manner as the red color filter ink described above, except that the type of pigment and the usage amount of each component were varied. A color filter ink set composed of the three colors R, G, B was thereby obtained. The average grain size of the pigment constituting the R ink, the average grain size of the pigment constituting the G ink, and the average grain size of the pigment constituting the B ink were 70 nm, 70 nm, and 70 nm, respectively.

Examples 2 through 10

Color filter inks (ink sets) were prepared in the same manner as Example 1, except that the types and usage amounts of materials used to prepare the color filter inks were varied as shown in Tables 2 and 3.

Comparative Examples 1 through 6

Color filter inks (ink sets) were prepared in the same manner as the aforementioned example, except that the resin materials constituting the color filter inks were varied as shown in Table 3.

The types, usage amounts, and the like of the constituent components of the color filter inks in the examples and comparative examples are shown in Tables 2 and 3. In the tables, "PR177" refers to C. I. pigment red 177, "PR254" refers to C. I. pigment red 254, "PR177D" refers to the mixture of C. I. pigment red 177 and the pigment derivative indicated by Formula (17), "PR254D" refers to the mixture of C. I. pigment red 254 and the pigment derivative indicated by Formula (18), "HPZC1" refers to a powder composed of a halogenated phthalocyanine zinc complex indicated by Formula (19) (wherein two of the 16× species in the molecule are hydrogen atoms, four are chlorine atoms, and ten are bromine atoms), "HPZC2" refers to a powder composed of a halogenated phthalocyanine zinc complex indicated by Formula (19) (wherein one of the 16× species in the molecule is a hydrogen atom, three are chlorine atoms, and twelve are bromine atoms), "SPD1" refers to a powder composed of a pigment derivative indicated by Formula (20) (having one sulfo group in the molecule), "SPD2" refers to a powder composed of a pigment derivative indicated by Formula (20) (having two sulfo groups in the molecule), "PG36" refers to C. I. pigment green 36, "PB15:6" refers to C. I. pigment blue 15:6, "PY150" refers to C. I. pigment yellow 150, "PV23" refers to C. I. pigment violet 23, "DA1" refers to DISPERBYK 111 (acid value: 50 KOH mg/g), "DA4" refers to DISPERBYK 166 (amine value: 115 KOH mg/g), "DF58" refers to a leveling agent (SURFYNOL DF58, manufactured by Nisshin Chemical Industry Co., Ltd.), "L90" refers to a leveling agent (LHP-90, manufactured by Kusumoto Chemicals), "L95" refers to a leveling agent (LHP-95, manufactured by Kusumoto Chemicals), "LF" refers to a leveling agent (LF-1970, manufactured by Kusumoto Chemicals), "SPC" refers to a leveling agent (Olfine SPC, manufactured by Nisshin Chemical Industry Co., Ltd.), "T152" refers to an antioxidant (TINUVIN 152, manufactured by Ciba Japan K. K.), "S1" refers to diethylene glycol monobutyl ether acetate, "S2" refers to 1,3-butylene glycol diacetate, "S3" refers to 2-(2-methoxy-1-methylethoxy)-1-methyl ethyl acetate, "S4" refers to bis(2-butoxyethyl)ether, "S5" refers to ethyl octanoate, "S6" refers to diethylene glycol mono n-butyl ether, "S7" refers to triethylene glycol mono-n-butyl ether, "S8" refers to 3-ethoxyethyl propionate, and "A" refers to resin A (product name: ACRYDIC A-430-60, manufactured by DIC Corporation) as a heat-curable acrylic resin. The acid values of the dispersing agents were calculated by a method in accordance with DIN EN ISO 2114, and the amine values were calculated by a method in accordance with DIN 16945.

TABLE 2

| | | COLORANT | | RESIN MATERIAL | | DISPERSING AGENT | |
|---|---|---|---|---|---|---|---|
| | | | CONTENT RATIO (PARTS BY WEIGHT) | | CONTENT RATIO (PARTS BY WEIGHT) | | CONTENT RATIO (PARTS BY WEIGHT) |
| EXAMPLE 1 | R INK | PR254D/PR177D/SPD1 | 2.3/3.8/1.6 | M1/X1/Y1/Z1/W1 | 2.6/1.6/1.4/1.3/1.1 | DA1/DA4 | 0.5/2.5 |
| | G INK | HPZC1/SPD1 | 6.5/3.6 | M1/X1/Y1/Z1/W1 | 1.8/1.3/1.1/1.1/1.1 | DA1/DA4 | 0.9/2.7 |
| | B INK | PB15:6/PV23 | 4.6/0.3 | M1/X1/Y1/Z1/W1 | 3.7/2.2/1.8/1.6/1.8 | DA1/DA4 | 0.4/1.6 |
| EXAMPLE 2 | R INK | PR254D/PR177D/SPD1 | 2.3/3.8/1.6 | M2/X2/Y2/Z2/W2 | 3.9/1.8/1.2/0.6/0.5 | DA1/DA4 | 0.7/2.3 |
| | G INK | HPZC1/SPD1 | 6.5/3.6 | M2/X2/Y2/Z2/W2 | 2.7/1.5/0.9/0.7/0.6 | DA1/DA4 | 1.0/2.6 |
| | B INK | PB15:6/PV23 | 4.6/0.3 | M2/X2/Y2/Z2/W2 | 5.5/2.4/1.6/0.8/0.8 | DA1/DA4 | 0.5/1.5 |
| EXAMPLE 3 | R INK | PR254D/PR177D/SPD1 | 2.3/3.8/1.6 | M3/X3/Y3/Z3/W3 | 4.8/2.1/0.9/0.3/0.1 | DA1/DA4 | 0.3/2.5 |
| | G INK | HPZC1/SPD1 | 6.5/3.6 | M3/X3/Y3/Z3/W3 | 3.8/1.7/0.7/0.2/0.2 | DA1/DA4 | 0.8/2.6 |
| | B INK | PB15:6/PV23 | 4.6/0.3 | M3/X3/Y3/Z3/W3 | 6.4/2.9/1.1/0.4/0.5 | DA1/DA4 | 0.3/1.5 |
| EXAMPLE 4 | R INK | PR254D/PR177D/SPD1 | 2.3/3.8/1.6 | M1/X1/Y1 | 5.0/1.7/1.3 | DA1/DA4 | 0.4/2.6 |
| | G INK | HPZC1/SPD1 | 6.5/3.6 | M1/X1/Y1 | 4.0/1.4/1.0 | DA1/DA4 | 0.8/2.8 |
| | B INK | PB15:6/PV23 | 4.6/0.3 | M1/X1/Y1 | 7.1/2.3/1.7 | DA1/DA4 | 0.3/1.7 |
| EXAMPLE 5 | R INK | PR254/PR177/SPD1 | 2.3/3.8/1.6 | M4/X1/Y1 | 5.0/1.7/1.3 | DA1 | 3 |
| | G INK | HPZC1/SPD1 | 6.5/3.6 | M4/X1/Y1 | 4.0/1.4/1.0 | DA1 | 3.6 |
| | B INK | PB15:6/PV23 | 4.6/0.3 | M4/X1/Y1 | 7.1/2.3/1.7 | DA1 | 2 |
| EXAMPLE 6 | R INK | PR254/PR177/SPD1 | 2.3/3.8/1.6 | M5/X1/Y1 | 1.0/3.7/3.3 | DA1/DA4 | 0.5/2.5 |
| | G INK | HPZC1/SPD1 | 6.5/3.6 | M5/X1/Y1 | 0.8/3.0/2.6 | DA1/DA4 | 0.9/2.7 |
| | B INK | PB15:6/PV23 | 4.6/0.3 | M5/X1/Y1 | 1.5/5.2/4.4 | DA1/DA4 | 0.4/1.6 |
| EXAMPLE 7 | R INK | PR254/PR177/SPD1 | 2.3/3.8/1.6 | M6/X3/Y3 | 1.0/1.7/1.3 | DA1/DA4 | 1.2/5.8 |
| | G INK | HPZC1/SPD1 | 6.5/3.6 | M6/X3/Y3 | 0.8/1.4/1.0 | DA1/DA4 | 1.7/5.1 |
| | B INK | PB15:6/PV23 | 4.6/0.3 | M6/X3/Y3 | 1.5/2.3/1.7 | DA1/DA4 | 1.5/6.1 |
| EXAMPLE 8 | R INK | PR254D/PR177D/SPD1 | 2.3/3.8/1.6 | M7/X2 | 5.0/3.0 | DA1/DA4 | 0.5/2.5 |
| | G INK | HPZC1/SPD1 | 6.5/3.6 | M7/X2 | 4.0/2.4 | DA1/DA4 | 0.9/2.7 |
| | B INK | PB15:6/PV23 | 4.6/0.3 | M7/X2 | 7.1/4.0 | DA1/DA4 | 0.4/1.6 |

| | | | LIQUID MEDIUM | | OTHER | | |
|---|---|---|---|---|---|---|---|
| | | | | CONTENT RATIO (PARTS BY WEIGHT) | | CONTENT RATIO (PARTS BY WEIGHT) | VISCOSITY (mPa·s) |
| | EXAMPLE 1 | R INK | S1/S6 | 71.5/9.5 | DF58/T152 | 0.1/0.2 | 9.8 |
| | | G INK | S1/S6 | 66.2/13.6 | DF58 | 0.1 | 9.9 |
| | | B INK | S1/S6 | 67.0/15.0 | — | — | 10.2 |
| | EXAMPLE 2 | R INK | S2/S7 | 72.0/9.0 | L90/T152 | 0.1/0.2 | 9.7 |
| | | G INK | S2/S7 | 66.7/13.1 | L90 | 0.1 | 10.2 |
| | | B INK | S2/S7 | 67.5/14.5 | — | — | 9.6 |
| | EXAMPLE 3 | R INK | S3/S8 | 71.2/9.8 | L95/T152 | 0.1/0.2 | 8.9 |
| | | G INK | S3/S8 | 66.1/13.7 | L95 | 0.1 | 9.2 |
| | | B INK | S3/S8 | 66.9/15.1 | — | — | 9.2 |
| | EXAMPLE 4 | R INK | S1/S7 | 72.2/9.0 | LF | 0.1 | 9.6 |
| | | G INK | S1/S7 | 66.3/13.5 | LF | 0.1 | 10.4 |
| | | B INK | S1/S7 | 67.0/15.0 | — | — | 9.7 |
| | EXAMPLE 5 | R INK | S1/S4 | 60.1/21.2 | — | — | 9.5 |
| | | G INK | S1/S4 | 59.9/20.0 | — | — | 10.1 |
| | | B INK | S1/S4 | 60.5/21.5 | — | — | 10.1 |
| | EXAMPLE 6 | R INK | S1/S5 | 58.7/22.3 | DF58/T152 | 0.1/0.2 | 9.2 |
| | | G INK | S1/S5 | 58.7/21.1 | DF58 | 0.1 | 9.6 |
| | | B INK | S1/S5 | 59.4/22.6 | — | — | 9.7 |
| | EXAMPLE 7 | R INK | S3 | 81 | DF58/T152 | 0.1/0.2 | 9.1 |
| | | G INK | S3 | 79.8 | DF58 | 0.1 | 9.5 |
| | | B INK | S3 | 82 | — | — | 9.9 |
| | EXAMPLE 8 | R INK | S2/S6 | 71.5/9.5 | DF58/T152 | 0.1/0.2 | 10.1 |
| | | G INK | S2/S6 | 66.1/13.7 | DF58 | 0.1 | 10.2 |
| | | B INK | S2/S6 | 67.0/15.0 | — | — | 8.9 |

TABLE 3

| | | COMPOSITION | | | | | |
|---|---|---|---|---|---|---|---|
| | | COLORANT | | RESIN MATERIAL | | DISPERSING AGENT | |
| | | | CONTENT RATIO (PARTS BY WEIGHT) | | CONTENT RATIO (PARTS BY WEIGHT) | | CONTENT RATIO (PARTS BY WEIGHT) |
| EXAMPLE 9 | R INK | PR254D/PR177D/SPD2 | 2.3/3.8/1.6 | M8/Y2 | 6.5/1.5 | DA1/DA4 | 0.5/2.5 |
| | G INK | HPZC2/SPD2 | 6.5/3.6 | M8/Y2 | 5.2/1.2 | DA1/DA4 | 0.9/2.7 |
| | B INK | PB15:6/PV23 | 4.6/0.3 | M8/Y2 | 9.1/2.0 | DA1/DA4 | 0.4/1.6 |
| EXAMPLE 10 | R INK | PR254D/PR177/PY150 | 2.3/3.8/1.6 | M2/X2/Z2 | 3.9/3.0/1.1 | DA1/DA4 | 0.5/2.5 |
| | G INK | PG36/PY150 | 6.5/3.6 | M2/X2/Z2 | 2.7/2.4/1.3 | DA1/DA4 | 0.9/2.7 |
| | B INK | PB15:6/PV23 | 4.6/0.3 | M2/X2/Z2 | 5.5/4.0/1.6 | DA1/DA4 | 0.4/1.6 |
| COMPARATIVE EXAMPLE 1 | R INK | PR254D/PR177D/SPD1 | 2.3/3.8/1.6 | A | 8 | DA1/DA4 | 0.5/2.5 |
| | G INK | HPZC1/SPD1 | 6.5/3.6 | A | 6.4 | DA1/DA4 | 0.9/2.7 |
| | B INK | PB15:6/PV23 | 4.6/0.3 | A | 11.1 | DA1/DA4 | 0.4/1.6 |
| COMPARATIVE EXAMPLE 2 | R INK | PR254D/PR177D/SPD1 | 2.3/3.8/1.6 | M'1/X1/Y1 | 5.0/1.6/1.4 | DA1/DA4 | 0.5/2.5 |
| | G INK | HPZC1/SPD1 | 6.5/3.6 | M'1/X1/Y1 | 4.0/1.3/1.1 | DA1/DA4 | 0.9/2.7 |
| | B INK | PB15:6/PV23 | 4.6/0.3 | M'1/X1/Y1 | 7.1/2.2/1.8 | DA1/DA4 | 0.4/1.6 |
| COMPARATIVE EXAMPLE 3 | R INK | PR254D/PR177D/SPD1 | 2.3/3.8/1.6 | M'2/X1/Y1 | 5.0/1.6/1.4 | DA1/DA4 | 0.5/2.5 |
| | G INK | HPZC1/SPD1 | 6.5/3.6 | M'2/X1/Y1 | 4.0/1.3/1.1 | DA1/DA4 | 0.9/2.7 |
| | B INK | PB15:6/PV23 | 4.6/0.3 | M'2/X1/Y1 | 7.1/2.2/1.8 | DA1/DA4 | 0.4/1.6 |
| COMPARATIVE EXAMPLE 4 | R INK | PR254D/PR177D/SPD1 | 2.3/3.8/1.6 | M'3/X1/Y1 | 5.0/1.6/1.4 | DA1/DA4 | 0.5/2.5 |
| | G INK | HPZC1/SPD1 | 6.5/3.6 | M'3/X1/Y1 | 4.0/1.3/1.1 | DA1/DA4 | 0.9/2.7 |
| | B INK | PB15:6/PV23 | 4.6/0.3 | M'3/X1/Y1 | 7.1/2.2/1.8 | DA1/DA4 | 0.4/1.6 |
| COMPARATIVE EXAMPLE 5 | R INK | PR254D/PR177D/SPD1 | 2.3/3.8/1.6 | M'4/X1/Y1 | 5.0/1.6/1.4 | DA1/DA4 | 0.5/2.5 |
| | G INK | HPZC1/SPD1 | 6.5/3.6 | M'4/X1/Y1 | 4.0/1.3/1.1 | DA1/DA4 | 0.9/2.7 |
| | B INK | PB15:6/PV23 | 4.6/0.3 | M'4/X1/Y1 | 7.1/2.2/1.8 | DA1/DA4 | 0.4/1.6 |
| COMPARATIVE EXAMPLE 6 | R INK | PR254D/PR177D/SPD1 | 2.3/3.8/1.6 | M'5/X1/Y1 | 5.0/1.6/1.4 | DA1/DA4 | 0.5/2.5 |
| | G INK | HPZC1/SPD1 | 6.5/3.6 | M'5/X1/Y1 | 4.0/1.3/1.1 | DA1/DA4 | 0.9/2.7 |
| | B INK | PB15:6/PV23 | 4.6/0.3 | M'5/X1/Y1 | 7.1/2.2/1.8 | DA1/DA4 | 0.4/1.6 |

| | | | COMPOSITION | | | |
|---|---|---|---|---|---|---|
| | | | LIQUID MEDIUM | | OTHER | |
| | | | | CONTENT RATIO (PARTS BY WEIGHT) | | CONTENT RATIO (PARTS BY WEIGHT) | VISCOSITY (mPa·s) |
| EXAMPLE 9 | R INK | S2/S6 | 71.2/9.8 | DF58/T152 | 0.1/0.2 | 9.5 |
| | G INK | S2/S6 | 66.0/13.8 | DF58 | 0.1 | 8.5 |
| | B INK | S2/S6 | 66.8/15.2 | — | — | 10.2 |
| EXAMPLE 10 | R INK | S2 | 81.2 | SPC | 0.1 | 10.5 |
| | G INK | S2 | 79.9 | SPC | 0.1 | 11.2 |
| | B INK | S2 | 82 | — | — | 10.9 |
| COMPARATIVE EXAMPLE 1 | R INK | S1/S6 | 71.5/9.5 | DF58/T152 | 0.1/0.2 | 9.3 |
| | G INK | S1/S6 | 66.2/13.5 | DF58 | 0.1 | 9.5 |
| | B INK | S1/S6 | 67.0/15.0 | — | — | 9.9 |
| COMPARATIVE EXAMPLE 2 | R INK | S1/S6 | 71.5/9.5 | DF58/T152 | 0.1/0.2 | 8.5 |
| | G INK | S1/S6 | 66.2/13.5 | DF58 | 0.1 | 8.7 |
| | B INK | S1/S6 | 67.0/15.0 | — | — | 8.9 |
| COMPARATIVE EXAMPLE 3 | R INK | S1/S6 | 71.5/9.5 | DF58/T152 | 0.1/0.2 | 7.4 |
| | G INK | S1/S6 | 66.2/13.5 | DF58 | 0.1 | 8.9 |
| | B INK | S1/S6 | 67.0/15.0 | — | — | 10.2 |
| COMPARATIVE EXAMPLE 4 | R INK | S1/S6 | 71.5/9.5 | DF58/T152 | 0.1/0.2 | 9.5 |
| | G INK | S1/S6 | 66.2/13.5 | DF58 | 0.1 | 9.6 |
| | B INK | S1/S6 | 67.0/15.0 | — | — | 9.5 |
| COMPARATIVE EXAMPLE 5 | R INK | S1/S6 | 71.5/9.5 | DF58/T152 | 0.1/0.2 | 11.2 |
| | G INK | S1/S6 | 66.2/13.5 | DF58 | 0.1 | 7.4 |
| | B INK | S1/S6 | 67.0/15.0 | — | — | 7.5 |
| COMPARATIVE EXAMPLE 6 | R INK | S1/S6 | 71.5/9.5 | DF58/T152 | 0.1/0.2 | 8.9 |
| | G INK | S1/S6 | 66.2/13.5 | DF58 | 0.1 | 11.6 |
| | B INK | S1/S6 | 67.0/15.0 | — | — | 12.9 |

3. Evaluation of Stability of Droplet Discharge (Evaluation of Discharge Stability)

3-1. Evaluation of Landing Position Accuracy

A droplet discharge device such as that shown in FIGS. 3 to 6 disposed in a chamber (thermal chamber) and the ink sets for a color filter of the examples and comparative examples were prepared, and 1,000,000 droplets (1,000,000 drops) of the inks were discharged from specified nozzles in the vicinity of the center of the droplet discharge head in a state in which the drive waveform of the piezoelement had been optimized. The average value of the offset distance d from the center aim position of the center position of the landed droplets was calculated, and an evaluation was made based on the five ranges described below. It is apparent that the smaller this value, the more effectively is prevented the occurrence of flight deflection.

A: The average value of the offset distance d is less than 0.03 μm

B: The average value of the offset distance d is 0.03 μm or more and less than 0.07 μm C: The average value of the offset distance d is 0.07 μm or more and less than 0.10 μm D: The average value of the offset distance d is 0.10 μm or more and less than 0.12 μm E: The average value of the offset distance d is 0.12 or more

3-2. Evaluation of Stability of Droplet Discharge Quantity

A droplet discharge device such as that shown in FIGS. 3 to 6 disposed in a chamber (thermal chamber), and the ink sets for a color filter of the examples and comparative examples were prepared, and 1,000,000 droplets (1,000,000 drops) of the inks were continuously discharged from the nozzles of a droplet discharge head in a state in which the drive waveform of the piezoelement had been optimized. The total weight of the discharged droplets was calculated for two specific nozzles at the left and right ends of the droplet discharge head, and the absolute value $\Delta W$ (ng) of the difference between the average discharge quantities of the droplets discharged from the two nozzles was calculated. The ratio ($\Delta W/W_T$) of the $\Delta W$ in relation to the target discharge quantity $W_T$ (ng) of the droplets was calculated, and an evaluation was made based on the five ranges described below. It is apparent that the smaller the value of $\Delta W/W_T$, the greater the stability of the droplet discharge quantity.

A: The value of $\Delta W/W_T$ is less than 0.018

B: The value of $\Delta W/W_T$ is 0.018 or higher and less than 0.250

C: The value of $\Delta W/W_T$ is 0.250 or higher and less than 0.450

D: The value of $\Delta W/W_T$ is 0.450 or higher and less than 0.780

E: The value of $\Delta W/W_T$ is 0.780 or higher

3-3. Evaluation of Intermittent Printing Performance

A droplet discharge device such as that shown in FIGS. 3 to 6 disposed in a chamber (thermal chamber), and the ink sets for a color filter of the examples and comparative examples were prepared, and 100,000 droplets (100,000 drops) of the inks were continuously discharged from the nozzles of a droplet discharge head in a state in which the drive waveform of the piezoelement had been optimized, after which droplet discharge was stopped for 180 seconds (first sequence). Thereafter, droplets were continuously discharged in the same manner and the operation of stopping the discharge of droplets was repeated. The average weight $W_1$ (ng) of the droplets discharged in the first sequence and the average weight $W_{50}$ (ng) of the droplets discharged in the $50^{th}$ sequence were calculated for the specified nozzles in the vicinity of the center of the droplet discharge head. The ratio ($|W_1-W_{50}|/W_T$) of the absolute value of the difference between $W_1$ and $W_{50}$ in relation to the target discharge quantity $W_T$ (ng) of the droplets was calculated, and an evaluation was made based on the five ranges described below. It is apparent that the smaller the value of $|W_1-W_{50}|/W_T$ is, the greater the intermittent printing performance (stability of the droplet discharge quantity).

A: The value of $|W_1-W_{50}|/W_T$ is less than 0.040

B: The value of $|W_1-W_{50}|/W_T$ is 0.040 or higher and less than 0.100

C: The value of $|W_1-W_{50}|/W_T$ is 0.100 or higher and less than 0.400

D: The value of $|W_1-W_{50}|/W_T$ is 0.400 or higher and less than 0.650

E: The value of $|W_1-W_{50}|/W_T$ is 0.650 or higher

3-4. Continuous Discharge Test

The inks constituting the ink set for a color filter were discharged by continuously operating the droplet discharge device for 480 hours in an environment of 25° C. and 40% RH using a droplet discharge device such as that shown in FIGS. 3 to 6 disposed in a chamber (thermal chamber) and the ink sets for a color filter of the examples and comparative examples.

The rate ([(number of clogged nozzles)/(total number of nozzles)]×100) at which clogging of the nozzles constituting the droplet discharge head occurs after continuous operation was calculated, and it was investigated whether clogging can be eliminated using a cleaning member composed of a plastic material. The results were evaluated based on the five ranges described below. The average value obtained for the three colors of ink was used as the occurrence rate of nozzle clogging.

A: Nozzle clogging does not occur.

B: The occurrence rate of nozzle clogging is less than 0.4% (not including 0), and clogging can be eliminated by cleaning.

C: The occurrence rate of nozzle clogging is 0.4% or higher and less than 0.8%, and clogging can be eliminated by cleaning.

D: The occurrence rate of nozzle clogging is 0.8% or higher and less than 1.1%, and clogging can be eliminated by cleaning.

E: The occurrence rate of nozzle clogging is 1.1% or higher, and clogging cannot be eliminated by cleaning.

The evaluation described above was carried out in the same conditions for the examples and the comparative examples.

4. Evaluation of Storage Stability of Color Filter Ink (Long-Term Stability Evaluation)

4-1. Change in Appearance After Heat Treatment

The color filter ink of the examples and comparative examples was left for 40 days in a 55° C. environment, after which the ink was visually observed and evaluated according to the five levels shown below, A: No change from the state prior to heating was observed.

B: Almost no aggregation/precipitation of pigment particles was observed.

C: Slight aggregation/precipitation of pigment particles was observed.

D: Aggregation/precipitation of pigment particles was plainly observed.

E: Severe aggregation/precipitation of pigment particles was observed.

4-2. Change in Viscosity

The viscosity (kinetic viscosity) of the color filter ink of the examples and comparative examples was measured after the ink was left for 20 days in a 55° C. environment, and the difference in viscosity was calculated with respect to the viscosity immediately after manufacture. Specifically, the difference indicated by $v_1-v_0$ was calculated, wherein $v_0$ (mPa·s) is the viscosity immediately after manufacturing, and $v_1$ (mPa·s) is the viscosity after the ink was left for 20 days in a 55° C. environment. The values calculated in this manner were evaluated according to the five criteria shown below.

A: The value of $v_1$-$v_0$ is less than 0.2 mPa·s.
B: The value of $v_1$-$v_0$ is 0.2 mPa·s or higher and less than 0.3 mPa·s.
C: The value of $v_1$-$v_0$ is 0.3 mPa·s or higher and less than 0.5 mPa·s.
D: The value of $v_1$-$v_0$ is 0.5 mPa·s or higher and less than 0.7 mPa·s.
E: The value of $v_1$-$v_0$ is 0.7 mPa·s or higher.

5. Manufacture of Color Filters

Color filters were manufactured in the following manner using the color filter inks obtained in the examples and comparative examples.

First, a substrate (G5 size: 1100×1300 mm) composed of soda glass on which a silica ($SiO_2$) film for preventing elution of the sodium ions was formed on the two sides was prepared and washed.

Next, a radiation-sensitive composition for forming a partition wall containing carbon black was applied to the entire surface of one of the surfaces of the washed substrate to form a coated film.

Next, a prebaking treatment was performed at a heating temperature of 110° C. and a heating time of 120 seconds.

The substrate was then irradiated via a photomask and subjected to post exposure baking (PEB), then developed using an alkali development fluid, and then subjected to a post baking treatment to thereby form a partition wall. PEB was carried out at a heating temperature of 110° C., a heating time of 120 seconds, and an irradiation intensity of 150 mJ/cm$^2$. The development treatment time was set to 60 seconds. The post baking treatment was carried out at a heating temperature of 150° C. for a heating time of 5 minutes. The thickness of the partition wall thus formed was 2.0 µm.

Next, the color filter ink was discharged into the cells as areas surrounded by the partition wall by using a droplet discharge device such as that shown in FIGS. 3 to 6. In this case, three color filter inks were used, and care was taken that the color filter ink of each color was not mixed. A quantity of color filter ink was applied in each cell so as to give an average thickness of 2.0 µm of the formed colored portion.

Heat treatment was then carried out for 20 minutes at 80° C. on a hot plate (first heat treatment).

Heat treatment was then carried out for 60 minutes at 230° C. (second heat treatment), and three colors (red (R), green (G), blue (B)) of colored portions were thereby formed. The colored portions were then rinsed using N-methyl-2-pyrrolidone and γ-butyrolactone, and a color filter such as shown in FIG. 1 was obtained.

The color filter inks (ink sets) of the examples and the comparative examples were used to manufacture 8000 color filters of each ink set using the method described above.

6. Evaluation of Color Filters

The color filters obtained in the manner described above were evaluated in the manner described below.

6-1. Flatness of Colored Portion

The 1000$^{th}$ color filters of the color filters manufactured using the color filter inks (ink sets) of the examples and comparative examples were prepared.

The difference ΔD between the maximum height and minimum height of the colored portions was found using a stylus profilometer (P-15, manufactured by Tencor) for the color filters, and ΔD was evaluated according to the five levels shown below.

A: ΔD was less than 0.16 µm
B: ΔD was 0.16 µm or greater and less than 0.28 µm
C: ΔD was 0.28 µm or greater and less than 0.43 µm
D: ΔD was 0.43 µm or greater and less than 0.53 µm
E: ΔD was 0.53 µm or greater

6-2. Evaluation of Contrast Ratio

Liquid crystal display devices such as the one shown in FIG. 7 were manufactured under the same conditions using the 8000$^{th}$ color filters of the color filters manufactured using the color filter inks (ink sets) of the examples and comparative examples.

Red monochromatic display, green monochromatic display, and blue monochromatic display were performed using the liquid crystal display devices, and the contrast ratio (CR) in relation to a case in which no monochromatic display was performed was obtained using a contrast tester (CT-1, manufactured by Tsubosaka Electric) and evaluated as shown below.

The contrast ratio was evaluated according to the five ranges below for red monochromatic display.

A: CR was 2900 or higher.
B: CR was 2400 or higher and less than 2900.
C: CR was 2000 or higher and less than 2400.
D: CR was 1700 or higher and less than 2000.
E: CR was less than 1700.

The contrast ratio was evaluated according to the five ranges below for green monochromatic display.

A: CR was 3800 or higher.
B: CR was 3500 or higher and less than 3800.
C: CR was 3200 or higher and less than 3500.
D: CR was 2800 or higher and less than 3200.
E: CR was less than 2800.

The contrast ratio was evaluated according to the five ranges below for blue monochromatic display.

A: CR was 3100 or higher.
B: CR was 2700 or higher and less than 3100.
C: CR was 2400 or higher and less than 2700.
D: CR was 2200 or higher and less than 2400.
E: CR was less than 2200.

6.3 Evaluation of Brightness

The liquid crystal display devices of the examples and comparative examples manufactured in 6-2 were evaluated as described below. Red monochromatic display, green monochromatic display, and blue monochromatic display were performed using the liquid crystal display device, tristimulus values according to the xyY color system were calculated using a colorimeter (CM-3700d, manufactured by Minolta), and evaluation was performed according to the five ranges described below using the average Y value of the three light colors red, green, and blue as the brightness Y of white light.

A: The brightness Y was 29.2 or higher.
B: The brightness Y was 28.5 or higher and less than 29.2.
C: The brightness Y was 27.9 or higher and less than 28.5.
D: The brightness Y was 27.2 or higher and less than 27.9.
E: The brightness Y was less than 27.2.

6-4. Unevenness of Color and Saturation

Red monochromatic display, green monochromatic display, blue monochromatic display, and white monochromatic display by the liquid crystal display devices of the examples and comparative examples manufactured in (6-2) were visually observed in a dark room, and the occurrence of uneven color and uneven saturation between different regions (including that caused by light leakage) was evaluated based on the five levels described below.

A: Uneven color and uneven saturation were not observed.
B: Uneven color and uneven saturation were substantially not observed.
C: Some uneven color and uneven saturation was observed.
D: Uneven color and uneven saturation were plainly observed.
E: Markedly uneven color and uneven saturation were observed.

6-5. Voltage Holding Ratio of Liquid Crystal Layer

The liquid crystal display devices of the examples and comparative examples manufactured in 6-2 were prepared, a voltage of 5 V was applied to the liquid crystal layer for 60 microseconds with a span of 16.9 milliseconds, and the voltage holding ratio (VHR) 16.9 milliseconds after application of the voltage was withdrawn was measured using a voltage holding ratio measurement system for liquid crystal ("MZ1800," manufactured by Micronix Corporation) and evaluated based on the four levels described below.

A: VHR was 98% or higher
B: VHR was 95% or higher and less than 98%
C: VHR was 90% or higher and less than 95%
D: VHR was less than 90%

6-6. Difference in Characteristics Between Units

Of the color filters manufactured using the color filter inks (ink sets) of the examples and the comparative examples, the first to the $20^{th}$ and the $7980^{th}$ to the $7999^{th}$ color filters manufactured of each example and the comparative example were prepared, red monochromatic display, green monochromatic display, blue monochromatic display, and white monochromatic display were carried out in a dark room, and the colors were measured using a spectrophotometer (MCPD 3000, manufactured by Otsuka Electronics). The maximum color differences (color difference ΔE in the Lab display system) in the first to the $20^{th}$ and the $7980^{th}$ to the $7999^{th}$ color filters (total of 40 color filters) manufactured for each of the examples and comparative examples were calculated from the results and evaluated based on the five ranges described below.

A: Color difference (ΔE) is less than 1.6.
B: Color difference (ΔE) is 1.6 or more and less than 2.8.
C: Color difference (ΔE) is 2.8 or more and less than 3.7.
D: Color difference (ΔE) is 3.7 or more and less than 4.7.
E: Color difference (ΔE) is 4.7 or more.

6-7. Heat Cycle Testing

Among the color filters manufactured using the color filter inks (ink sets) of the examples and the comparative examples, liquid crystal display devices such as that shown in FIG. 7 were manufactured under the same conditions using the $7001^{st}$ to $7010^{th}$ color filters manufactured of each example and the comparative example.

Red monochromatic display, green monochromatic display, and blue monochromatic display by these liquid crystal display devices were visually observed in a dark room, and the occurrence of light leakage (white spots, bright spots) was checked.

Next, the color filters were removed from the liquid crystal display devices.

The color filters thus removed were left sitting for 1.5 hour at 20° C., then 2.5 hours at 75° C., subsequently 1.5 hour at 20° C., and then 2.5 hours at ±15° C. The environment temperature was again restored to 20° C. to complete a single cycle (8 hours), and this cycle was repeated for a total of 30 times (total of 240 hours).

Liquid crystal display devices such as the one shown in FIG. 7 were then reassembled using these color filters.

Red monochromatic display, green monochromatic display and blue monochromatic display by these liquid crystal display devices were visually observed in a dark room, and the occurrence of light leakage (white spots, bright spots) was evaluated based on the following six levels.

A: There was no color filter in which light leakage (white spots, bright spots) occurred.
B: Light leakage (white spots, bright spots) was observed in 1 to 2 color filters.
C: Light leakage (white spots, bright spots) was observed in 3 to 4 color filters.
D: Light leakage (white spots, bright spots) was observed in 5 to 7 color filters.
E: Light leakage (white spots, bright spots) was observed in 8 to 9 color filters.
F: Light leakage (white spots, bright spots) was observed in 10 color filters.

7. Evaluation of Heat Resistance

Each color filter ink was applied to a glass substrate having a thickness of 0.7 mm by spin coating. The amount of ink applied was set so as to give a dry film thickness of 2.0 μm.

The test samples were then heated for 1 hour at 220° C. in a clean oven.

The colors of the test samples subjected to heat treatment at 220° C. were then measured using a spectrophotometer (MCPD 3000, manufactured by Otsuka Electronics).

The test samples were then furthermore heated for 1 hour at 250° C. in a clean oven.

The colors of the test samples subjected to heat treatment at 250° C. were then measured using a spectrophotometer (MCPD 3000, manufactured by Otsuka Electronics).

The difference in color (color difference ΔE in the Lab display system) before and after the test samples were heat treated (heat treated at 250° C.) was found from these results and evaluated according to the following five levels.

A: Color difference (ΔE) was less than 0.9
B: Color difference (ΔE) was 0.9 or greater and less than 1.9
C: Color difference (ΔE) was 1.9 or greater and less than 2.5
D: Color difference (ΔE) was 2.5 or greater and less than 3.1
E: Color difference (ΔE) was 3.1 or greater 8. Evaluation of Colored Film Formed Using Color Filter Ink Numerous test samples (test plates) for use in the tests described below were created as described below using the color filter inks.

Each ink was first applied to a glass substrate having a thickness of 0.7 mm by spin coating. The amount of ink applied was set to give a dry film thickness of 2.0 μm.

The samples were then pre-baked for 10 minutes on a 90° C. hot plate. The samples were then post-baked by heating for 30 minutes at 200° C. in a clean oven, then further post-baked by heating for 30 minutes at 240° C., and test samples (test plates) having a colored film were obtained.

8-1. Evaluation of Solvent Resistance

The colors of the test samples of each color of the examples and comparative examples were then measured using a spectrophotometer (MCPD 3000, manufactured by Otsuka Electronics).

The test samples were then dipped for 10 minutes in a solvent at 50° C., and the colors were then measured in the same manner as before using a spectrophotometer (MCPD 3000, manufactured by Otsuka Electronics).

The difference in color (color difference ΔE in the Lab display system) before and after the test samples were dipped in a solvent was found from these results and evaluated according to the following three levels.

A: Color difference (ΔE) was less than 3.0
B: Color difference (ΔE) was 3.0 or greater and less than 3.5
C: Color difference (ΔE) was 3.5 or greater The solvents used were γ-butyrolactone (γ-BL), isopropyl alcohol (IPA), N-methyl-2-pyrrolidone (NMP), 0.5 N hydrochloric acid (HCl), and 0.5 N aqueous sodium hydroxide (NaOH).

8-2. Evaluation of Light Fastness

The colors of the test samples of each color of the examples and comparative examples were then measured using a spectrophotometer (MCPD 3000, manufactured by Otsuka Electronics).

The test samples were then irradiated with light using a xenon fade meter in a 40° C., 60% RH environment, and the colors of the test samples were then measured in the same manner as before using a spectrophotometer (MCPD 3000, manufactured by Otsuka Electronics). The irradiation conditions were 320 W/m²×180 hours. The black panel temperature at this time was 50° C.

The difference in color (color difference ΔE in the Lab display system) before and after the test samples were irradiated with light was found from these results and evaluated according to the following four levels.

A: Color difference (ΔE) was less than 1.0
B: Color difference (ΔE) was 1.0 or greater and less than 2.8
C: Color difference (ΔE) was 2.8 or greater and less than 3.3
D: Color difference (ΔE) was 3.3 or greater

8-3. Cross-Cut Testing

Eleven cuts in each of the orthogonal longitudinal and transverse directions were made at intervals of 1 mm by a cutter in each of the test sample colored films of each color of the examples and comparative examples. Cellophane tape was then lightly adhered in a pattern by hand, and then rapidly peeled off, and the state of the cuts was observed and evaluated according to the five levels shown below.

A: Slight peeling at the intersection of the cut, the surface area of the defect being less than 5% of the total surface area of the square
B: Peeling at the intersection of the cut, the surface area of the defect being 5% or more, and less than 17% of the total surface area of the square
C: Wide peeling due to the cut, the surface area of the defect being 17% or more, and less than 37% of the total surface area of the square
D: Peeling wider than four points due to the cut, the surface area of the defect being 37% or more and less than 67% of the total surface area of the square
E: The peeled surface area is 67% or more of the total surface area of the square

8-4. Evaluation of ITO Film Adhesion

The test samples of each color obtained in the examples and comparative examples were first dipped for 5 minutes in isopropyl alcohol, and then dried in isopropyl alcohol vapor and rinsed.

ITO (indium tin oxide) films were then formed to a thickness of 100 nm in a $6\times10^{-3}$ Torr vacuum at a substrate set temperature of 200° C.

After testing heat resistance at 160° C. for 60 minutes, the surface roughness (Ra) of the ITO films was measured by AFM and evaluated according to the three levels shown below. A Nippon Veeco NanoScope Ma was used for AFM.

A: Absolutely no wrinkles, cracks, or other defects were observed in the ITO film
B: Several wrinkles, cracks, and other defects were observed in the ITO film
C: Wrinkles, cracks, and other defects were observed over the entire surface of the ITO film The results are shown in Tables 4 and 5.

TABLE 4

| | | DISCHARGE STABILITY EVALUATION | | | | | |
|---|---|---|---|---|---|---|---|
| | | LANDING POSITION ACCURACY | STABILITY OF DROPLET DISCHARGE AMOUNT | INTERMITTENT PRINTING PERFORMANCE | CONTINUOUS DISCHARGE TEST | STORAGE STABILITY APPEARANCE CHANGE | VISCOSITY CHANGE |
| EXAMPLE 1 | R | A | A | A | A | A | A |
| | G | A | A | A | A | A | A |
| | B | A | A | A | A | A | A |
| EXAMPLE 2 | R | A | A | A | A | A | A |
| | G | A | A | A | A | A | A |
| | B | A | A | A | A | A | A |
| EXAMPLE 3 | R | A | A | A | A | A | A |
| | G | A | A | A | A | A | A |
| | B | A | A | A | A | A | A |

TABLE 4-continued

| | | | | | | | |
|---|---|---|---|---|---|---|---|
| EXAMPLE 4 | R | A | A | A | A | A | A |
| | G | A | A | A | A | A | A |
| | B | A | A | A | A | A | A |
| EXAMPLE 5 | R | B | A | A | A | C | B |
| | G | B | A | A | A | B | B |
| | B | B | A | A | A | B | B |
| EXAMPLE 6 | R | B | B | B | B | B | B |
| | G | B | B | B | B | B | B |
| | B | B | B | B | B | B | B |
| EXAMPLE 7 | R | C | B | B | B | C | C |
| | G | B | B | B | B | B | B |
| | B | B | B | B | B | B | B |
| EXAMPLE 8 | R | C | B | B | C | C | C |
| | G | C | B | B | B | B | B |
| | B | B | B | B | B | B | B |

| | | COLOR FILTER EVALUATION | | | | | |
|---|---|---|---|---|---|---|---|
| | | FLATNESS OF COLORED PORTION | CONTRAST RATIO | BRIGHTNESS | UNEVENNESS OF COLOR, SATURATION | VOLTAGE HOLDING RATIO | VARIATION OF CHARACTERISTICS BETWEEN UNITS | HEAT CYCLE TESTING |

| | | | | | | | | |
|---|---|---|---|---|---|---|---|---|
| EXAMPLE 1 | R | A | A | A | A | A | A | A |
| | G | A | A | | | | | |
| | B | A | A | | | | | |
| EXAMPLE 2 | R | A | A | A | A | A | A | A |
| | G | A | A | | | | | |
| | B | A | A | | | | | |
| EXAMPLE 3 | R | A | A | A | A | A | A | A |
| | G | A | A | | | | | |
| | B | A | A | | | | | |
| EXAMPLE 4 | R | A | A | A | A | A | A | A |
| | G | A | A | | | | | |
| | B | A | A | | | | | |
| EXAMPLE 5 | R | C | B | B | A | A | A | A |
| | G | B | B | | | | | |
| | B | B | B | | | | | |
| EXAMPLE 6 | R | C | B | B | A | A | A | A |
| | G | B | B | | | | | |
| | B | B | B | | | | | |
| EXAMPLE 7 | R | C | B | B | A | A | A | A |
| | G | C | B | | | | | |
| | B | C | B | | | | | |
| EXAMPLE 8 | R | C | C | C | B | A | B | A |
| | G | B | B | | | | | |
| | B | B | B | | | | | |

| | | HEAT RESISTANCE | SOLVENT RESISTANCE | | | | | LIGHT FASTNESS | ADHESION TO SUBSTRATE | ITO FILM ADHESION |
|---|---|---|---|---|---|---|---|---|---|---|
| | | | γ-BL | IPA | NMP | HCl | NaOH | | | |
| EXAMPLE 1 | R | A | A | A | A | A | A | A | A | A |
| | G | A | A | A | A | A | A | A | A | A |
| | B | A | A | A | A | A | A | A | A | A |
| EXAMPLE 2 | R | A | A | A | A | A | A | A | A | A |
| | G | A | A | A | A | A | A | A | A | A |
| | B | A | A | A | A | A | A | A | A | A |
| EXAMPLE 3 | R | A | A | A | A | A | A | A | A | A |
| | G | A | A | A | A | A | A | A | A | A |
| | B | A | A | A | A | A | A | A | A | A |
| EXAMPLE 4 | R | A | A | A | A | A | A | A | A | A |
| | G | A | A | A | A | A | A | A | A | A |
| | B | A | A | A | A | A | A | A | A | A |
| EXAMPLE 5 | R | A | A | A | A | A | A | A | A | A |
| | G | A | A | A | A | A | A | A | A | A |
| | B | A | A | A | A | A | A | A | A | A |
| EXAMPLE 6 | R | A | A | A | A | A | A | A | A | A |
| | G | A | A | A | A | A | A | A | A | A |
| | B | A | A | A | A | A | A | A | A | A |
| EXAMPLE 7 | R | A | A | A | A | A | A | A | A | A |
| | G | A | A | A | A | A | A | A | A | A |
| | B | A | A | A | A | A | A | A | A | A |
| EXAMPLE 8 | R | A | A | A | A | A | A | A | A | A |
| | G | A | A | A | A | A | A | A | A | A |
| | B | A | A | A | A | A | A | A | A | A |

TABLE 5

| | | DISCHARGE STABILITY EVALUATION | | | | STORAGE STABILITY | |
|---|---|---|---|---|---|---|---|
| | | LANDING POSITION ACCURACY | STABILITY OF DROPLET DISCHARGE AMOUNT | INTERMITTENT PRINTING PERFORMANCE | CONTINUOUS DISCHARGE TEST | APPEARANCE CHANGE | VISCOSITY CHANGE |
| EXAMPLE 9 | R | C | B | B | C | C | C |
| | G | C | B | B | C | B | B |
| | B | B | B | B | B | B | B |
| EXAMPLE 10 | R | A | A | A | A | A | A |
| | G | A | A | A | A | A | A |
| | B | A | A | A | A | A | A |
| COMPARATIVE EXAMPLE 1 | R | E | E | E | E | E | E |
| | G | E | E | E | E | E | E |
| | B | E | E | E | E | E | E |
| COMPARATIVE EXAMPLE 2 | R | E | E | E | E | E | E |
| | G | E | E | E | E | E | E |
| | B | E | E | E | E | E | E |
| COMPARATIVE EXAMPLE 3 | R | C | C | C | C | E | E |
| | G | C | C | C | C | E | E |
| | B | C | C | C | C | E | E |
| COMPARATIVE EXAMPLE 4 | R | C | C | C | C | D | D |
| | G | C | C | C | C | D | D |
| | B | C | C | C | C | D | D |
| COMPARATIVE EXAMPLE 5 | R | D | D | D | D | E | E |
| | G | D | D | D | D | E | E |
| | B | D | D | D | D | E | E |
| COMPARATIVE EXAMPLE 6 | R | E | E | E | E | D | D |
| | G | E | E | E | E | D | D |
| | B | E | E | E | E | D | D |

| | | COLOR FILTER EVALUATION | | | | | | |
|---|---|---|---|---|---|---|---|---|
| | | FLATNESS OF COLORED PORTION | CONTRAST RATIO | BRIGHTNESS | UNEVENNESS OF COLOR, SATURATION | VOLTAGE HOLDING RATIO | VARIATION OF CHARACTERISTICS BETWEEN UNITS | HEAT CYCLE TESTING |
| EXAMPLE 9 | R | C | C | C | B | A | B | A |
| | G | C | C | | | | | |
| | B | B | B | | | | | |
| EXAMPLE 10 | R | B | B | A | A | A | A | A |
| | G | B | B | | | | | |
| | B | A | A | | | | | |
| COMPARATIVE EXAMPLE 1 | R | E | E | E | E | D | E | F |
| | G | E | E | | | | | |
| | B | E | E | | | | | |
| COMPARATIVE EXAMPLE 2 | R | E | E | E | E | B | E | C |
| | G | E | E | | | | | |
| | B | E | E | | | | | |
| COMPARATIVE EXAMPLE 3 | R | C | E | E | E | C | C | E |
| | G | C | E | | | | | |
| | B | C | E | | | | | |
| COMPARATIVE EXAMPLE 4 | R | D | E | D | D | C | D | D |
| | G | D | E | | | | | |
| | B | D | E | | | | | |
| COMPARATIVE EXAMPLE 5 | R | D | E | E | E | B | E | B |
| | G | D | E | | | | | |
| | B | D | E | | | | | |
| COMPARATIVE EXAMPLE 6 | R | D | E | E | E | B | E | C |
| | G | D | E | | | | | |
| | B | D | E | | | | | |

| | | HEAT RESISTANCE | SOLVENT RESISTANCE | | | | | LIGHT FASTNESS | ADHESION TO SUBSTRATE | ITO FILM ADHESION |
|---|---|---|---|---|---|---|---|---|---|---|
| | | | γ-BL | IPA | NMP | HCl | NaOH | | | |
| EXAMPLE 9 | R | A | B | B | B | B | B | A | B | A |
| | G | A | B | B | B | B | B | A | B | A |
| | B | A | B | B | B | B | B | A | B | A |
| EXAMPLE 10 | R | A | A | A | A | A | A | A | A | A |
| | G | A | A | A | A | A | A | A | A | A |
| | B | A | A | A | A | A | A | A | A | A |

TABLE 5-continued

| | | | | | | | | | | |
|---|---|---|---|---|---|---|---|---|---|---|
| COMPARATIVE EXAMPLE 1 | R | E | C | C | C | C | C | D | E | C |
| | G | E | C | C | C | C | C | D | E | C |
| | B | E | C | C | C | C | C | D | E | C |
| COMPARATIVE EXAMPLE 2 | R | A | A | A | A | A | A | A | B | A |
| | G | A | A | A | A | A | A | A | B | A |
| | B | A | A | A | A | A | A | A | B | A |
| COMPARATIVE EXAMPLE 3 | R | A | A | A | A | A | A | A | E | A |
| | G | A | A | A | A | A | A | A | E | A |
| | B | A | A | A | A | A | A | A | E | A |
| COMPARATIVE EXAMPLE 4 | R | C | B | B | B | B | B | B | E | B |
| | G | C | B | B | B | B | B | B | E | B |
| | B | C | B | B | B | B | B | B | E | B |
| COMPARATIVE EXAMPLE 5 | R | A | A | A | A | A | A | A | B | A |
| | G | A | A | A | A | A | A | A | B | A |
| | B | A | A | A | A | A | A | A | B | A |
| COMPARATIVE EXAMPLE 6 | R | A | A | A | A | A | A | A | C | A |
| | G | A | A | A | A | A | A | A | C | A |
| | B | A | A | A | A | A | A | A | C | A |

As is apparent from Tables 4 and 5, superior results were obtained by the present invention, whereas unsatisfactory results were obtained in the comparative examples.

The similar results as described above were also obtained when a commercially available liquid crystal television was disassembled, the liquid crystal display device unit was replaced by a unit manufactured as described above, and the same evaluations as described above were performed.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A color filter ink adapted to be used to manufacture a color filter by an inkjet method, the color filter ink comprising:
   a colorant;
   a resin material; and
   a liquid medium that dissolves and/or disperses the colorant,
   the resin material including a polymer M containing a monomer component m1 represented by a chemical formula (1) below, a monomer component m2 having a carboxyl group or acid anhydride group, and a monomer component m3 represented by a chemical formula (3) below:

Chemical Formula (1)

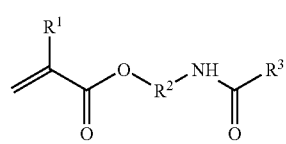

(1)

wherein in the chemical formula (1), $R^1$ represents a hydrogen atom or a methyl group, $R^2$ represents a $C_{1-8}$ bivalent aliphatic saturated hydrocarbon group, and $R^3$ is a residue of a blocking agent $R^3H$ of an isocyanate group, Chemical Formula (3)

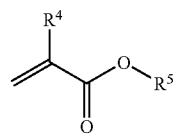

(3)

wherein in the chemical formula (3), $R^4$ represents a hydrogen atom or a methyl group, and $R^5$ represents a $C_{16-25}$ hydrocarbon group which may have a hydrocarbon-substituted oxy group.

2. The color filter ink according to claim 1, wherein the polymer M further includes at least one type of monomer component selected from the group consisting of a monomer component m4 represented by a chemical formula (4) below, a monomer component m5 that is an aromatic vinyl compound, a monomer component m6 that is a hydroxyl-containing compound, and a monomer component m7 that is a vinyl compound having a 3- to 5-member cyclic ether group:

Chemical Formula (4)

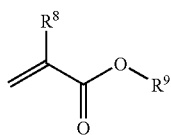
(4)

wherein, in the chemical formula (4), $R^8$ represents a hydrogen atom or a methyl group, and $R^9$ represents a $C_{1-15}$ hydrocarbon group which may have a hydrocarbon-substituted oxy group.

3. The color filter ink according to claim 1, wherein the colorant includes a halogenated phthalocyanine zinc complex.

4. The color filter ink according to claim 1, wherein the resin material further includes a polymer X containing a monomer component x1 represented by a chemical formula (11) below, a monomer component x3 represented by a chemical formula (13) below, and a monomer component x4 represented by a chemical formula (14) below:

Chemical Formula (11)

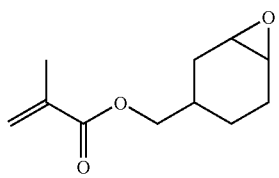
(11)

Chemical Formula (13)

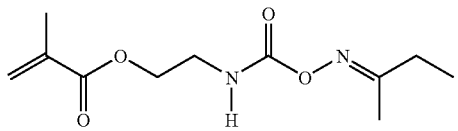
(13)

-continued

Chemical Formula (14)

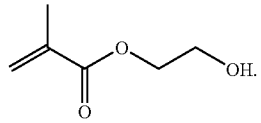
(14)

5. The color filter ink according to claim 1, wherein the resin material includes the polymer M and a polymer Y containing a monomer component y1 represented by a chemical formula (15) below:

Chemical Formula (15)

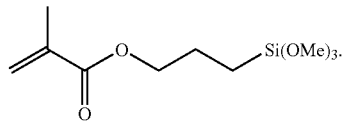
(15)

6. The color filter ink according to claim 1, wherein the liquid medium includes one or more types selected from the group consisting of 1,3-butylene glycol diacetate, bis(2-butoxyethyl)ether, 2-(2-methoxy-1-methylethoxy)-1-methylethyl acetate, and diethylene glycol monobutylether acetate.

7. A color filter ink set comprising a plurality of types of ink used to manufacture a color filter, at least one type of the plurality of types of ink being the color filter ink according to claim 1.

8. A color filter manufactured using the color filter ink according to claim 1.

9. A color filter manufactured using the color filter ink set according to claim 7.

10. An image display device having the color filter according to claim 8.

11. The image display device according to claim 10, wherein the image display device is a liquid crystal panel.

12. An electronic device having the image display device according to claim 10.

* * * * *